(12) United States Patent
Tomita et al.

(10) Patent No.: US 11,320,279 B2
(45) Date of Patent: *May 3, 2022

(54) TRAVEL ROUTE MANAGEMENT SYSTEM AND TRAVEL ROUTE DETERMINATION DEVICE

(71) Applicant: Kubota Corporation, Osaka (JP)

(72) Inventors: Sakura Tomita, Amagasaki (JP); Tomohiko Sano, Amagasaki (JP); Kazuo Sakaguchi, Amagasaki (JP); Tetsuya Nakajima, Sakai (JP); Makoto Oshitani, Sakai (JP); Kenichi Iwami, Sakai (JP); Osamu Yoshida, Amagasaki (JP)

(73) Assignee: Kubota Corporation, Osaka (JP)

( * ) Notice: Subject to any disclaimer, the term of this patent is extended or adjusted under 35 U.S.C. 154(b) by 255 days.

This patent is subject to a terminal disclaimer.

(21) Appl. No.: 16/463,095

(22) PCT Filed: Nov. 29, 2017

(86) PCT No.: PCT/JP2017/042871
§ 371 (c)(1),
(2) Date: May 22, 2019

(87) PCT Pub. No.: WO2018/101351
PCT Pub. Date: Jun. 7, 2018

(65) Prior Publication Data
US 2020/0064144 A1 Feb. 27, 2020

(30) Foreign Application Priority Data

Dec. 2, 2016 (JP) .............................. JP2016-235232
Dec. 19, 2016 (JP) .............................. JP2016-245799

(Continued)

(51) Int. Cl.
*G01C 22/00* (2006.01)
*G05D 1/00* (2006.01)
(Continued)

(52) U.S. Cl.
CPC ........ *G01C 21/3453* (2013.01); *A01B 69/008* (2013.01); *A01B 79/005* (2013.01); *G05D 1/0088* (2013.01); *G05D 1/0212* (2013.01)

(58) Field of Classification Search
CPC . G01C 21/3453; A01B 69/008; A01B 79/005; G05D 1/0088; G05D 1/0212
(Continued)

(56) References Cited

U.S. PATENT DOCUMENTS 5,568,589 A 10/1996 Hwang
6,128,574 A 10/2000 Diekhans
(Continued)

FOREIGN PATENT DOCUMENTS

AU 2015347784 A1 6/2017
EP 0821296 A2 1/1998
(Continued)

OTHER PUBLICATIONS

Ghangrekar, A Path Planning and Obstacle Avoidance Algorithm for an Autonomous Robotic Vehicle, Thesis, 2009, pp. 1-92.

*Primary Examiner* — Mahmoud S Ismail
(74) *Attorney, Agent, or Firm* — The Webb Law Firm

(57) ABSTRACT

A travel route management system includes an area setting unit that sets a work site to an outer peripheral area SA and an area CA to be worked on an inner side of the outer peripheral area SA, and a route element selecting unit that sequentially selects a next travel route element to be traveled on next, from among multiple mutually-parallel travel route elements, the travel route elements constituting a travel route that covers the area CA to be worked. The route (Continued)

element selecting unit selects a U-turn travel route for moving from a travel route element serving as a movement origin to a next travel route element serving as a movement destination, the selection being made on the basis of an interval between the movement origin and the movement destination.

32 Claims, 28 Drawing Sheets

(30) Foreign Application Priority Data

Dec. 19, 2016 (JP) .............................. JP2016-245800
Nov. 16, 2017 (JP) .............................. JP2017-221343
Nov. 17, 2017 (JP) .............................. JP2017-221901

(51) Int. Cl.
    *G01C 21/34*     (2006.01)
    *A01B 69/04*     (2006.01)
    *A01B 79/00*     (2006.01)
    *G05D 1/02*     (2020.01)

(58) Field of Classification Search
    USPC .......................................................... 701/25
    See application file for complete search history.

(56) References Cited

U.S. PATENT DOCUMENTS

| | | | |
|---|---|---|---|
| 6,240,342 B1 | 5/2001 | Fiegert et al. | |
| 8,838,321 B1* | 9/2014 | Ferguson | G05D 1/0214 |
| | | | 701/23 |
| 9,134,130 B1* | 9/2015 | Schneider | G05D 1/00 |
| 2004/0193348 A1 | 9/2004 | Gray et al. | |
| 2004/0193349 A1 | 9/2004 | Flann et al. | |
| 2007/0135190 A1 | 6/2007 | Diekhans et al. | |
| 2007/0233348 A1 | 10/2007 | Diekhans et al. | |
| 2007/0293978 A1 | 12/2007 | Wurman et al. | |
| 2008/0103690 A1 | 5/2008 | Dix | |
| 2008/0103694 A1 | 5/2008 | Dix et al. | |
| 2009/0118904 A1 | 5/2009 | Birnie | |
| 2012/0209512 A1 | 8/2012 | Kujirai et al. | |
| 2016/0174453 A1 | 6/2016 | Matsuzaki et al. | |
| 2017/0102702 A1* | 4/2017 | Ishijima | G05D 1/0219 |
| 2017/0131718 A1 | 5/2017 | Matsumura et al. | |
| 2017/0168488 A1* | 6/2017 | Wierzynski | G05D 1/0251 |
| 2017/0177002 A1 | 6/2017 | Ogura et al. | |
| 2017/0268893 A1* | 9/2017 | Nakanishi | G06F 16/29 |
| 2019/0146513 A1* | 5/2019 | Tomita | G05D 1/0278 |
| | | | 701/50 |
| 2019/0227561 A1 | 7/2019 | Hiramatsu | |

FOREIGN PATENT DOCUMENTS

| | | |
|---|---|---|
| EP | 1795986 A2 | 6/2007 |
| EP | 1839479 A1 | 10/2007 |
| EP | 1915894 A2 | 4/2008 |
| EP | 1916584 A2 | 4/2008 |
| JP | 614857 A | 1/1994 |
| JP | 683445 A | 3/1994 |
| JP | H11266608 A | 10/1999 |
| JP | 2002502997 A | 1/2002 |
| JP | 2003308121 A | 10/2003 |
| JP | 2004078786 A | 3/2004 |
| JP | 2004199451 A | 7/2004 |
| JP | 3814230 B2 | 6/2006 |
| JP | 2012105557 A | 6/2012 |
| JP | 2012167942 A | 9/2012 |
| JP | 201561803 A | 4/2015 |
| JP | 2015112071 A | 6/2015 |
| JP | 2015137990 A | 7/2015 |
| JP | 2015170223 A | 9/2015 |
| JP | 201693125 A | 5/2016 |
| WO | 2015118731 A1 | 8/2015 |
| WO | 201600968 A1 | 1/2016 |
| WO | 2016002096 A1 | 1/2016 |
| WO | 2016017408 A1 | 2/2016 |

* cited by examiner

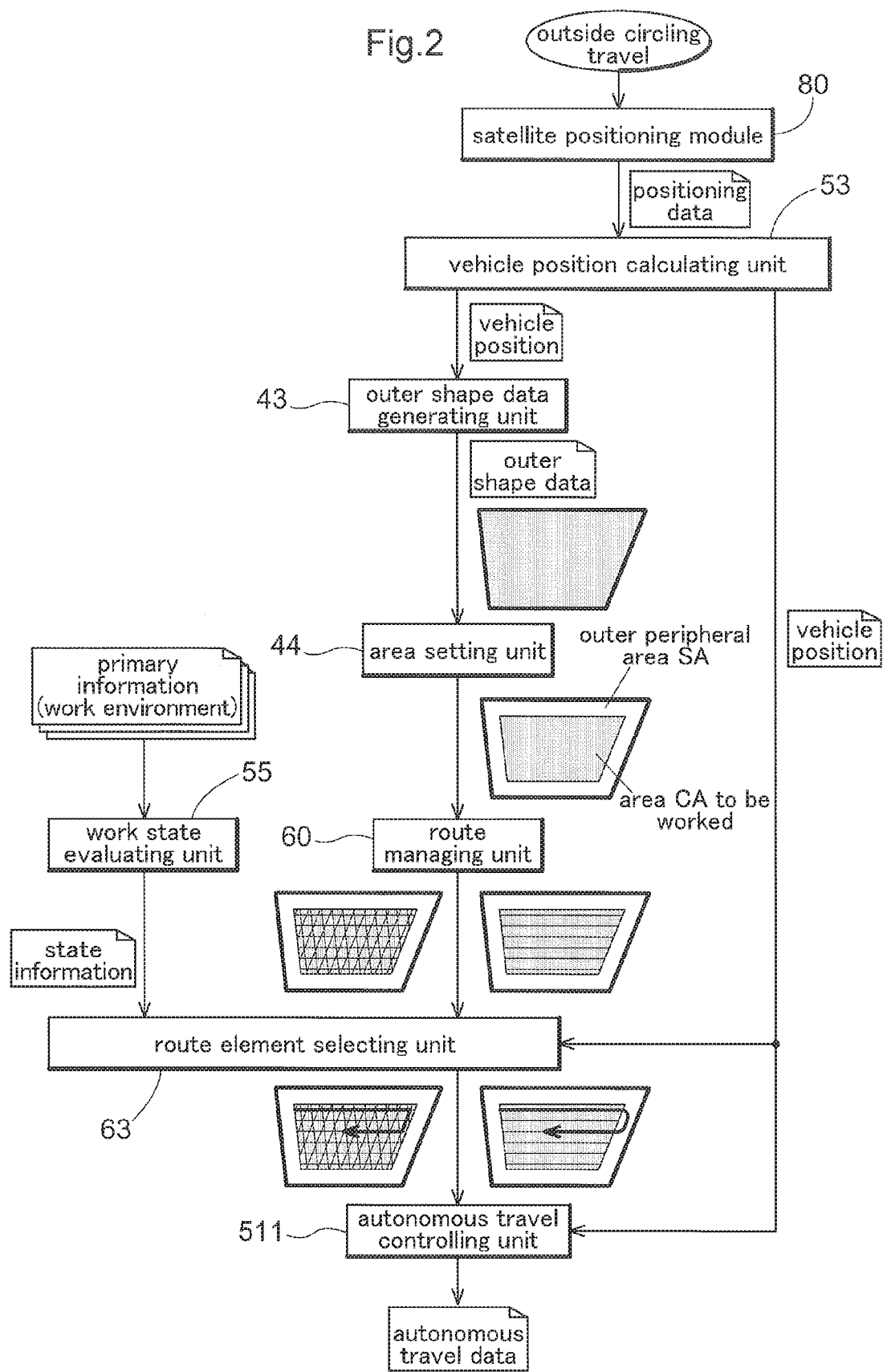

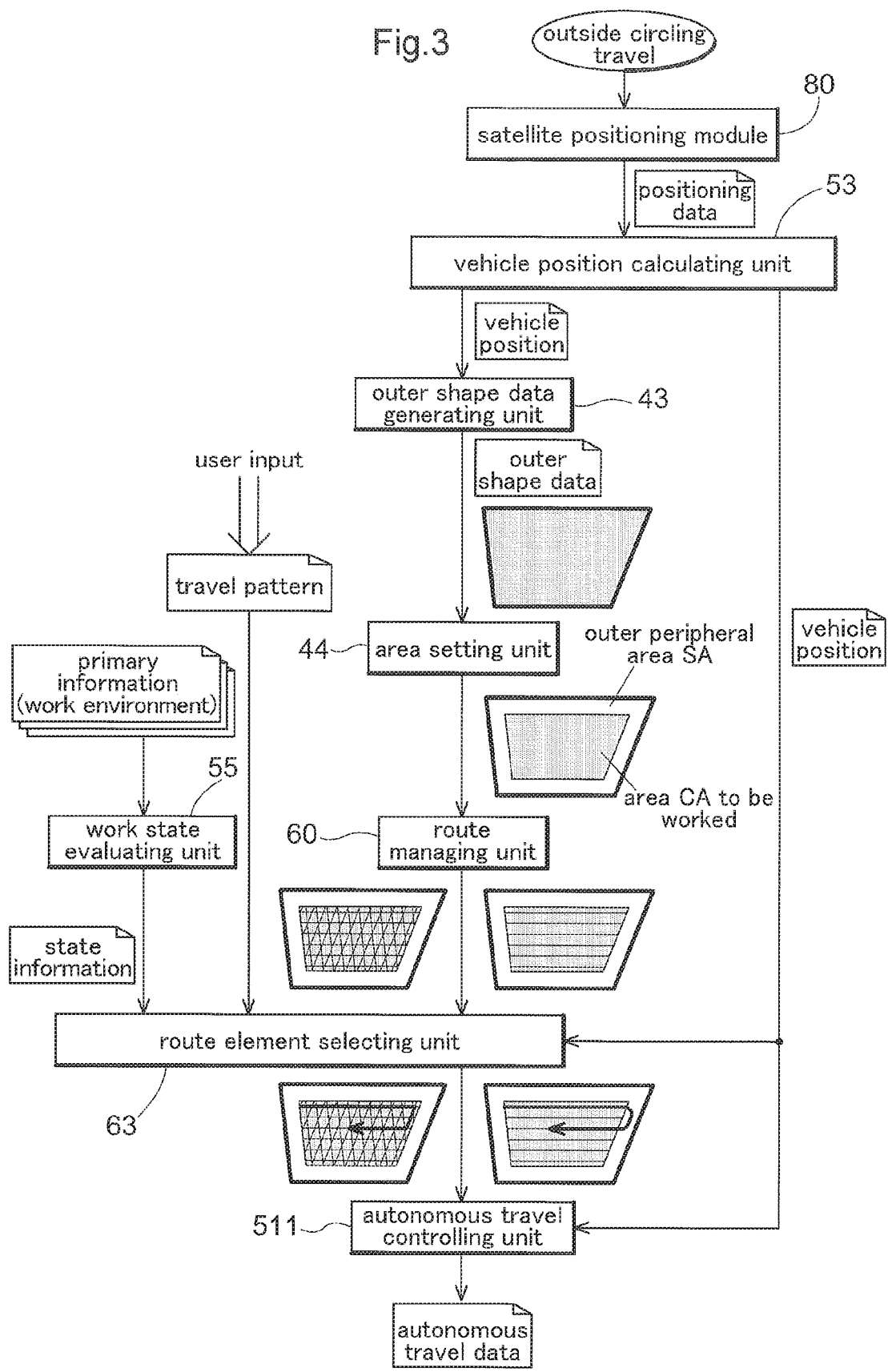

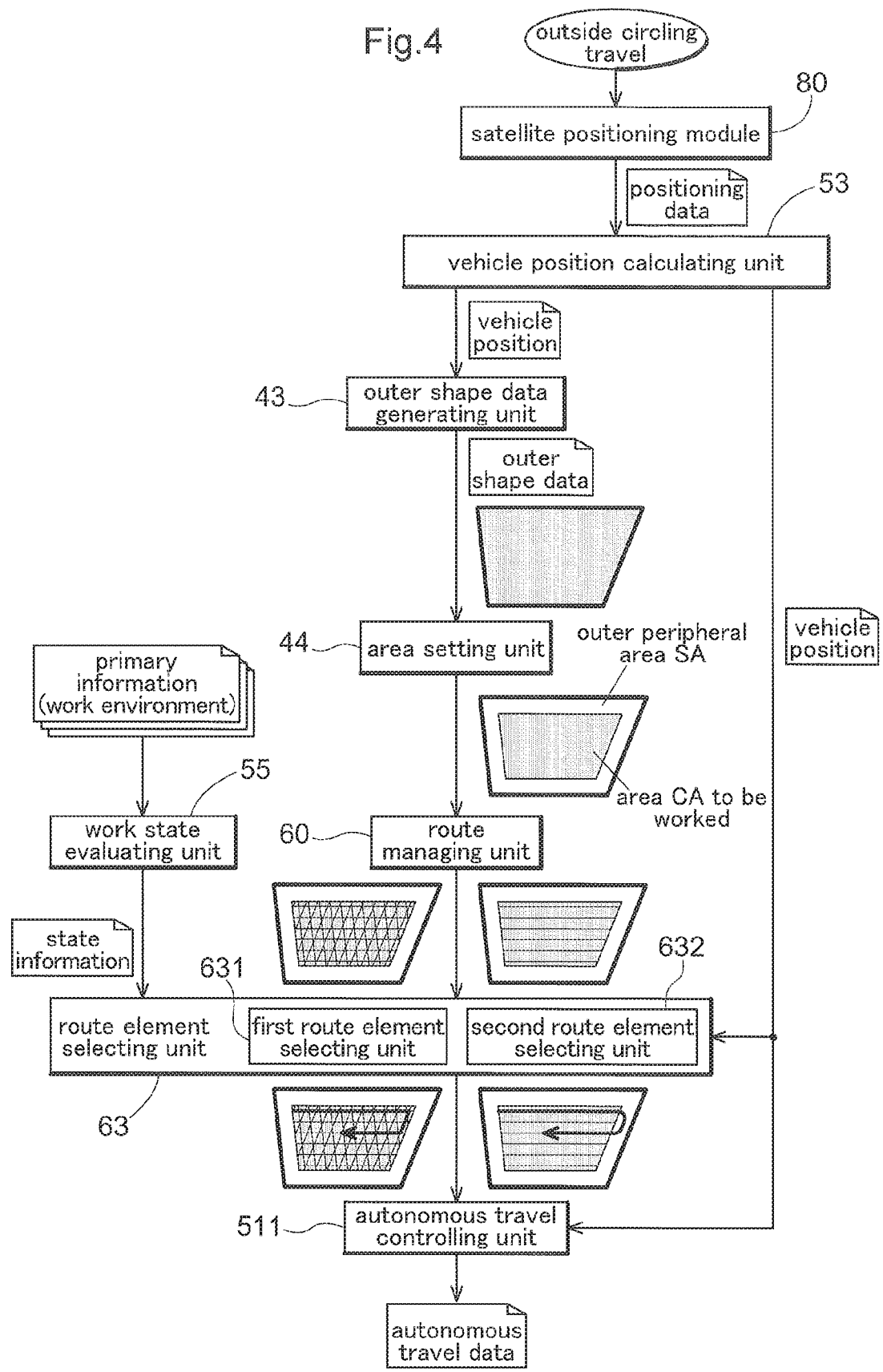

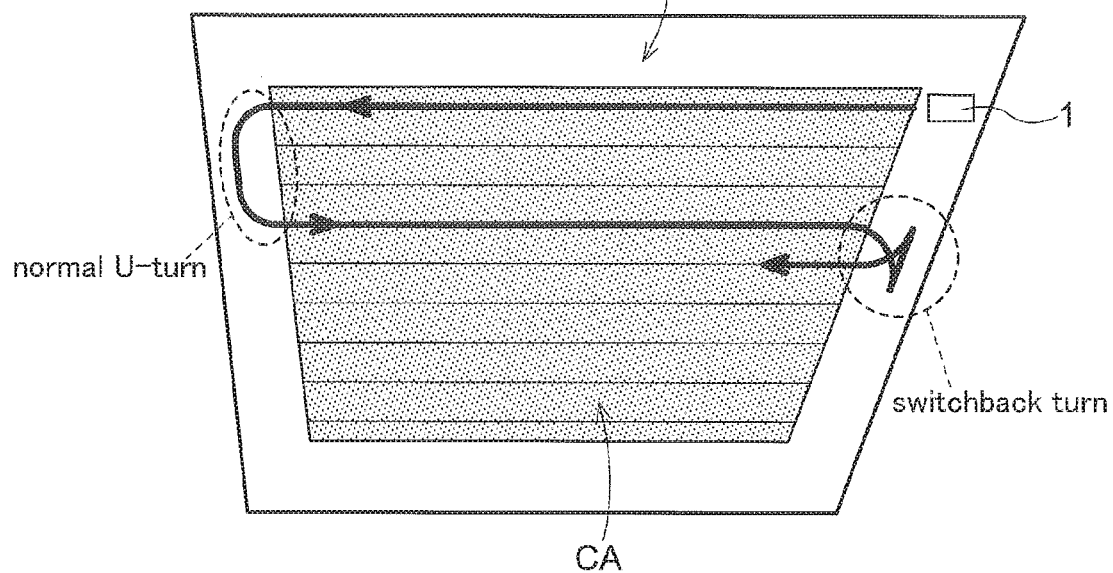
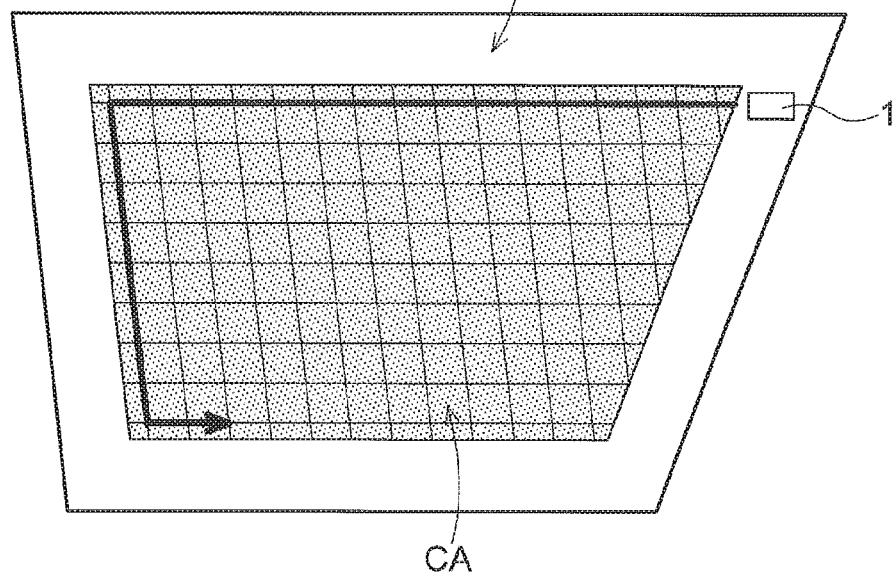

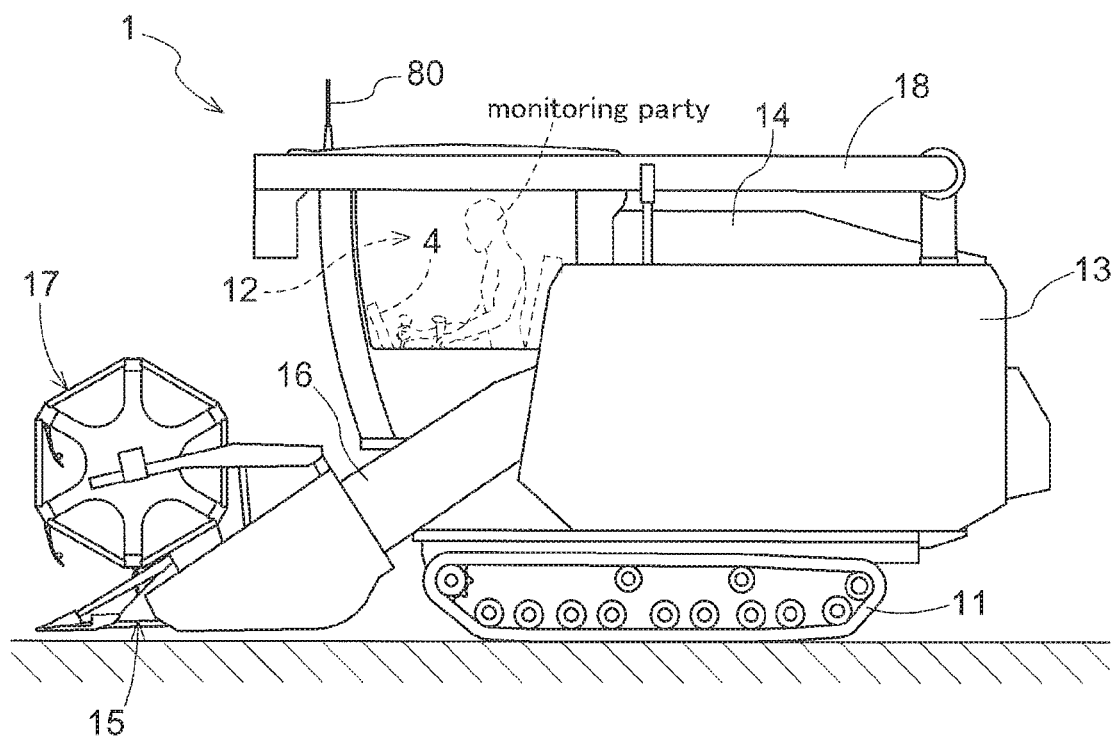

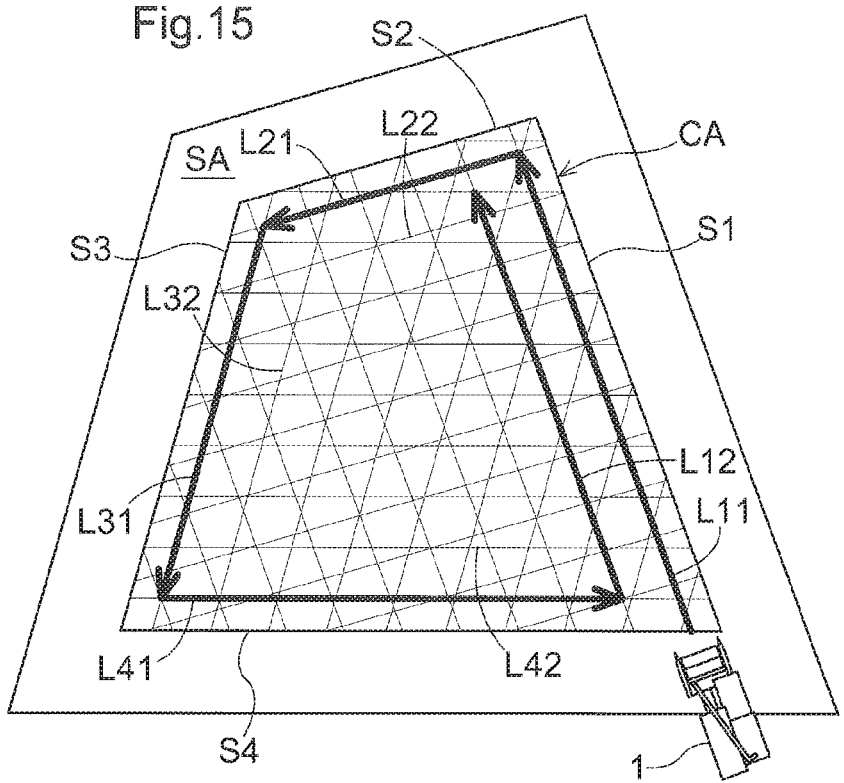
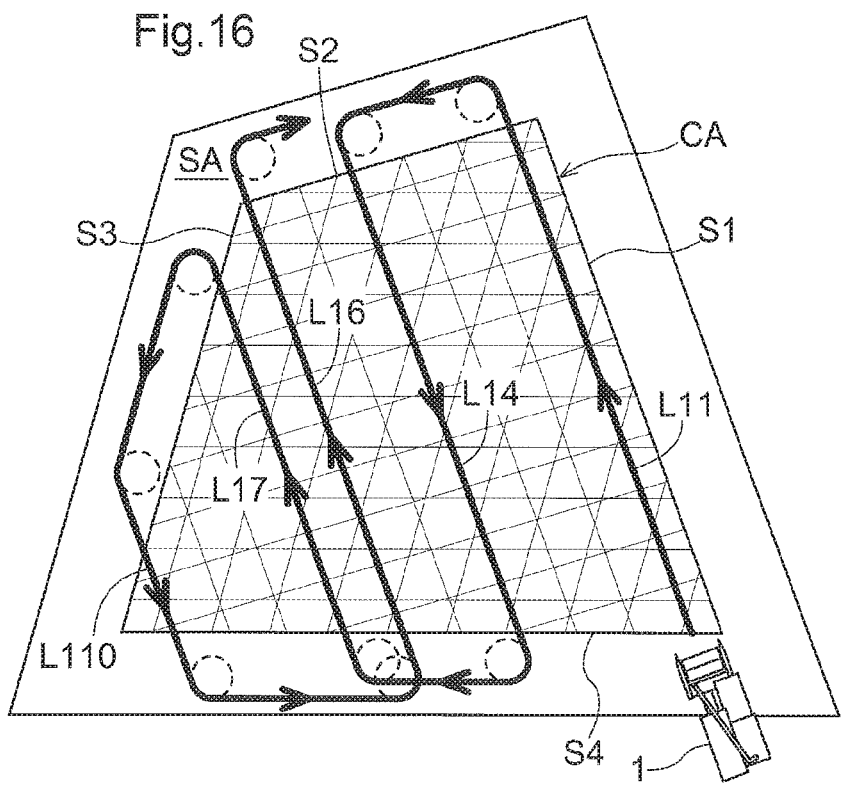

TRAVEL ROUTE MANAGEMENT SYSTEM AND TRAVEL ROUTE DETERMINATION DEVICE

CROSS-REFERENCE TO RELATED APPLICATIONS

This application is the United States national phase of International Application No. PCT/JP2017/042871 filed Nov. 29, 2017, and claims priority to Japanese Patent Application No. 2016-235232 filed Dec. 2, 2016, Japanese Patent Application Nos. 2016-245799 and 2016-245800 filed Dec. 19, 2016, Japanese Patent Application No. 2017-221343 filed Nov. 16, 2017, and Japanese Patent Application No. 2017-221901 filed Nov. 17, 2017, the disclosures of which are hereby incorporated by reference in their entirety.

TECHNICAL FIELD

The present invention relates to a travel route management system that determines a travel route for a work vehicle that travels autonomously while working at a work site.

The present invention furthermore relates to a travel route determination device that determines a travel route for a work vehicle that travels while working at a work site.

BACKGROUND ART

[1] A field working machine disclosed in Patent Document 1 includes a route calculating part and a drive assist unit for working in a field while traveling autonomously. The route calculating part finds the outer shape of the field from topographical data. Then, on the basis of the outer shape and a work width of the field working machine, the route calculating part calculates a travel route that starts from a travel start point to a travel endpoint. The drive assist unit compares a vehicle position found from positioning data (latitude/longitude data) obtained from a GPS module with the travel route calculated by the route calculating part. The drive assist unit then controls a steering mechanism so that the vehicle body travels along the travel route.

Patent Document 1 discloses a system that controls the autonomous travel of a single work vehicle. Patent Document 2 discloses a system that causes two work vehicles to work while traveling in tandem. A travel route setting device used in this system calculates a travel route by selecting deployment positions of a first work vehicle and a second work vehicle. Once the travel route is calculated, the work vehicles measure their own positions and work while traveling along the travel route.

[2] The field working machine disclosed in Patent Document 1 includes a route calculating part and a drive assist unit for working in a field using autonomous travel. The route calculating part finds the outer shape of the field from topographical data. Then, on the basis of the outer shape and a work width of the field working machine, the route calculating part calculates a travel route that starts from a travel start point to a travel endpoint that have been set. The drive assist unit compares a vehicle position found on the basis of positioning data (latitude/longitude data) obtained from a GPS module with the travel route calculated by the route calculating part. The drive assist unit then controls a steering mechanism so that the vehicle body travels along the travel route.

According to Patent Document 1, an overall travel route covering the field is calculated before travel, and work travel is carried out along the overall travel route. If, when calculating this overall travel route, the computations are optimized by taking various conditions into account, the computational load will increase. It therefore takes a long time to obtain the computation results, which delays the start of the work travel. On the other hand, lightening the computational load by omitting various conditions makes it possible to obtain the overall travel route in a short time. However, it is highly likely that the work will be inefficient as a result.

PRIOR ART DOCUMENTS

Patent Documents

Patent Document 1: JP 2015-112071A
Patent Document 2: JP 2016-093125A

DISCLOSURE OF THE INVENTION

Problems the Invention is to Solve

[1] One problem pertaining to background art [1] is as follows.

In the autonomous work travel of the work vehicles according to Patent Document 1 and Patent Document 2, the travel route for working in a work site is calculated on the basis of the outer shape of the work site, the specifications of the work vehicles, and so on. One or more work vehicles then travel autonomously along the calculated travel route. The calculated travel route has a form in which the route extends so as to cover the work site with a single stroke. A travel route that covers a work site by repeating straight travel of long distances and U-turn travel that changes the travel direction is typically calculated as the travel route. In such a travel route, various types of routes are used for the U-turn travel routes, including routes constituted only by a turning travel route, routes constituted by a turning travel route and a straight travel route, routes constituted by counter travel routes of moving forward and backward, and the like. Additionally, work vehicles that carry out agricultural work and the like often work while traveling straight and stop working temporarily during U-turn travel. In U-turn travel, turning with too low a turn radius is problematic in that doing so risks damaging the ground surface, whereas turning with too high a turn radius is problematic in that doing so requires a larger space for the U-turn travel and reduces the work efficiency. However, conventional travel routes for autonomous work travel have not taken these problems into account.

In light of such circumstances, what is needed is a travel route management system capable of rationally selecting a U-turn travel route.

[2] Another problem pertaining to background art [1] is as follows.

In the autonomous work travel of the work vehicles according to Patent Document 1 and Patent Document 2, the travel route for working in a work site is calculated on the basis of the outer shape of the work site, the specifications of the work vehicles, and so on. One or more work vehicles then travel autonomously along the calculated travel route. The routes travelled by the work vehicle are defined by travel patterns. A "travel pattern" is the basic form of the travel route. In Patent Document 1 and Patent Document 2, back-and-forth travel, which covers the work site while repeating straight travel of long distances and U-turn travel that changes the travel direction, is used as the travel pattern. Counterclockwise or clockwise spiral travel moving from the outside toward the inside, counterclockwise or clockwise spiral travel moving from the inside toward the outside, and the like are known as travel patterns aside from back-and-forth travel. The travel pattern suited for actual autonomous travel depends on the state of the work site, the type of the work, and so on. There is also demand for a user to be able to determine the travel pattern according to his or her preferences. The state of the work site also changes over time. In spite of this, the travel pattern serving as the basis for generating the travel route is determined in advance in conventional autonomous travel systems. It has thus not been possible to determine a travel pattern in accordance with the state of the work site on that day, the user's intentions, and so on.

In light of such circumstances, what is needed is a system that enables a travel pattern for autonomous travel to be selected in accordance with the state of a work site, user preferences, and the like.

[3] A problem pertaining to background art [2] is as follows.

In light of such circumstances, what is needed is a technique for implementing work travel along the most suitable travel route possible, without delaying the start of the work travel.

Means to Solve the Problems

[1] A solution corresponding to problem [1] is as follows.

A travel route management system according to the present invention, which determines a travel route for a work vehicle that travels autonomously while working in a work site, includes: an area setting unit that sets the work site to an outer peripheral area, and an area to be worked on an inner side of the outer peripheral area; and a route element selecting unit that sequentially selects a next travel route element to be traveled on next, from among multiple mutually-parallel travel route elements, the travel route elements constituting a travel route that covers the area to be worked, wherein the route element selecting unit selects a U-turn travel route for moving from a travel route element serving as a movement origin to a next travel route element serving as a movement destination, the selection being made on the basis of an interval between the movement origin and the movement destination.

According to this configuration, to carry out work travel in the entire area to be worked, the work vehicle does not simply connect adjacent travel route elements with a U-turn travel route. Instead, the U-turn travel route is selected in accordance with an interval from the travel route element serving as the movement origin to the travel route element serving as the movement destination to connect to. As a result, multiple mutually-parallel travel route elements set in the area to be worked are sequentially connected by U-turn travel routes at intervals that are as appropriate as possible, based on the state of the work site, the type of the work, and so on. If only intervals that cannot connect the travel route elements to each other are found, a U-turn travel route connecting the travel route elements by that interval is selected. Multiple mutually-parallel travel route elements set in the area to be worked can be connected by selecting a U-turn travel route in accordance with the interval. As a result, work travel using a reasonable travel route for autonomous travel can be realized.

Incidentally, in work sites such as fields entered by agricultural work vehicles, the outer peripheral area located on the outer side of the area to be worked of the work site is typically used as an area in which the work vehicle can travel freely. It is therefore favorable to set the U-turn travel route in the outer peripheral area. Thus according to one preferred embodiment of the present invention, the U-turn travel route is a travel route set in the outer peripheral area.

According to one preferred embodiment of the present invention, a first U-turn travel route that realizes normal U-turn travel carried out only in a forward direction, and a second U-turn travel route that realizes switchback turn travel carried out in both forward and reverse directions, can be calculated as the U-turn travel route; and the route element selecting unit selects the first U-turn travel route when the interval is large and the second U-turn travel route when the interval is small. According to this configuration, when the interval from the travel route element serving as the movement origin to the travel route element serving as the movement destination is so short that the work site will be damaged beyond the permissible level by normal U-turn travel, or if normal U-turn travel is not possible, switchback turn travel, which includes counter travel using forward and backward movement, can be selected. Additionally, this configuration makes it possible to avoid, to the greatest extent possible, selecting a travel route element having an interval requiring switchback turn travel as the travel route element serving as the movement destination. Through this, switchback turn travel, which requires complex steering control, can be suppressed to the greatest extent possible, while at the same time executing such switchback turn travel depending on the interval, which makes it possible to realize reasonable travel routes.

Furthermore, according to a preferred embodiment of the present invention, the first U-turn travel route includes a rightward U-turn travel route and a leftward U-turn travel route; and the route element selecting unit selects the leftward U-turn travel route preferentially over the rightward U-turn travel route. Agricultural work vehicles such as tractors conventionally travel mainly leftward (counterclockwise). Thus according to the stated configuration, a sense of unnaturalness can be avoided when a person occupies the autonomously-traveling work vehicle for monitoring purposes. This is also advantageous in that a sense of unnaturalness can be avoided even when monitoring the autonomously-traveling work vehicle from the exterior.

[2] A solution corresponding to problem [2] is as follows.

A travel route management system according to the present invention determines a travel route for a work vehicle that travels autonomously while working in a work site, the system including: an area setting unit that sets the work site to an outer peripheral area, and an area to be worked on an inner side of the outer peripheral area; a route managing unit that calculates a travel route element set, the travel route element set being an aggregate of multiple travel route elements constituting a travel route covering the area to be worked, and manages the travel route element set so as to be capable of readout, and furthermore manages a plurality of types of directional change routes so as to be capable of readout, the directional change routes being used to move from one of the travel route elements to another travel route element; and a route element selecting unit that, on the basis of a travel pattern set from among a plurality of types of travel patterns defined by combinations of the travel route elements and the directional change routes, selects the next travel route element to be traveled next from the travel route element set in sequence, and selects the directional change travel route for moving to the next travel route element, wherein the setting of the travel pattern is carried out by a human, through a user instruction. Note that "setting a travel pattern through a user instruction" includes not only a user making a setting directly in a control unit of the work vehicle, but also setting a travel pattern by downloading a work plan created on the basis of a user request to the control unit of the work vehicle.

According to this system, a plurality of travel patterns are prepared. Then, the form of a travel route on which the work vehicle will actually travel is determined on the basis of the travel patterns. Moreover, the travel patterns can be determined in accordance with user instructions. The travel patterns can be determined in accordance with the state of the work site, user preferences, and the like. As a result, the work vehicle autonomously travels on a travel route, based on a travel pattern determined according to the user's preferences, as a target route.

If the work site is a field in which crops are being grown, many crops are planted in rows. As such, back-and-forth travel that uses U-turns to connect multiple parallel long-distance instances of forward travel is preferable in tilling work, harvesting work, and the like in the field. Accordingly, a travel pattern that defines the form of a route for achieving such back-and-forth travel is necessary. Additionally, in land preparation work, mowing work, liquid dispersion work, and the like in a work site, spiral travel, which is spiral-shaped traveling from the interior or from the exterior, is preferable particularly when the work site is shaped as a polygon with five or more sides. Accordingly, a travel pattern that defines a route for achieving such spiral travel is also necessary. Thus according to one preferred embodiment of the present invention, one type of the travel pattern is spiral travel, the spiral travel being spiral work travel from the outside toward the inside of the area to be worked, and another type of the travel pattern is back-and-forth travel in which a U-turn travel route in the outer peripheral area is used as the directional change route for moving from an endpoint of the travel route element to an endpoint of another travel route element. Accordingly, spiral travel or back-and-forth travel can be selected according to the user's intent, on the basis of the state of the work site, the user's preferences, and the like.

In U-turn travel, a travel pattern that carries out two 90° turns on either side of straight travel (a normal U-turn), a travel pattern that carries out a so-called counter turn in which a reverse-travel part is included (a switchback turn), and the like are used. The turn radius of the work vehicle is large, and thus when turning with a normal U-turn, there is a long interval between the straight travel trajectory before the U-turn and the straight travel trajectory after the U-turn. This interval is greater than or equal to twice the work width of the work vehicle, and thus adjacent travel routes cannot be connected by a normal U-turn. However, a switchback turn introduces counter travel including backward travel, and thus the interval between the straight travel trajectory before the U-turn and the straight travel trajectory after the U-turn can be shortened. Adjacent travel routes can therefore be connected by switchback turns. However, switchback turns include backward travel, and therefore tend to require a longer amount of time than the amount of time required by normal U-turns. It is therefore preferable to employ switchback turns when the interval between the straight travel trajectory before the U-turn and the straight travel trajectory after the U-turn is too short and a normal U-turn is not possible. Thus according to a preferred embodiment of the present invention, the U-turn travel route includes a first U-turn travel route that realizes normal U-turn travel carried out only in a forward direction and a second U-turn travel route that realizes switchback turn travel carried out in both forward and reverse directions; and the route element selecting unit selects the first U-turn travel route when an interval between a travel route element serving as a movement origin and a travel route element serving as a movement destination, which are to be moved to and which are parallel to each other, is large, and selects the second U-turn travel route when the interval is small.

In work travel carried out in a single field, it is not necessary to use a travel route defined by the same travel pattern from start to finish. For example, the beginning of the work travel may be carried out through spiral travel, with U-turn travel set partway through the work, and work travel using U-turn travel being carried out in the remaining unworked site. Thus according to one preferred embodiment of the present invention, the travel pattern can be changed partway through the work travel in the area to be worked. Autonomous travel with a high level of freedom is realized as a result.

For the work vehicle to travel autonomously, it is necessary to set the vehicle speed, work specifications, and the like, in addition to setting the travel pattern. Such settings, which require user confirmation, are preferably made by the user him or herself operating a touch panel, an instrument, or the like to input the necessary information. Thus according to one preferred embodiment of the present invention, the travel pattern is set by a human, through a user input.

[3] A solution corresponding to problem [3] is as follows.

A travel route determination device, which determines a travel route for a work vehicle that travels while working in a work site, includes: an area setting unit that sets an area to be worked by the work vehicle in the work site; a route managing unit that calculates a travel route element set, the travel route element set being an aggregate of multiple travel route elements constituting a travel route covering the area to be worked, and stores the travel route element set so as to be capable of readout; a first route element selecting unit that calculates a selection order for the travel route elements of an overall travel route on the basis of a basic priority rule, before the work travel by the work vehicle; a second route element selecting unit that, while the work vehicle carries out work travel based on the selection order calculated by the first route element selecting unit, extracts an untraveled travel route element from the travel route element set as a recalculated travel route element, and recalculates a selection order for the recalculated travel route element on the basis of a cost evaluation rule; and a route setting unit that corrects the selection order calculated by the first route element selecting unit with the selection order calculated by the second route element selecting unit.

According to this configuration, first, a travel route element set, which covers an area to be worked that has been set, is calculated. The travel route elements constituting the travel route element set are selected sequentially, and by carrying out work travel using the selected travel route elements as a target travel route, the work in the area to be worked is completed. The function of calculating the travel route element selection order is realized by the first route element selecting unit and the second route element selecting unit. Before the work travel, the first route element selecting unit calculates the selection order for the travel route elements of the overall travel route on the basis of a basic priority rule. Once that selection order is calculated, the work vehicle immediately starts work travel. The first route element selecting unit only calculates the selection order on the basis of the basic priority rule, and thus the selection order is a calculation result, obtained with a light processing load and in a short amount of time. However, this selection order is not necessarily appropriate in terms of the work performance, travel performance, economic performance, and so on. It is necessary to add various conditions pertaining to the work performance, travel performance, economic performance, and the like in order to obtain an appropriate selection order. Here, a rule for calculating a travel route element selection order in light of such conditions, which provides more appropriate benefits, is called a "cost evaluation rule". According to this configuration, the second route element selecting unit extracts a travel route element that has not yet been traveled as a recalculated travel route element, and calculates the selection order on the basis of the cost evaluation rule, at the point in time when the first route element selecting unit has finished calculating the selection order, i.e., at the point in time when the work travel is started. The selection order calculated by the second route element selecting unit is more appropriate than the selection order calculated by the first route element selecting unit, and thus the route setting unit corrects the selection order calculated by the first route element selecting unit using the selection order calculated by the second route element selecting unit. While the second route element selecting unit is carrying out computations, the work vehicle is already traveling for work, which makes it possible to avoid a situation in which the computation time of the second route element selecting unit delays the work travel. Work travel which takes into account the cost and is therefore more appropriate to a degree corresponding to the work travel in the corrected selection order is thus carried out.

Note that the term "work travel" used in this application is used not only in reference to travel executed while actually carrying out work, but with a broader meaning encompassing travel carried out to change directions during the work, in a state where work is not being carried out.

Furthermore, in this specification, the term "work environment of the work vehicle" can include the state of the work vehicle, the state of the work site, commands from a person (a monitoring party, a driver, an administrator, or the like), and so on. State information is found by evaluating the work environment. Mechanical factors such as refueling and unloading harvested crops, environmental factors such as changes in weather and the state of the work site, and furthermore, human requests such as unanticipated commands to suspend the work, can be given as examples of the state information. If multiple work vehicles are executing work travel in cooperation with each other, the positional relationships and so on between the work vehicles also correspond to the work environment or the state information. Note that the monitoring party, the administrator, or the like may be inside the work vehicle, near the work vehicle, or far from the work vehicle.

If, while the second route element selecting unit is calculating the selection order of the recalculated travel route elements, one of the recalculated travel route elements has been traveled on, it will become necessary to again travel on that already-traveled travel route element, which is wasteful. To avoid this, according to one preferred embodiment of the present invention, the second route element selecting unit extracts a predetermined number of travel route elements from the end of the selection order calculated by the first route element selecting unit as the recalculated travel route elements. According to this configuration, a predetermined number of travel route elements from the final travel route element in the selection order are subject to the selection order recalculation. Accordingly, if the calculation time and travel time are taken into consideration, and the predetermined number is set to a number with which the recalculated travel route elements have no chance of being traveled on by the work vehicle, the above-described problem is solved.

The work travel time of the work vehicle and the calculation time of the second route element selecting unit are not constant, and it is therefore difficult to accurately determine a predetermined number that ensures that the work vehicle will not travel on the recalculated travel route elements during the recalculation. If the predetermined number is set to a low number to be on the safe side, a fewer number of travel route elements will have the appropriate selection order. To reasonably solve this problem, according to one preferred embodiment of the present invention, the second route element selecting unit repeats the process of extracting the recalculated travel route element and recalculating the selection order while incrementing the predetermined number by additionally extracting a travel route element later in the selection order, and stops the repeating process when the last additionally-extracted travel route element is the travel route element currently being traveled. According to this configuration, the selection order is recalculated using, as the predetermined number, a number with which there is no chance that the recalculated travel route elements will be traveled by the work vehicle, and if there is further leeway in terms of time, the predetermined number is incremented, the number of recalculated travel route elements is increased, and the selection order is recalculated again. If, when incrementing the predetermined number in this manner, a travel route element additionally extracted as a recalculated travel route element as a result of the incrementing is currently being traveled on, the recalculation is stopped. Accordingly, the selection order corrected using the results of the recalculation obtained up until that time remains valid, and work travel is realized along the most appropriate travel route possible. Note that the term "increment" used in this application is not limited to increasing the predetermined number by one at a time, and a number of two or more may be used instead of one as the number of the increase. Additionally, the actual work travel time and the computation time may be compared, and the number of the increase may be changed at the timing of the incrementing, rather than using a constant increase number.

The area to be worked can be covered by travel routes having a variety of forms. A travel route in which parallel travel routes are connected by U-turn travel routes is commonly used in agricultural work. The work width is defined by the interval of parallel travel routes. Additionally, the U-turn width of the U-turn travel route is defined by a minimum turn radius. The U-turn width is typically greater than the work width, and thus a travel route in which adjacent travel routes are connected by U-turn travel routes cannot be employed. It is therefore necessary to select the next travel route having skipped several travel routes from one travel route. The selection order technique according to the present invention can be used favorably when selecting routes in this manner. Thus according to one preferred embodiment of the present invention, the travel route element set is a parallel line set constituted by parallel lines that are parallel to each other and divide the area to be worked into rectangular shapes, and movement from one end of one travel route element to one end of another travel route element is executed through U-turn travel by the work vehicle.

As described above, with a basic priority rule, which is favorable when employing a parallel line set as the travel route element set, a priority level from the travel route element previous in the order to the travel route element next in the order is set in advance. Preferably, this priority level is set so that a properly-distanced travel route element, which is a predetermined distance from the travel route element previous in the order, has the highest priority as the next element in the order. Furthermore, it is preferable that the priority level be set to decrease as the distance from the travel route element previous in the order to the travel route element next in the order increases. Using such a basic priority rule makes it possible to quickly and easily determine the selection order for the travel route elements, and thus the computations end in a short amount of time even when there is a large number of travel route elements.

With respect to the cost evaluation rule used after the selection order calculation using the basic priority rule, preferably, a cost evaluated by the cost evaluation rule is a cost arising when the work vehicle travels on the travel route elements according to the selection order calculated by the second route element selecting unit; and a selection order where the cost is the lowest is calculated by the second route element selecting unit. In the field of route searching, a more appropriate selection order is obtained by using the cost evaluation rule to calculate a selection order providing the lowest total cost necessary when passing through each travel route element.

In work travel, advantages and disadvantages in terms of fuel costs, stemming from the travel distance, and particularly the travel distance of U-turn travel; the effects of deviation from appropriate steering angles on the work vehicle or the work site; advantages and disadvantages in terms of work quality stemming from the direction of travel; and the like are appropriate as items subject to cost evaluation. Thus even if it takes time to calculate the selection order using the cost evaluation rule, that selection order will be more appropriate than the selection order calculated using the basic priority rule.

BRIEF DESCRIPTION OF THE DRAWINGS

FIG. 2 is a diagram illustrating the basic flow of autonomous travel control using a travel route determination device.

FIG. 3 is a diagram illustrating the basic flow of autonomous travel control using the travel route determination device.

FIG. 4 is a diagram illustrating the basic flow of autonomous travel control.

FIG. 5 is a diagram illustrating a travel pattern of repeating straight travel and U-turns.

FIG. 6 is a diagram illustrating a travel pattern that follows a mesh-shaped route.

FIG. 7 is a side view of a harvester serving as one embodiment of a work vehicle.

FIG. 15 is a diagram illustrating a spiral travel pattern in a travel route element set calculated by a mesh route element calculating unit.

FIG. 16 is a diagram illustrating a linear back-and-forth travel pattern in a travel route element set calculated by the mesh route element calculating unit.

BEST MODE FOR CARRYING OUT THE INVENTION

Overview of Autonomous Travel

Figure 1:
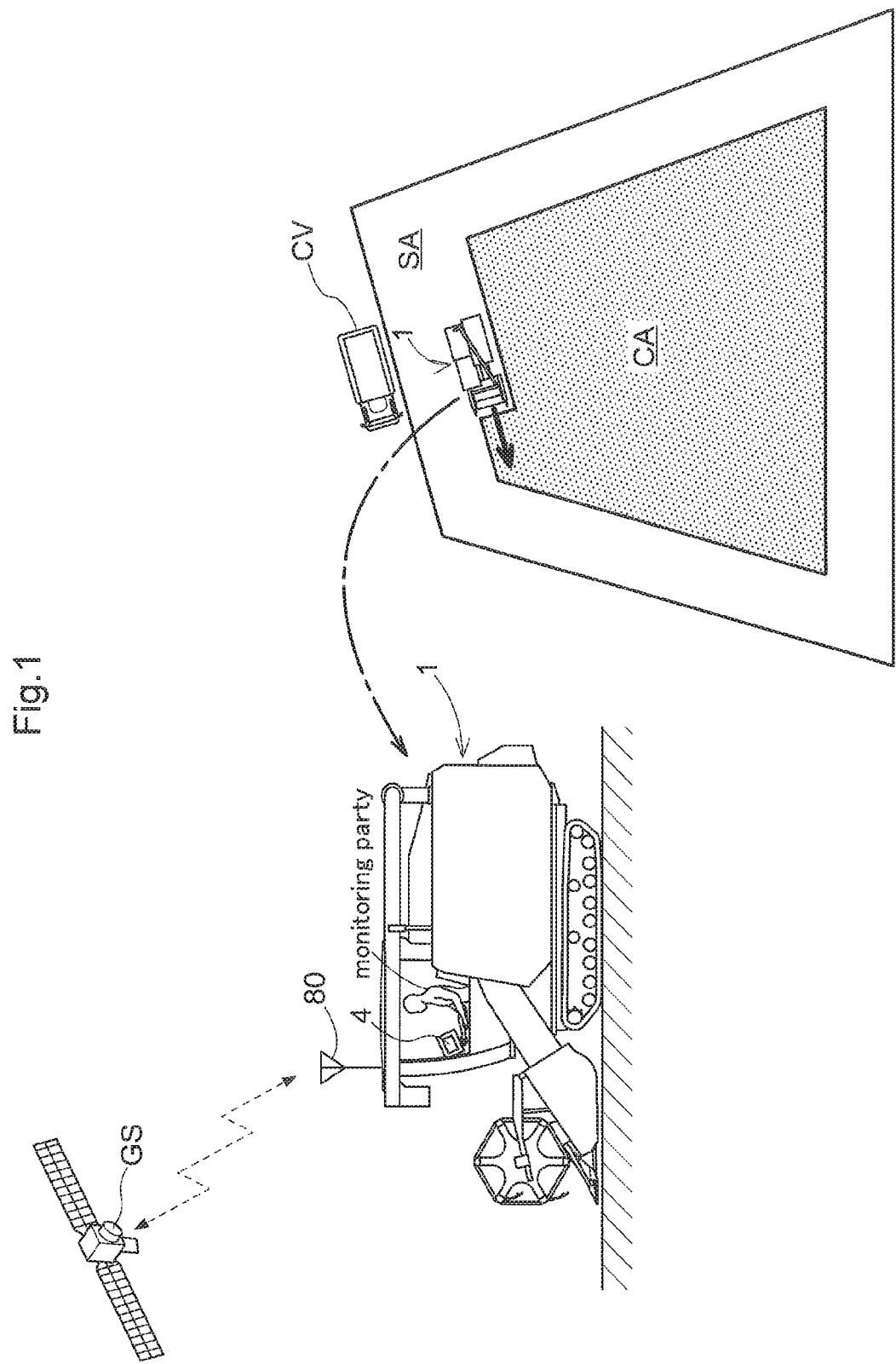
FIG. 1 is a diagram schematically illustrating work travel of a work vehicle in an area to be worked.

FIG. 1 schematically illustrates work travel using a travel route management system. In this embodiment, a work vehicle is a harvester 1 that, as work travel, carries out harvesting work (reaping work) for harvesting crops while traveling, and is a model typically called a normal-type combine. The work site where the harvester 1 travels for work is called a field. During harvesting work in the field, the area that the harvester 1 circles the border lines of the field, called a "ridge", is set as an outer peripheral area SA. The inner side of the outer peripheral area SA is set as an area CA to be worked. The outer peripheral area SA is used as a movement space for the harvester 1 to unload harvested crops, refuel, and the like, as a space for switching directions, and so on. To set the outer peripheral area SA, the harvester 1 circles the border line of the field three or four times as initial work travel. In the circling travel, the field is worked by an amount equivalent to the work width of the harvester 1 with each pass, and thus the outer peripheral area SA has a width approximately three to four times the work width of the harvester 1. Accordingly, unless specifically indicated otherwise, the outer peripheral area SA is treated as an already-harvested site (an already-worked site), whereas the area CA to be worked is treated as an unharvested area (an unworked site). Note that in this embodiment, the work width is handled as a value obtained by subtracting an overlap amount from a reaping width. However, the concept of the work width differs depending on the type of the work vehicle. The work width in the present invention is defined by the type of the work vehicle, the type of the work, and so on.

Note that the term "work travel" used in this application is used not only in reference to travel executed while actually carrying out work, but with a broader meaning encompassing travel carried out to change directions during the work, in a state where work is not being carried out.

Furthermore, in this specification, the term "work environment of the work vehicle" can include the state of the work vehicle, the state of the work site, commands from a person (a monitoring party, a driver, an administrator, or the like), and so on, and state information is found by evaluating the work environment. Mechanical factors such as refueling and unloading harvested crops, environmental factors such as changes in weather and the state of the work site, and furthermore, human requests such as unanticipated commands to suspend the work, are included in the state information. If multiple work vehicles are executing work travel in cooperation with each other, the positional relationships and so on between the work vehicles also correspond to the work environment or the state information. Note that the monitoring party, the administrator, or the like may be inside the work vehicle, near the work vehicle, or far from the work vehicle.

The harvester 1 includes a satellite positioning module 80 that outputs positioning data on the basis of a GPS signal from an artificial satellite GS used in GPS (global positioning systems). The harvester 1 has a function for calculating a vehicle position, which is positional coordinates of a specific part of the harvester 1, from the positioning data. The harvester 1 has an autonomous travel function that automates the traveling harvest work by steering so as to align a calculated vehicle position to a travel route serving as an objective. When unloading harvested crops that have been harvested while traveling, it is necessary for the harvester 1 to approach the vicinity of a transport vehicle CV, which itself is parked near the ridge, and park. When the parking position of the transport vehicle CV is determined in advance, this kind of approaching travel, i.e., temporarily deviating from the work travel in the area CA to be worked and then returning to the work travel, can also be achieved through autonomous travel. Travel routes for departing the area CA to be worked and returning to the area CA to be worked are generated at the point in time when the outer peripheral area SA is set. Note that a refueling vehicle or another work support vehicle can be parked instead of the transport vehicle CV.

Basic Flow of Autonomous Travel of Work Vehicle

For the harvester 1 incorporated into the travel route management system according to the present invention to carry out the harvesting work through autonomous travel, it is necessary to provide a travel route managing device that generates travel routes serving as objectives of the travel and manages those travel routes. The basic configuration of this travel route managing device, and a basic flow of autonomous travel control using the travel route managing device, will be described using FIGS. 2 to 4.

As illustrated in FIG. 2, having arrived at the field, the harvester 1 harvests a crop while circling the inner sides of the border lines of the field. This work is called circular harvesting and is well-known as harvesting work. At this time, forward and reverse travel is repeated in corner areas to ensure that no unreaped grain remains. This embodiment assumes that at least the outermost pass is made manually so that nothing is left unreaped and the vehicle does not collide with the ridge. The remaining interior passes may be carried out through autonomous travel using an autonomous travel program specifically for circular harvesting, or the manual travel may be continued after the circular harvesting in the outermost pass. As the shape of the area CA to be worked that remains on the inner side of the trajectory of this circling travel, a polygon that is as simple as possible, and preferably a quadrangle, is employed to favorably accommodate the autonomous work travel.

Furthermore, the trajectory of this circling travel can be obtained on the basis of a vehicle position calculated by a vehicle position calculating unit 53 from the positioning data of the satellite positioning module 80. Furthermore, outer shape data of the field, and particularly outer shape data of the area CA to be worked, which is the unharvested area located on the inner side of the circling travel trajectory, is generated by an outer shape data generating unit 43 on the basis of the travel trajectory. The field is managed by an area setting unit 44, as the outer peripheral area SA and the area CA to be worked, separately.

The work travel in the area CA to be worked is carried out through autonomous travel. As such, a travel route element set, which is a travel route for travel covering the area CA to be worked (travel that completely covers the work width), is managed by a route managing unit 60. This travel route element set is an aggregate of many travel route elements. The route managing unit 60 calculates the travel route element set on the basis of the outer shape data of the area CA to be worked, and stores the set in memory in a readable format. Additionally, as illustrated in FIG. 3, the form of the work travel route relative to the area CA to be worked is defined by a travel pattern set in response to user instructions. The route managing unit 60 manages the travel route element set that can create a travel route based on this travel pattern. If a plurality of types of travel patterns set by the user are prepared, the travel route element set that can be applied to any travel pattern is managed. If the travel patterns set by the user are limited to a single pattern, the travel route element set that can be applied to only that travel pattern may be managed as well.

According to this travel route management system, the travel pattern is set by a human, on the basis of user instructions, before the work travel in the area CA to be worked. In this embodiment, a pattern for spiral travel in which the area to be worked is subjected to spiral-shaped work travel from the outside toward the inside, and a travel pattern for linear back-and-forth travel of moving from the endpoint of a straight line-shaped travel route element to another straight line-shaped travel route element by following a U-turn travel route (corresponding to "back-and-forth travel" according to the present invention), can be given as basic travel patterns. These travel patterns will be described in greater detail later. Furthermore, in this travel route management system, all travel routes are not determined in advance before the work travel in the area CA to be worked. Rather, the travel routes can be changed midway through travel in accordance with circumstances such as the work environment of the work vehicle. Note that the minimum unit (link) between a point (node) and a point (node) where the travel route can be changed is a travel route element. When the autonomous travel is started from a specified location, the next travel route element, which is to be traveled next, is selected in sequence from the travel route element set by a route element selecting unit 63. As illustrated in FIG. 3, the route element selecting unit 63 basically selects travel route elements so as to create a travel route having a form based on the travel pattern that has been set. As such, the travel pattern set on the basis of user instructions is stored in a memory address that can be read out by the route element selecting unit 63 or the like. An autonomous travel controlling unit 511 generates autonomous travel data on the basis of the selected travel route element and the vehicle position, so that the vehicle follows that travel route element, and executes the autonomous travel. Note that if state information requesting a departure from the basic travel route is output by a work state evaluating unit 55, a travel route element to apply to that state information is selected.

With the autonomous work vehicle travel system illustrated in FIG. 4, an order is selected, from the travel route element set, for the travel route elements to be travelled on, in order to determine the overall travel route, before the work travel is carried out in the area CA to be worked. The route element selecting unit 63 has a function for creating the overall travel route or a partial travel route by selecting the travel route elements in travel order from the travel route element set. To that end, a basic route selection algorithm that outputs an adequate result without spending very much time, and a robust route selection algorithm that outputs a more accurate result by taking more time, are introduced into the route element selecting unit 63. Note that the minimum unit (link) between a point (node) and a point (node) where the travel route can be changed is a travel route element. When the autonomous travel is started from a designated location, next travel route elements which are to be traveled next are sent to the autonomous travel controlling unit 511 in order, on the basis of the selection order calculated by the route element selecting unit 63. The autonomous travel controlling unit 511 generates autonomous travel data on the basis of the selected travel route element in the vehicle position, so that the vehicle follows that travel route element, and executes the autonomous travel.

In FIGS. 2 to 4, a travel route generating device that generates the travel routes for the harvester 1 is constituted by the outer shape data generating unit 43, the area setting unit 44, and the route managing unit 60. The travel route determination device that determines the travel routes for the harvester 1 is constituted by the vehicle position calculating unit 53, the area setting unit 44, the route managing unit 60, and the route element selecting unit 63. The travel route generating device, the travel route determination device, and the like can be incorporated into a control system of the harvester 1, which is capable of conventional autonomous travel. Alternatively, the travel route generating device, the travel route determination device, and so on can be configured in a computer terminal, and the autonomous travel can be realized by connecting that computer terminal to the control system of the harvester 1 so as to be capable of exchanging data. The travel pattern based on user instructions can also be input to the control system of the work vehicle through data downloaded over a network. It is also possible to be input by the user directly through a user input device with which the harvester 1 is equipped.

Overview of Travel Route Element Set

As an example of the travel route element set, FIG. 5 illustrates a travel route element set in which multiple parallel dividing lines that divide the area CA to be worked into rectangular shapes serve as travel route elements. This travel route element set has straight line-shaped travel route elements, each element having two nodes (points on both ends; called "route changeable points", where the route can be changed, here) connected by a single link, with the elements being arranged in parallel. The travel route elements are set to be arranged at equal intervals by adjusting the overlap amount of work width. U-turn travel (e.g., travel that switches the direction by 180°) is carried out in order to move from an endpoint of a travel route element represented by one straight line to an endpoint of a travel route element represented by another straight line. Autonomous travel that connects such parallel travel route elements through U-turn travel will be called "linear back-and-forth travel" hereinafter. This U-turn travel includes normal U-turn travel and switchback turn travel. The normal U-turn travel is carried out only when the harvester 1 is moving forward, and the trajectory of that travel has a U shape. Switchback turn travel is carried out using both forward and reverse travel of the harvester 1, and although the trajectory of the travel is not a U shape, the harvester 1 ultimately switches the travel to the same direction as that achieved by the normal U-turn travel. The normal U-turn travel requires a distance that encloses two or more travel route elements between the route changeable point before switching the direction of travel and the route changeable point after switching the direction of travel. For shorter distances, switchback turn travel is used. In other words, unlike normal U-turn travel, switchback turn travel is carried out in reverse as well, which means that the turn radius of the harvester 1 has less of an effect, and there are more options for travel route elements to move to. However, because switchback turn travel involves switches in the forward and reverse directions, switchback turn travel generally takes more time than normal U-turn travel.

As another example of a travel route element set, FIG. 6 illustrates a travel route element set constituted by multiple mesh lines extending in the vertical and horizontal directions that divide the area CA to be worked into a mesh. Routes can be changed at points where mesh lines intersect (route changeable points) and both endpoints of the mesh lines (route changeable points). In other words, this travel route element set constructs a route network where the points of intersection and the end points of the mesh lines function as nodes and the sides of each mesh segmented by the mesh lines function as links, enabling travel having a high level of freedom. In addition to the above-described linear back-and-forth travel, "spiral travel" moving from the outside to the inside as indicated in FIG. 6, "zigzag travel", and so on, for example, are also possible. Furthermore, it is also possible to change from spiral travel to linear back-and-forth travel midway through work.

Concepts when Selecting Travel Route Element

Selection rules used when the route element selecting unit 63 selects the next travel route element, which is the next travel route element to be traveled in sequence, can be divided into static rules, which are set in advance before work travel (rules based on the set travel pattern), and dynamic rules, which are used in real time during work travel. The static rules include rules for selecting travel route elements on the basis of a predetermined basic travel pattern, e.g., selecting travel route elements so as to achieve linear back-and-forth travel while carrying out U-turn travel as illustrated in FIG. 5, rules for selecting travel route elements so as to achieve counterclockwise spiral travel moving from the outside to the inside as illustrated in FIG. 6, and so on. The dynamic rules include the state of the harvester 1, the state of the work site, commands from a monitoring party (including a driver, an administrator, and so on), in real time. In principle, dynamic rules are used preferentially over static rules. To that end, a work state evaluating unit 55 that evaluates the state of the harvester 1, the state of the work site, commands from the monitoring party, and so on, and outputs state information, is provided. Various types of primary information (a work environment) are input to the work state evaluating unit 55 as input parameters required for such evaluation. This primary information includes not only signals from various sensors and switches provided in the harvester 1, but also weather information, time information, external facility information from drying facilities or the like, and so on. Furthermore, when multiple harvesters 1 work cooperatively, the primary information also includes the state information of the other harvesters 1.

As illustrated in FIG. 4, the route element selecting unit 63 includes a first route element selecting unit 631 and a second route element selecting unit 632. The first route element selecting unit 631 calculates the selection order of the travel route elements for the overall travel route, on the basis of a basic priority rule created from the basic route selection algorithm that outputs an adequate result without spending very much time. The second route element selecting unit 632 recalculates the selection order of the recalculated travel route elements on the basis of a cost evaluation rule created from the robust route selection algorithm that outputs a more accurate result by taking more time. Note that the travel pattern for the work travel carried out in the area to be worked is set before the route element selecting unit 63 calculates the selection order. This travel pattern includes a linear back-and-forth travel pattern that realizes linear back-and-forth travel while carrying out U-turn travel, as illustrated in FIG. 5, for example. Before the work travel, the first route element selecting unit 631 calculates the selection order of the travel route elements for the overall travel route. The work vehicle can travel autonomously by taking the selected travel route elements as a target travel route. Once the selection order has been calculated by the first route element selecting unit 631, the work vehicle starts autonomous travel, and the selection order of the travel route elements is recalculated by the second route element selecting unit 632. The travel route elements that are the subject of the selection order recalculation by the second route element selecting unit 632 (the recalculated travel route elements) are untraveled travel route elements among the travel route elements selected by the first route element selecting unit 631. The selection order calculated by the first route element selecting unit 631 is rewritten with the selection order recalculated by the second route element selecting unit 632.

Overview of Harvester

FIG. 7 is a side view of the harvester 1 serving as the work vehicle employed in the descriptions of this embodiment. The harvester 1 includes a crawler-type vehicle body 11. A driving section 12 is provided on a front part of the vehicle body 11. A threshing device 13 and a harvested crop tank 14 that holds harvested crops are arranged in the left-right direction to the rear of a driving section 12. A harvesting section 15 is provided to the front of the vehicle body 11, with the height of the harvesting section 15 being adjustable. A reel 17 that raises grain is provided above the harvesting section 15, with the height of the reel 17 being adjustable. A transport device 16 that transports the reaped grain is provided between the harvesting section 15 and the threshing device 13. A discharge device 18 that discharges the harvested crops from the harvested crop tank 14 is provided in an upper part of the harvester 1. A load sensor that detects the weight of the harvested crops (an accumulation state of the harvested crops) is installed in a low part of the harvested crop tank 14, and a yield meter, a taste analyzer, and so on are installed within and around the harvested crop tank 14. Measurement data including moisture values and protein values of the harvested crops are output from the taste analyzer as quality data. The harvester 1 is provided with the satellite positioning module 80, which is constituted by a GNSS module, a GPS module, or the like. A satellite antenna for receiving GPS signals, GNSS signals, and so on is attached to an upper part of the vehicle body 11 as a constituent element of the satellite positioning module 80. Note that the satellite positioning module 80 can include an inertial navigation module incorporating a gyro accelerometer, a magnetic direction sensor, and so on in order to complement the satellite navigation.

In FIG. 7, the monitoring party (including a driver, an administrator, and the like), which monitors the movement of the harvester 1, boards the harvester 1, and brings a communication terminal 4, which the monitoring party uses for operation, into the harvester 1. However, the communication terminal 4 may be attached to the harvester 1. Furthermore, the monitoring party and the communication terminal 4 may be located outside the harvester 1.

The harvester 1 is capable of autonomous travel through autonomous steering, and manual travel through manual steering. Conventional autonomous travel, in which the overall travel route is determined in advance, and autonomous travel in which the next travel route is determined in real time on the basis of state information, are possible as the autonomous travel. In the present application, the former travel, in which the overall travel route is determined in advance, will be called "traditional travel", and the latter travel, in which the next travel route is determined in real time, will be called "autonomous travel", so as to handle the two as distinct concepts. The configuration is such that the routes of the traditional travel are registered in advance according to several patterns, or can be set as desired by the monitoring party using the communication terminal 4 or the like, for example.

Function Control Blocks for Autonomous Travel

Figure 8:
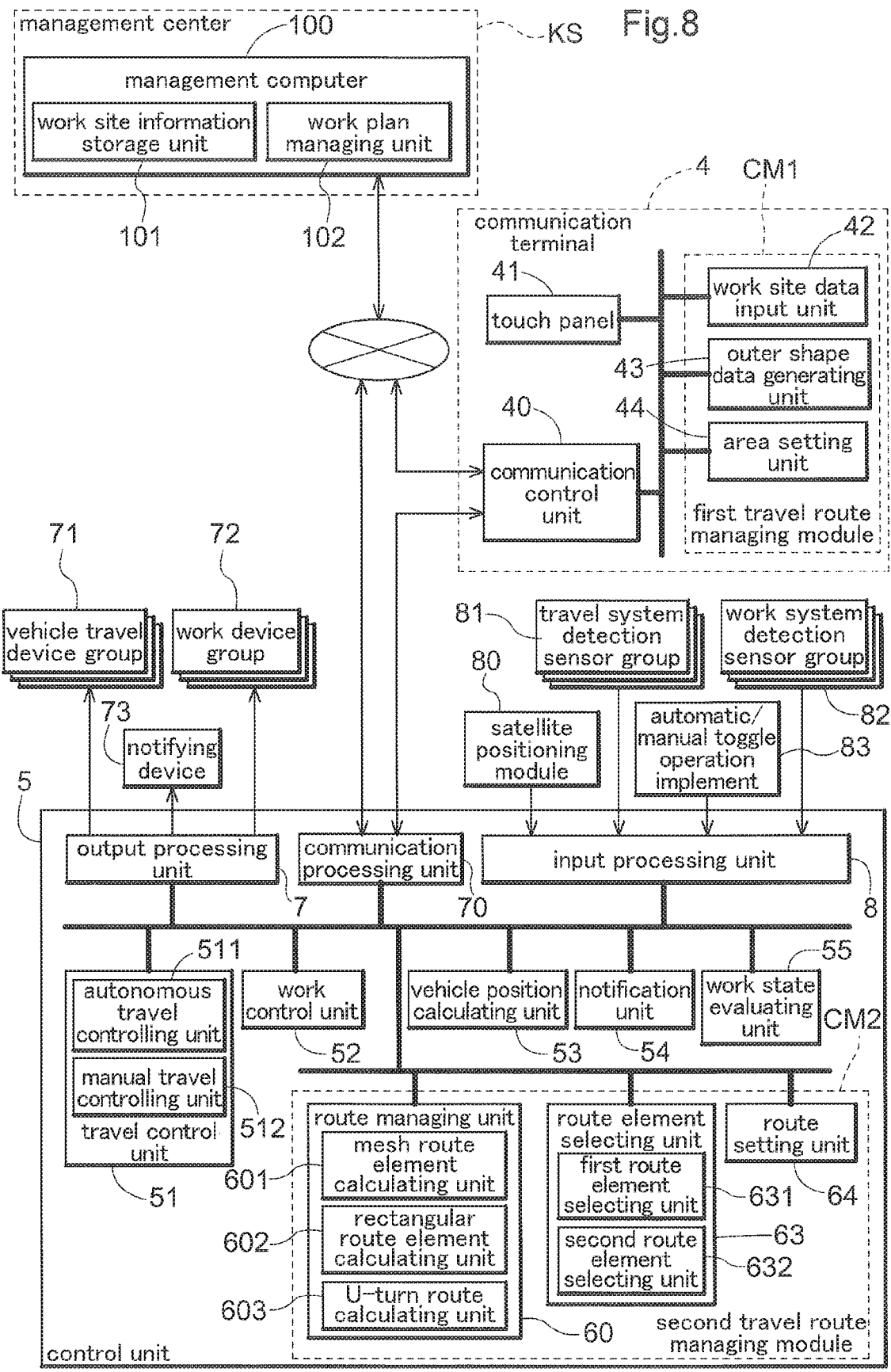
FIG. 8 is a control function block diagram illustrating a travel route management system.

FIG. 8 illustrates a control system constructed in the harvester 1, and a control system of the communication terminal 4. In this embodiment, the travel route managing device that manages travel routes for the harvester 1 is constituted by a first travel route managing module CM1 constructed in the communication terminal 4, and a second travel route managing module CM2 constructed in a control unit 5 of the harvester 1.

The communication terminal 4 includes a communication control unit 40, a touch panel 41, and so on, and functions as a computer system, a user interface function for inputting conditions required for autonomous travel realized by the control unit 5, and so on. By using the communication control unit 40, the communication terminal 4 can exchange data with a management computer 100 over a wireless connection or the Internet, and can also exchange data with the control unit 5 of the harvester 1 using a wireless LAN, a wired LAN, or another communication method. The management computer 100 is a computer system installed in a management center KS in a remote location, and functions as a cloud computer. The management computer 100 stores information sent from farmers, agricultural associations, agriculture industry groups, and so on, and can also send information in response to requests. FIG. 8 illustrates a work site information storage unit 101 and a work plan managing unit 102 as units that realize such server functions. The communication terminal 4 processes data on the basis of external data obtained from the management computer 100, the control unit 5 of the harvester 1, and so on through the communication control unit 40, and on the basis of input data such as user instructions (conditions necessary for autonomous travel, such as travel patterns) input through the touch panel 41. Results of this data processing are displayed in a display panel unit of the touch panel 41, and can also be sent from the communication terminal 4 to the management computer 100, the control unit 5 of the harvester 1, and so on through the communication control unit 40.

Field information including a topographical map of the vicinity of the field, attribute information of the field (exits and entries to the field, the direction of rows, and so on), and the like is stored in the work site information storage unit 101. The work plan managing unit 102 of the management computer 100 manages a work plan manual denoting the details of the work for a specified field. The field information and the work plan manual can be downloaded to the communication terminal 4, the control unit 5 of the harvester 1, and so on in response to an operation by the monitoring party or program executed automatically. The work plan manual includes various types of information (work conditions) pertaining to the work for the field designated to be worked. The following can be given as examples of this information (work conditions).
(a) travel patterns (linear back-and-forth travel, spiral travel, zigzag travel, and so on).
(b) the parking position of a support vehicle such as the transport vehicle CV, a parking position of the harvester 1 for unloading harvested crops or the like, and so on.
(c) the work format (work by a single harvester 1, or work by multiple harvesters 1).
(d) a so-called middle dividing line.
(e) values for the vehicle speed, the rotation speed of the threshing device 13, and so on based on the type of crop to be harvested (rice (Japonica rice, Indica rice), wheat, soybeans, rapeseed, buckwheat, and the like).
Settings for the travel device parameters, settings for the harvesting device parameters, and so on corresponding to the type of crop are made automatically on the basis of the information (e) in particular, which avoids setting mistakes.

Note that the position where the harvester 1 parks in order to unload harvested crops into the transport vehicle CV is a harvested crop unloading parking position, and the position where the harvester 1 parks in order to be refueled by a refueling vehicle is a refueling parking position. In this embodiment, these are set to substantially the same position.

The above-described information (a) to (e) may be input by the monitoring party through the communication terminal 4 serving as a user interface. The communication terminal 4 is also provided with an input function for instructing autonomous travel to start and stop, an input function for indicating whether the work travel is autonomous travel or traditional travel as described above, an input function for making fine adjustments to the values of parameters pertaining to a vehicle travel device group 71 including a travel speed variation device, a work device group 72 including the harvesting section 15 (see FIG. 8), and so on. The height of the reel 17, the height of the harvesting section 15, and so on can be given as examples of the values of the parameters of the work device group 72 to which fine adjustments can be made.

The state of the communication terminal 4 can, through an artificial switching operation, be switched to an animated display state indicating autonomous travel routes or traditional travel routes, a state of displaying the above-described parameters/fine adjustments, and so on. This animated display animates the travel trajectory of the harvester 1 traveling along the autonomous travel routes or traditional travel routes, which are travel routes in the autonomous travel or traditional travel in which the overall travel route has been determined in advance, and displays the animation in a display panel unit of the touch panel 41. Using this animated display, the driver can intuitively confirm the travel routes to be traveled on before the travel starts.

A work site data input unit 42 inputs the field information downloaded from the management computer 100, information obtained from the work plan manual or the communication terminal 4, or the like. A schematic diagram of the field, the positions of exits from and entrances to the field, a parking position for receiving support from a work support vehicle, and so on included in the field information are displayed in the touch panel 41. This makes it possible to assist the circling travel for forming the outer peripheral area SA carried out by the driver. If data such as the exits from and entrances to the field, the parking position, and so on is not included in the field information, the user can input that information through the touch panel 41. The outer shape data generating unit 43 calculates an accurate outer shape and outer dimensions of the field, and an outer shape and outer dimensions of the area CA to be worked, from travel trajectory data obtained from the control unit 5 when the harvester 1 carries out the circling travel (that is, time series data of the vehicle position). The area setting unit 44 sets the outer peripheral area SA and the area CA to be worked on the basis of the travel trajectory data from when the harvester 1 carries out the circling travel. Positional coordinates of the outer peripheral area SA and the area CA to be worked that have been set, i.e., the outer shape data of the outer peripheral area SA and the area CA to be worked, are used to generate the travel routes for autonomous travel. In this embodiment, the second travel route managing module CM2 constructed in the control unit 5 of the harvester 1 generates the travel routes, and thus the positional coordinates of the outer peripheral area SA and the area CA to be worked that have been set are sent to the second travel route managing module CM2.

If the field is large, work is carried out to create a middle-divided area, which divides the field into multiple segments using travel routes that intersect head-on. This work is called "middle dividing". The middle dividing position can also be specified through a touch operation made on a diagram of the outer shape of the work site displayed in the screen of the touch panel 41. Of course, the setting of the middle dividing position also affects the generation of the travel route element set for autonomous travel, and thus may be carried out automatically when generating the travel route element set. At that time, if the parking position of the harvester 1 for receiving support from a work support vehicle such as the transport vehicle CV is located on a line extending from the middle-divided area, the travel for unloading the harvested crops from all segments is carried out efficiently.

The second travel route managing module CM2 includes the route managing unit 60, the route element selecting unit 63, and a route setting unit 64. The route managing unit 60 calculates the travel route element set, which is an aggregate of multiple travel route elements constituting a travel route covering the area CA to be worked, and stores that set so as to be capable of readout. The route managing unit 60 includes a mesh route element calculating unit 601, a rectangular route element calculating unit 602, and a U-turn route calculating unit 603 as function units for calculating the travel route element set. The route element selecting unit 63 selects the next travel route element, which is to be traveled next, sequentially from the travel route element set, on the basis of various selection rules which will be described in detail later. Additionally, the route element selecting unit 63 includes the first route element selecting unit 631 and the second route element selecting unit 632 having the above-described functions. The route setting unit 64 sets the selected next travel route element as a target travel route for autonomous travel.

The mesh route element calculating unit 601 can calculate a travel route element set, which is a mesh line set constituted by mesh lines that divide the area CA to be worked into a mesh, and can also calculate positional coordinates of points of intersection between and endpoints of the mesh lines. These travel route elements correspond to the target travel route when the harvester 1 travels autonomously, and thus the harvester 1 can change the route from one travel route element to another travel route element at the points of intersection between and the endpoints of the mesh lines. In other words, the points of intersection between and the endpoints of the mesh lines function as the route changeable points that permit the harvester 1 to change its route.

Figure 9:
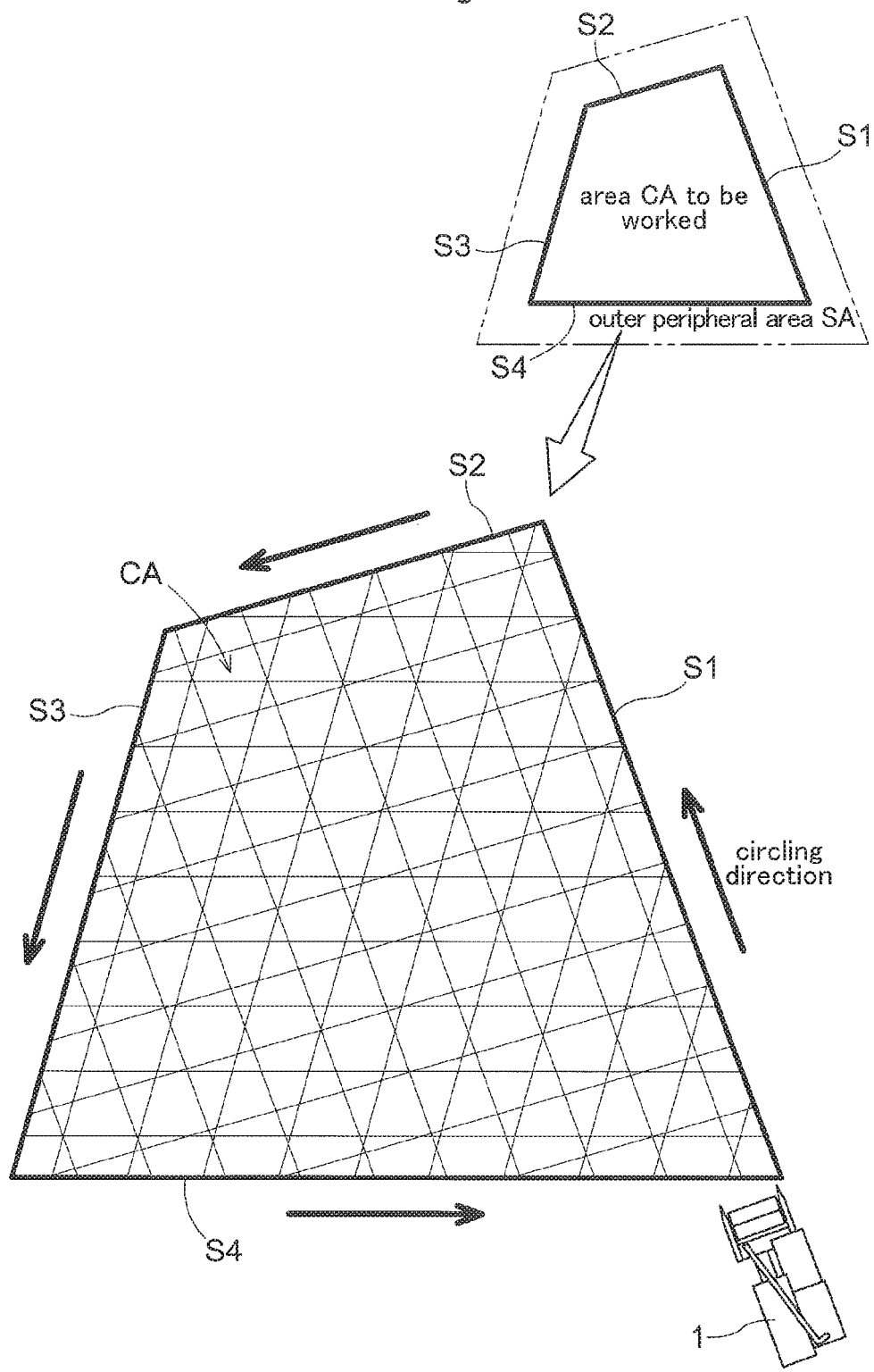
FIG. 9 is a diagram illustrating a method of calculating mesh lines, which are an example of a travel route element set.

FIG. 9 schematically illustrates the mapping of the mesh line set, which is an example of the travel route element set, onto the area CA to be worked. Using the work width of the harvester 1 as a mesh interval, the mesh route element calculating unit 601 calculates a travel route element set so as to completely cover the area CA to be worked with mesh lines. As described above, the area CA to be worked as an area on the inner side of the outer peripheral area SA, which is formed by making three to four circular passes, at the work width, from the border of the field toward the inside of the field. Accordingly, the area CA to be worked will basically have the same outer shape as the field. However, there are cases where the outer peripheral area SA is created so that the area CA to be worked is substantially polygonal, and preferably substantially quadrangular, to make it easier to calculate the mesh lines. In FIG. 9, the shape of the area CA to be worked is a deformed quadrangle constituted by a first side S1, a second side S2, a third side S3, and a fourth side S4.

As illustrated in FIG. 9, the mesh route element calculating unit 601 calculates a first straight line set, arranged on the area CA to be worked, from a position distanced from the first side S1 of the area CA to be worked by a distance equivalent to half the work width of the harvester 1, with the lines being parallel to the first side S1 and arranged at intervals equivalent to the work width of the harvester 1. Likewise, a second straight line set, arranged on the area CA to be worked, from a position distanced from the second side S2 by a distance equivalent to half the work width of the harvester 1, with the lines being parallel to the second side S2 and arranged at intervals equivalent to the work width of the harvester 1; a third straight line set, arranged on the area CA to be worked, from a position distanced from the third side S3 by a distance equivalent to half the work width of the harvester 1, with the lines being parallel to the third side S3 and arranged at intervals equivalent to the work width of the harvester 1; and a fourth straight line set, arranged on the area CA to be worked, from a position distanced from the fourth side S4 by a distance equivalent to half the work width of the harvester 1, with the lines being parallel to the fourth side S4 and arranged at intervals equivalent to the work width of the harvester 1, are calculated. In this manner, the first side S1 to the fourth side S4 serve as reference lines for generating the straight line sets serving as the travel route element set. If the positional coordinates of two points on a straight line are known, that straight line can be identified; thus each straight line serving as a travel route element is turned into data indicating a straight line defined by the positional coordinates of the two points on that straight line, and is stored in memory in a predetermined data format. This data format includes a route number serving as a route identifier for identifying that travel route element, as well as a route type, the side of the outer quadrangle serving as a reference, whether the element is untraveled/already traveled, and so on as attribute values of the travel route element.

Of course, the above-described calculation of the straight line groups can be applied to an area CA to be worked that is a polygon aside from a quadrangle. In other words, assuming the area CA to be worked is an N-cornered shape, where N is an integer of 3 or more, the travel route element set is constituted by N straight line sets, from a first straight line set to an Nth straight line set. Each straight line set includes straight lines arranged at predetermined intervals (the work width) parallel to one of the sides of the N-cornered shape.

Note that a travel route element set is set by the route managing unit 60 in the outer peripheral area SA as well. The travel route element set in the outer peripheral area SA is used when the harvester 1 travels in the outer peripheral area SA. The travel route element set in the outer peripheral area SA is given attribute values such as a departure route, a return route, an intermediate straight route for U-turn travel, and so on. "Departure route" refers to a travel route element set used for the harvester 1 to depart the area CA to be worked and enter the outer peripheral area SA. "Return route" refers to a travel route element set used for the harvester 1 to return from the outer peripheral area SA to the work travel in the area CA to be worked. The intermediate straight route for U-turn travel (referred to simply as an "intermediate straight route" hereinafter) is a straight line-shaped route constituting part of a U-turn travel route used during U-turn travel in the outer peripheral area SA. In other words, the intermediate straight route is a straight line-shaped travel route element set constituting a straight line part connecting a turning route at the start of U-turn travel with a turning route at the end of U-turn travel, and is a route provided parallel to each side of the area CA to be worked within the outer peripheral area SA. In work travel that begins as spiral travel and then switches to linear back-and-forth travel midway through, the unharvested area will become smaller than the area CA to be worked on all sides, depending on the spiral travel. Accordingly, executing U-turn travel within the area CA to be worked is better, in terms of making the work travel efficient, than expressly moving to the outer peripheral area SA. This eliminates wasteful travel and is efficient. Thus when executing U-turn travel in the area CA to be worked, the intermediate straight route is moved inward in a parallel manner, in accordance with the position of the outer peripheral line of the unharvested area.

In FIG. 9, the shape of the area CA to be worked is a deformed quadrangle. As such, there are four sides serving as references for generating the mesh route element set. Here, if the area CA to be worked is a rectangle or a square, there are two sides serving as references for generating the mesh route element set. In this case, the mesh route element set has a simpler structure.

In this embodiment, the route managing unit 60 is provided with the rectangular route element calculating unit 602 as an optional travel route element calculating unit. The travel route element set calculated by the rectangular route element calculating unit 602 is, as illustrated in FIG. 5, a parallel straight line set (corresponding to a "parallel line set" according to the present invention) which extends parallel to a reference side, e.g., the longest side, selected from the sides constituting the outer shape of the area CA to be worked, and which covers the area CA to be worked with the work width (completely covers with the work width). The travel route element set calculated by the rectangular route element calculating unit 602 divides the area CA to be worked into rectangular shapes. Furthermore, the travel route element set is an aggregate of parallel straight lines sequentially connected by U-turn travel routes over which the harvester 1 executes U-turn travel (corresponding to "parallel lines" according to the present invention). In other words, if the travel over one travel route element that is a parallel straight line ends, the U-turn route calculating unit 603 determines the U-turn travel route for moving to the next selected travel route element.

The U-turn route calculating unit 603 calculates the U-turn travel route for connecting two travel route elements, which have been selected from the travel route element set calculated by the rectangular route element calculating unit 602, using U-turn travel. Once the outer peripheral area SA and so on have been set, the U-turn route calculating unit 603 calculates a single intermediate straight route parallel to the outer peripheral side of the area CA to be worked, for each area of the outer peripheral area SA corresponding to outer peripheral sides (outer sides) of the area CA to be worked, on the basis of the outer shape and outer dimensions of the outer peripheral area SA, the outer shape and outer dimensions of the area CA to be worked, the turn radius of the harvester 1, and so on. Additionally, when normal U-turn travel and switchback turn travel are executed, the U-turn route calculating unit 603 calculates a start-side turning route connecting the travel route element currently traveled and the corresponding intermediate straight route, and an end-side turning route connecting the corresponding intermediate straight route and the destination travel route element. In other words, the U-turn route calculating unit 603 calculates, as the U-turn travel routes, a first U-turn travel route that realizes normal U-turn travel carried out only in the forward direction, and a second U-turn travel route that realizes switchback turn travel carried out in both the forward and reverse directions. The route element selecting unit 63 selects the next travel route element to be traveled next from the travel route element set, and selects the U-turn travel route calculated by the rectangular route element calculating unit 602 (the first U-turn travel route or the second U-turn travel route). The first U-turn travel route includes a rightward U-turn travel route and a leftward U-turn travel route. Although details will be given later as well, the route element selecting unit 63 has a rule stipulating that if there is a large gap between the currently-selected travel route element (the travel route element from which the movement starts) to the next travel route element to be traveled next (the destination travel route element), the first U-turn travel route is selected, whereas if the gap is small, the second U-turn travel route is selected. Furthermore, the route element selecting unit has a rule stipulating that a leftward U-turn travel route is to be selected preferentially over a rightward U-turn travel route. The principles of generating the U-turn travel route will be described later.

As illustrated in FIG. 8, the control unit 5 of the harvester 1, which constitutes the second travel route managing module CM2, is provided with various functions for executing work travel. The control unit 5 is configured as a computer system, and is provided with an output processing unit 7, an input processing unit 8, and a communication processing unit 70, as an input/output interface. The output processing unit 7 is connected to a vehicle travel device group 71, the work device group 72, a notifying device 73, and so on provided in the harvester 1. The vehicle travel device group 71 includes devices that are controlled so that the vehicle can travel, such as a steering device for adjusting the speed of left and right crawlers of the vehicle body 11 to execute steering, as well as a shifting mechanism, an engine unit, and so on (not shown). The work device group 72 includes devices constituting the harvesting section 15, the threshing device 13, the discharge device 18, and so on. The notifying device 73 includes a display, a lamp, a speaker, and the like. The outer shape of the field, as well as various types of notification information such as already-traveled travel routes (travel trajectories) and travel routes to be traveled next, are displayed in the display in particular. The lamp and speaker are used to notify the occupant (driver or monitoring party) of caution information or warning information such as travel caution items, deviation from target travel routes during autonomously-steered travel, and so on.

The communication processing unit 70 has a function for receiving data processed by the communication terminal 4, as well as sending data processed by the control unit 5. Accordingly, the communication terminal 4 can function as a user interface of the control unit 5. The communication processing unit 70 is furthermore used for exchanging data with the management computer 100, and thus has a function for handling a variety of communication formats.

The input processing unit 8 is connected to the satellite positioning module 80, a travel system detection sensor group 81, a work system detection sensor group 82, an automatic/manual toggle operation implement 83, and so on. The travel system detection sensor group 81 includes sensors that detect travel states, such as engine RPM, a shift state, and so on. The work system detection sensor group 82 includes a sensor that detects a height position of the harvesting section 15, a sensor that detects an amount held in the harvested crop tank 14, and so on. The automatic/manual toggle operation implement 83 is a switch that selects either an autonomous travel mode, which travels with autonomous steering, or a manual travel mode, which travels with manual steering. Additionally, a switch for switching between autonomous travel and traditional travel is provided in the driving section 12, or configured in the communication terminal 4.

Furthermore, the control unit 5 is provided with a travel control unit 51, a work control unit 52, the vehicle position calculating unit 53, and a notification unit 54. The vehicle position calculating unit 53 calculates the vehicle position on the basis of positioning data output from the satellite positioning module 80. Because the harvester 1 is configured to be capable of traveling through both autonomous travel (autonomous steering) and manual travel (manual steering), the travel control unit 51 that controls the vehicle travel device group 71 includes the autonomous travel controlling unit 511 and a manual travel controlling unit 512. The manual travel controlling unit 512 controls the vehicle travel device group 71 on the basis of operations made by the driver. The autonomous travel controlling unit 511 calculates directional skew and positional skew between the travel route set by the route setting unit 64 and the vehicle position, generates autonomous steering commands, and outputs the commands to the steering device via the output processing unit 7. The work control unit 52 supplies control signals to the work device group 72 in order to control the operations of operation devices provided in the harvesting section 15, the threshing device 13, the discharge device 18, and so on that constitute the harvester 1. The notification unit 54 generates notification signals (display data, audio data, and so on) for notifying the driver, the monitoring party, or the like of necessary information through the notifying device 73, which is a display or the like.

In addition to controlling the steering, the autonomous travel controlling unit 511 can also control the vehicle speed. As described above, the vehicle speed is set through the communication terminal 4 by an occupant, for example, before work is started. The vehicle speeds that can be set include a vehicle speed used during travel for harvesting, a vehicle speed used during turning when not harvesting (U-turn travel and the like), a vehicle speed used when departing the area CA to be worked and traveling the outer peripheral area SA when unloading harvested crops or refueling, and so on. The autonomous travel controlling unit 511 calculates an actual vehicle speed on the basis of the positioning data obtained by the satellite positioning module 80. The output processing unit 7 sends, to the vehicle travel device group 71, speed change operation commands or the like for the travel speed variation device so that the actual vehicle speed matches the set vehicle speed.

Autonomous Travel Routes

As examples of autonomous travel in the travel route management system, an example of linear back-and-forth travel, and an example of spiral travel will be described separately.

Figure 10:
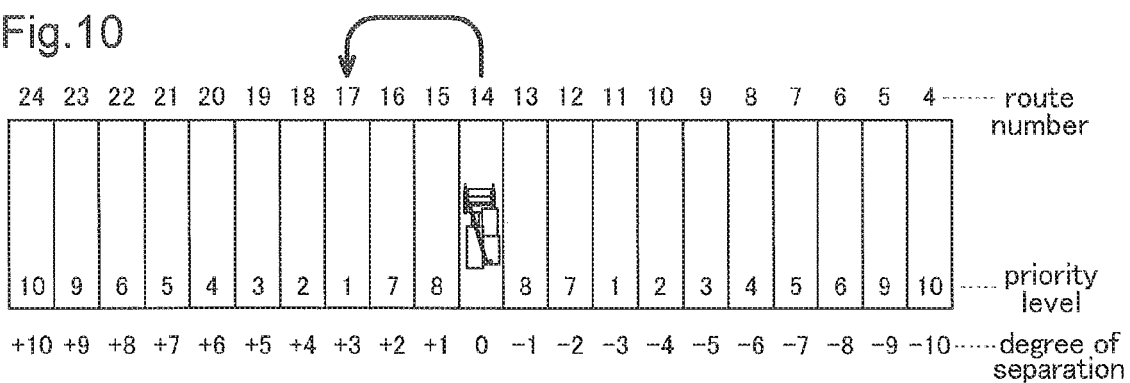
FIG. 10 is a diagram illustrating an example of a travel route element set calculated by a rectangular part element calculating unit.
Figure 11:
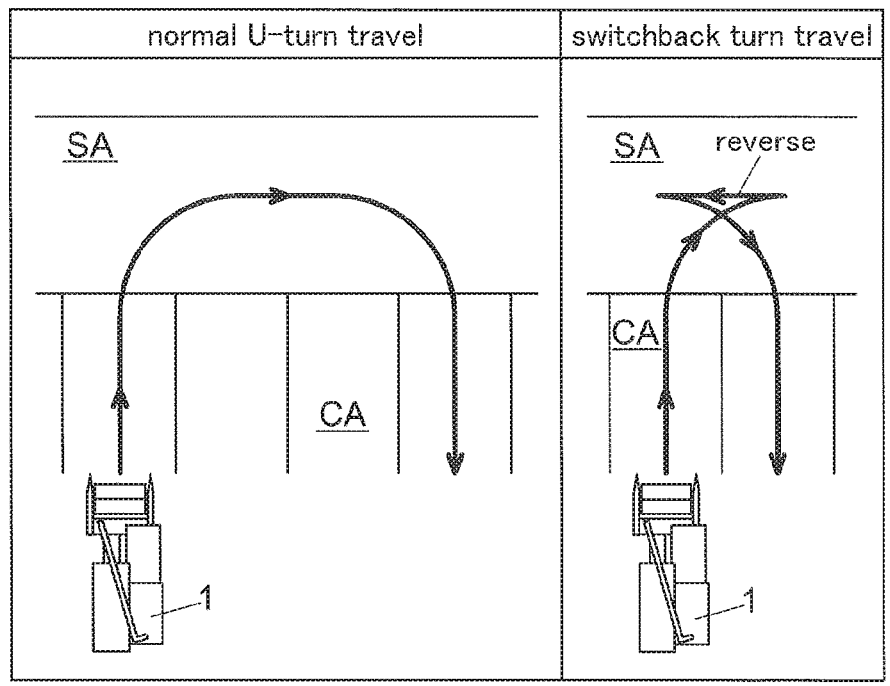
FIG. 11 is a diagram illustrating a normal U-turn and a switchback turn.

First, an example of linear back-and-forth travel using the travel route element set calculated by the rectangular route element calculating unit 602 will be described. FIG. 10 schematically illustrates a travel route element set constituted by 21 travel route elements expressed as rectangles with a shortened linear length, where route numbers are provided above each travel route element. The harvester 1 is positioned at the 14th travel route element when the work travel is started. The degrees of separation between the travel route element where the harvester 1 is positioned and the other travel route elements are indicated by the positive or negative integers provided below each of the routes. In FIG. 10, a priority level at which the harvester 1 positioned at the 14th travel route element is to move to the next travel route element is indicated by an integer value in the bottom part of each travel route element. A lower value indicates a higher priority level, and is selected preferentially. When moving from a travel route element for which travel has been completed to the next travel route element, the harvester 1 can execute normal U-turn travel, which is indicated in FIG. 11, or switchback turn travel. Here, normal U-turn travel is travel for moving to the next travel route element past at least two travel route elements. Switchback turn travel, on the other hand, is travel that enables movement passing less than two travel route elements, i.e., movement to an adjacent travel route element. In normal U-turn travel, the harvester 1 switches directions by approximately 180° upon entering the outer peripheral area SA from the endpoint of the travel route element being traveled, and enters an endpoint of the destination travel route element. If there is a large gap between the travel route element being traveled and the destination travel route element, the harvester 1 makes a turn of approximately 90°, continues straight for a corresponding distance, and then makes another approximately 90° turn. In other words, normal U-turn travel is executed using forward travel only. On the other hand, in switchback turn travel, when entering the outer peripheral area SA from an endpoint of the travel route element being traveled, the harvester 1 first turns approximately 90°, reverses to a position for entering into the destination travel route element smoothly using an approximately 90° turn, and then proceeds toward the endpoint of the destination travel route element. Although this does complicate the steering control, it also makes it possible to move to a travel route element only a short interval away.

The selection of the next travel route element to be traveled is made by the route element selecting unit 63. In this embodiment, basic priority levels for selecting the travel route element is set. In these basic priority levels, the priority level of a properly-distanced travel route element is set to be the highest. The "properly-distanced travel route element" is a travel route element separated by a predetermined distance from the previous travel route element in the order. The priority level is set to be lower for travel route elements further from the previous travel route element in the order than the properly-distanced travel route element. For example, when moving to the next travel route element, normal U-turn travel, which has a short travel distance, also has a short travel time and is therefore efficient. Accordingly, the priority level is set to the highest level (priority level=1) for the travel route elements that skip two spaces to the left and right. Travel route elements that from the perspective of the harvester 1 are located further than the stated travel route elements have longer normal U-turn travel times as the distance from the harvester 1 increases. Accordingly, the priority level is set to be lower (priority level=2, 3, . . . ) as the distance from the harvester 1 increases. In other words, the numerical value of the priority level indicates an order of priority. However, when moving to a travel route element that skips eight spaces, normal U-turn travel has a longer travel time and is less efficient than switchback turn travel. Accordingly, the priority level for movement to a travel route element that skips eight spaces is lower than that for switchback turn travel. In switchback turn travel, the priority level for moving to a travel route element that skips one space is higher than the priority level for moving to the adjacent travel route element. This is because switchback turn travel to an adjacent travel route element requires sharp steering, which is likely to damage the field. Although it is possible to move to the next travel route element in either the left or the right direction, a rule that prioritizes movement to a travel route element on the left side (a leftward U-turn travel route) over movement to a travel route element on the right side (a rightward U-turn travel route) is employed, as described above, in accordance with conventional work practices. Thus in the example illustrated in FIG. 10, the harvester 1 located at route number 14 selects the travel route element having a route number of 17 as the travel route element to be traveled to next. The priority level setting is carried out when the harvester 1 enters a new travel route element.

Figure 12:
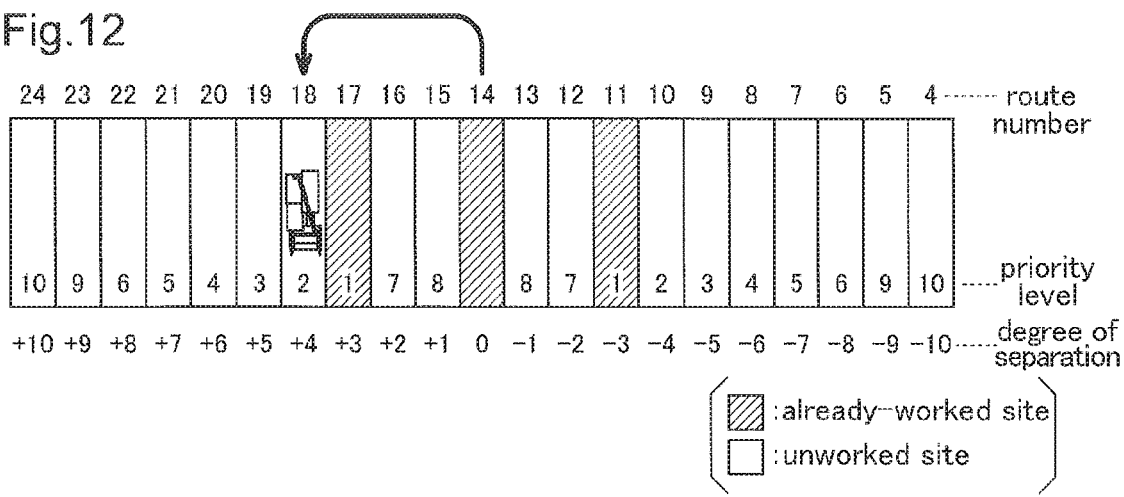
FIG. 12 is a diagram illustrating an example of the selection of a travel route element in the travel route element set illustrated in FIG. 10.

A travel route element that has already been selected, i.e., a travel route element for which work has already been completed is, as a rule, prohibited from being selected. Thus as illustrated in FIG. 12, if, for example, route number 11 or route number 17, which have priority levels of 1, are already-worked sites (already-harvested sites), the harvester 1 located at route number 14 selects the travel route element having a route number of 18, which has a priority level of 2, as the travel route element to be traveled next.

Autonomous travel using the first route element selecting unit 631 and the second route element selecting unit 632 will be described next. Here, an example of autonomous travel in the autonomous work vehicle travel system will be described using an example of linear back-and-forth travel using the travel route element set calculated by the rectangular route element calculating unit 602.

First, an example of linear back-and-forth travel using the travel route element set calculated by the rectangular route element calculating unit 602 will be described. FIG. 10 schematically illustrates a travel route element set constituted by 21 travel route elements expressed as rectangles with a shortened linear length, where route numbers are provided above each travel route element. The harvester 1 is positioned at the 14th travel route element when the work travel is started. The degrees of separation between the travel route element where the harvester 1 is positioned and the other travel route elements are indicated by the positive or negative integers provided below each of the routes. In FIG. 10, a priority level at which the harvester 1 positioned at the 14th travel route element is to move to the next travel route element is indicated by an integer value in the bottom part of each travel route element. A lower value indicates a higher priority level, and is selected preferentially. This priority level is based on the basic priority rule employed by the first route element selecting unit 631 of the route element selecting unit 63, and indicates an order of priority from the travel route element where the movement begins to the destination travel route element. As illustrated in FIG. 11, when moving from a travel route element that has been traveled to the next travel route element, the harvester 1 can carry out normal U-turn travel of moving to the next travel route element past at least two travel route elements, and switchback turn travel, in which the harvester 1 passes less than two travel route elements, i.e., can move to an adjacent travel route element. In normal U-turn travel, the harvester 1 switches directions by approximately 180° upon entering the outer peripheral area SA from the endpoint of the travel route element being traveled, and enters an endpoint of the destination travel route element. If there is a large gap between the travel route element being traveled and the destination travel route element, a corresponding amount of straight travel is present in the approximately 90° turn. In other words, normal U-turn travel is executed using forward travel only. On the other hand, in switchback turn travel, when entering the outer peripheral area SA from an endpoint of the travel route element being traveled, the harvester 1 first turns approximately 90°, reverses to a position for entering into the destination travel route element smoothly using an approximately 90° turn, and then proceeds toward the endpoint of the destination travel route element. Although this does complicate the steering control, it also makes it possible to move to a travel route element only a short interval away.

The selection of the next travel route element to be traveled is made by the first route element selecting unit 631 and the second route element selecting unit 632 of the route element selecting unit 63. According to the basic priority rule employed by the first route element selecting unit 631, the basic selection priority level is set so that the properly-distanced travel route element separated by a predetermined distance from the previous travel route element in the order has the highest priority level, with the priority level decreasing as the distance from the previous travel route element in the order increases compared to the properly-distanced travel route element. For example, when moving to the next travel route element, normal U-turn travel, which has a short travel distance, also has a short travel time and is therefore efficient. Accordingly, the priority level is set to the highest level (priority level=1) for the travel route elements that skip two spaces to the left and right. As the harvester 1 moves further away, the travel time for the normal U-turn travel increases, and thus the priority level decreases (priority level="2", "3", and so on). In other words, the numerical value of the priority level indicates an order of priority. However, when moving to a travel route element that skips eight spaces, normal U-turn travel has a longer travel time and is less efficient than switchback turn travel, and thus the priority level is lower than with switchback turn travel. In switchback turn travel, the priority level for moving to a travel route element that skips one space is higher than the priority level for moving to the adjacent travel route element. This is because switchback turn travel to an adjacent travel route element requires sharp steering, which is likely to damage the field. Although the movement to the next travel route element can be made in either the left or right direction, a rule that prioritizes movement to a travel route element to the left over movement to a travel route element to the right is employed in accordance with conventional work customs. Thus in the example illustrated in FIG. 10, the harvester 1 located at route number 14 selects the travel route element having a route number of 17 as the travel route element to be traveled to next. The priority level setting is carried out when the harvester 1 enters a new travel route element.

A travel route element that has already been selected, or to give a concrete example, a travel route element for which work has already been completed is, as a rule, prohibited from being selected. Thus as illustrated in FIG. 12, if, for example, route number 11 or route number 17, which have priority levels of 1, are already-worked sites (already-harvested sites), the harvester 1 located at route number 14 selects the travel route element having a route number of 18, which has a priority level of 2, as the travel route element to be traveled next.

Autonomous Travel Route Optimization

A specific example of a process by which the first route element selecting unit 631 and the second route element selecting unit 632 of the route element selecting unit 63 determine the travel route element selection order will be described next.

Figure 13:
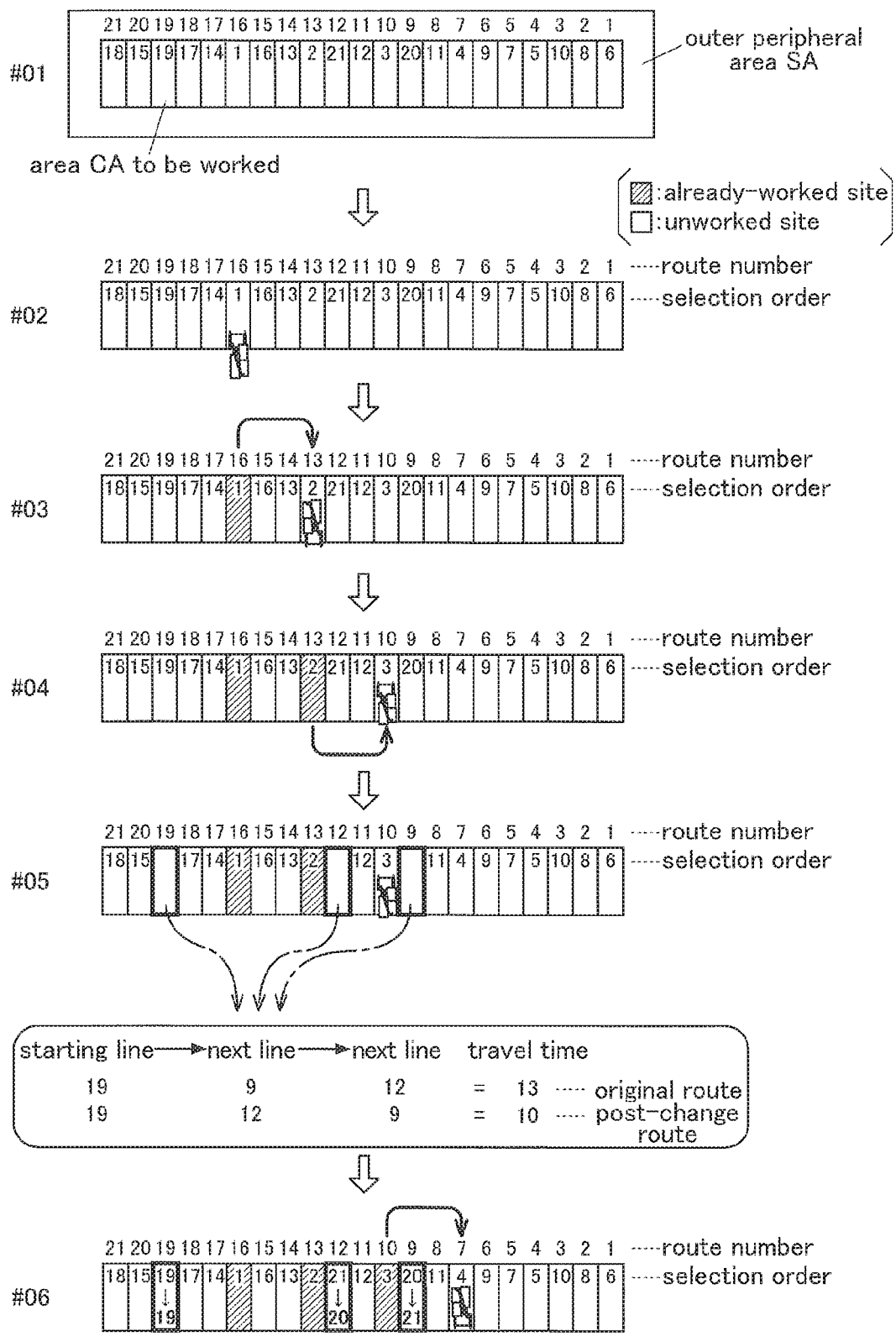
FIG. 13 is a diagram illustrating the flow of a special route selection algorithm when working with linear back-and-forth travel.

To simplify the descriptions, the travel route of the harvester 1 that carries out linear back-and-forth travel is determined by selecting the next travel route element to be traveled in sequence from a travel route element set such as that illustrated in FIG. 10, in this example as well. Accordingly, FIG. 12 illustrates a state partway through a travel route element selection order calculation process carried out by the first route element selecting unit 631. As with the travel route element set illustrated in FIG. 10, FIGS. 12 and 13 illustrate 21 rectangular travel route elements, with a route number added above each route. In FIG. 13, the order of selection used thus far is added at the center of the travel route element, rather than the priority level. Additionally, the selected travel route element, i.e., a travel route element that virtually speaking has already been traveled, is shaded. In this manner, each time the destination travel route element is determined, a priority level such as that indicated in FIG. 10 is set, using that travel route element as the current position of the harvester 1. The travel route element to be traveled next is determined on the basis of that priority level. The overall travel route is created by repeating this process.

Once the travel route element selection order has been calculated by the first route element selecting unit 631 and the travel route elements have been set by the route setting unit 64 on the basis of the calculated selection order, the work travel can be started. Note that the first route element selecting unit 631 employs the basic priority rule, in which the selection priority level is determined by the travel route element where the harvester 1 is located and the degree of separation (gap, distance) from the other travel route elements, and which has a lighter processing load. Accordingly, the selection order calculated by the first route element selecting unit 631 is not necessarily the appropriate selection order. As such, once the travel route element selection order has been calculated by the first route element selecting unit 631, the second route element selecting unit 632, which can calculate a more appropriate selection order, starts calculating a travel route element selection order. As described above, the second route element selecting unit 632 employs a cost evaluation rule that selects travel route elements while evaluating the cost so as to achieve a better work efficiency. A predetermined number (three or more) of travel route elements extracted from the end of the travel route element selection order provided by the first route element selecting unit 631 are subject to the computation by the second route element selecting unit 632.

Next, a work travel process carried out after the selection order for the overall travel route elements has been calculated by the first route element selecting unit 631 and the overall travel route has been created, and a correction process of rewriting the selection order of unworked travel route elements according to the travel route element selection order created by the second route element selecting unit 632, will be described using FIGS. 13 and 14.

Step #01

As described above, when the outer peripheral area SA is created through work executed by circling travel, the field is divided into the outer peripheral area SA and the area CA to be worked by the area setting unit 44, and furthermore, a travel route element set calculated by the rectangular route element calculating unit 602 is set in the area CA to be worked. The current position of the harvester 1 or a position input by the monitoring party through the communication terminal 4 is employed as the work travel starting point. Here, one end of route number 16 is selected as the work travel starting point.

Step #02

Once the autonomous travel is instructed to start, work travel is executed from the endpoint of the travel route element having a route number of 16, which is the travel work starting point, and follows that travel route element.

Step #03

The travel route element having the route number of 13 is selected on the basis of the overall travel route set by the route setting unit 64, as calculated by the first route element selecting unit 631, and work travel that follows that travel route element is executed.

Step #04 Likewise, the work travel executed thereafter progresses sequentially on the basis of the overall travel route set by the route setting unit 64.

Step #05

It is assumed that at this stage, the travel route element selection order has been calculated by the second route element selecting unit 632. The second route element selecting unit 632 extracts three travel route elements starting with the final travel route element in the selection order calculated by the first route element selecting unit 631, begins calculating the optimal travel order among those travel route elements, and once the actual travel has progressed as far as route number 10 (the third in the selection order of the provisional overall travel route), calculates the optimal selection order for traveling the remaining two travel route elements after traveling the third from the final travel route element. In the example indicated in step #05 of FIG. 13, the original selection order is "route number 19→route number 9→route number 12 (travel time/movement amount: 13)", whereas the recalculated selection order is "route number 19→route number 12→route number 9 (travel time/movement amount: 10)", and thus by comparing the two, it is determined that the recalculated selection order has a shorter travel time (movement amount). In other words, the recalculated selection order is the optimal route selection.

Step #06

The selection order of the corresponding travel route elements is replaced with the selection order recalculated in step #05. During this time, the harvester 1 is moving in route number 7, which is fourth in the selection order according to the provisional overall travel route. However, there is still sufficient time for the harvester 1 that is actually traveling to reach route number 19, which is 19th in the post-replacement selection order, by following the unreplaced original selection order. In other words, the recalculation of the selection order is repeated while increasing the predetermined number of travel route elements extracted one at a time from the final travel route element in the provisional overall travel route, until the travel route elements actually traveled are included in the travel route elements extracted for the recalculation. As a result, a greater number of travel route elements will take on the appropriate selection order. However, there are also cases where the recalculated selection order is the same as the selection order of the provisional overall travel route, and the above-described replacement is skipped in such a case. Note that this embodiment is merely one example for describing the aforementioned algorithm, and for example, the selection order according to the provisional overall travel route set may include parts that do not follow the basic rules described on the basis of FIGS. 10 to 12.

The algorithm for changing the selection order, carried out in the above-described steps #05 and #06, will be described next using FIG. 14.

Figure 14:
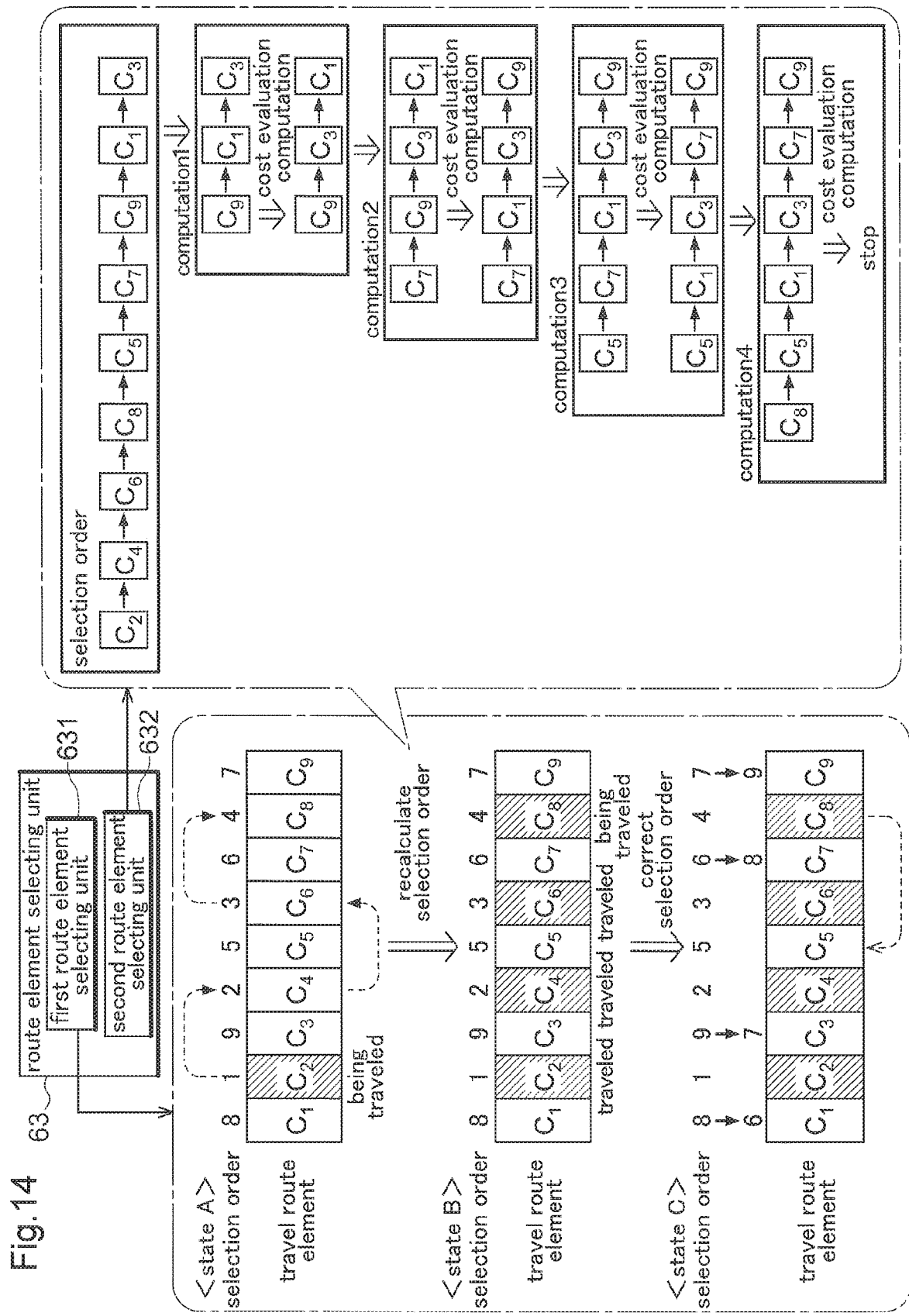
FIG. 14 is a diagram illustrating the flow of a route selection correction algorithm that rewrites a travel route element selection order.

In FIG. 14, nine travel route elements are indicated by C1 to C9. State A, which is the initial state, has the selection order calculated by the first route element selecting unit 631 using the above-described basic priority rule. Assume that the departure travel route element is C2, and the selection order that follows thereafter, i.e., the order of travel, is calculated as C2-C4-C6-C8-C5-C7-C9-C1-C3. The work travel is started, the travel route elements are selected in order, and the harvester 1 travels, while at the same time, the second route element selecting unit 632 partially recalculates the selection order on the basis of the algorithm for changing the selection order.

Here, the change algorithm first extracts the three travel route elements C9-C1-C3 from the end of the selection order calculated by the first route element selecting unit 631. The cost when traveling along these three travel route elements is calculated on the basis of the cost evaluation rule. Fuel consumption, travel time, and the like can be given as examples of the cost employed by the cost evaluation rule, but it is preferable to employ the movement distance of movement between travel route elements (U-turn travel), which is easier to calculate. If a selection order having a lower cost than the calculated cost is found, the selection order of the three extracted travel route elements is changed according to the found selection order. Thus the new selection order becomes C9-C3-C1 (computation 1).

Furthermore, the travel route element C7, which is fourth from the end, is additionally extracted for the selection order to be changed, and the selection order of the four travel route elements C7-C9-C3-C1 is evaluated on the basis of the cost evaluation rule. In the example illustrated here, the selection order of C7-C9-C3-C1 is changed to C7-C1-C3-C9 (computation 2). This type of computation is carried out sequentially while extracting additional new travel route elements to have their selection order changed (computation 3). The repeated computations based on the cost evaluation rule are stopped when the additionally-extracted travel route elements are actually traveled on. In the example of FIG. 14, state B is a state where the travel route element C8 is being traveled on, and in computation 4, the travel route element C8 is extracted as the newest additionally-extracted travel route element. Thus at this point in time, computation 4 is stopped, and the route setting unit 64 changes the selection order C5-C1-C3-C7-C9, which is the result of computation 3, to the selection order following the travel route element C8. As a result, the order of the travel route elements traveled by the harvester 1 is changed from the original selection order calculated on the basis of the basic priority rule, namely C2-C4-C6-C8-C5-C7-C9-C1-C3, to C2-C4-C6-C8-C5-C1-C3-C7-C9, in light of the cost.

In this manner, work travel that follows the most appropriate travel route possible is realized by correcting the selection order calculated by the first route element selecting unit 631, which has a light processing load, with the selection order calculated by the second route element selecting unit 632, which has a heavier processing load but can select a route providing better work efficiency. While the second route element selecting unit is carrying out computations, the work vehicle is already traveling for work, and thus the computation time of the second route element selecting unit does not delay the work travel.

FIG. 15 illustrates an example of spiral travel using travel route elements calculated by the mesh route element calculating unit 601. The outer peripheral area SA and the area CA to be worked in the field illustrated in FIG. 15 are the same as those illustrated in FIG. 9, as is the travel route element set that has been set for the area CA to be worked. Here, for descriptive purposes, travel route elements taking the first side S1 as a reference line are indicated by L11, L12, and so on, travel route elements taking the second side S2 as a reference line are indicated by L21, L22, and so on, travel route elements taking the third side S3 as a reference line are indicated by L31, L32, and so on, and travel route elements taking the fourth side S4 as a reference line are indicated by L41, L42, and so on.

The bold lines in FIG. 15 represent a spiral-shaped travel route traveled by the harvester 1 from the outside toward the inside. The travel route element L11, which is located in the outermost pass of the area CA to be worked, is selected as the first travel route. A route change of substantially 90° is made at the point of intersection between the travel route element L11 and the travel route element L21, after which the harvester 1 travels on the travel route element L21. Furthermore, a route change of substantially 70° is made at the point of intersection between the travel route element L21 and the travel route element L31, after which the harvester 1 travels on the travel route element L31. A route change of substantially 110° is made at the point of intersection between the travel route element L31 and the travel route element L41, after which the harvester 1 travels on the travel route element L41. Next, the harvester 1 moves to the travel route element L12 on the inside of the travel route element L11 at the point of intersection between the travel route element L12 and the travel route element L41. By repeating such travel route element selection, the harvester 1 executes work travel in a spiral shape, moving from the outside to the inside of the area CA to be worked in the field. Thus when a spiral travel pattern is set, the harvester 1 switches directions by making route changes at the points of intersection between travel route elements that both have an untraveled attribute and are located in the outermost pass of the area CA to be worked.

FIG. 16 illustrates an example of U-turn travel using the same travel route element set as that illustrated in FIG. 15. First, the travel route element L11, which is located in the outermost pass of the area CA to be worked, is selected as the first travel route. The harvester 1 passes a following end (endpoint) of the travel route element L11, enters the outer peripheral area SA, makes a 90° turn so as to follow the second side S2, and furthermore makes another 90° turn so as to enter a leading end (endpoint) of the travel route element L14 extending parallel to the travel route element L11. As a result, the harvester 1 moves from the travel route element L11 to the travel route element L14 having skipped two travel route elements, through normal U-turn travel of 180°. Furthermore, after traveling the travel route element L14 and entering the outer peripheral area SA, the harvester 1 executes normal U-turn travel of 180°, and then moves to the travel route element L17 extending parallel to the travel route element L14. In this matter, the harvester 1 moves from the travel route element L17 to a travel route element L110, and furthermore from the travel route element L110 to the travel route element L16, ultimately completing the work travel for the entire area CA to be worked in the field. As is clear from the foregoing descriptions, the example of linear back-and-forth travel using the travel route element set from the rectangular route element calculating unit 602, which has been described using FIGS. 10, 11, and 12, can also be applied to the linear back-and-forth travel using the travel route elements calculated by the mesh route element calculating unit 601.

Accordingly, linear back-and-forth travel can be achieved using a travel route element set that divides the area CA to be worked into rectangular shapes, as well as using a travel route element set that divides the area CA to be worked into a mesh shape. To rephrase, a travel route element set that divides the area CA to be worked into a mesh shape can be used in linear back-and-forth travel, spiral travel, and zigzag travel, and furthermore, the travel pattern can be changed from spiral travel to linear back-and-forth travel midway through the work. Furthermore, the travel route element selection order technique using the first route element selecting unit 631 and the second route element selecting unit 632 can be applied in linear back-and-forth travel using the travel route element set illustrated in FIG. 16.

Principle of Generating U-Turn Travel Route

Figure 17:
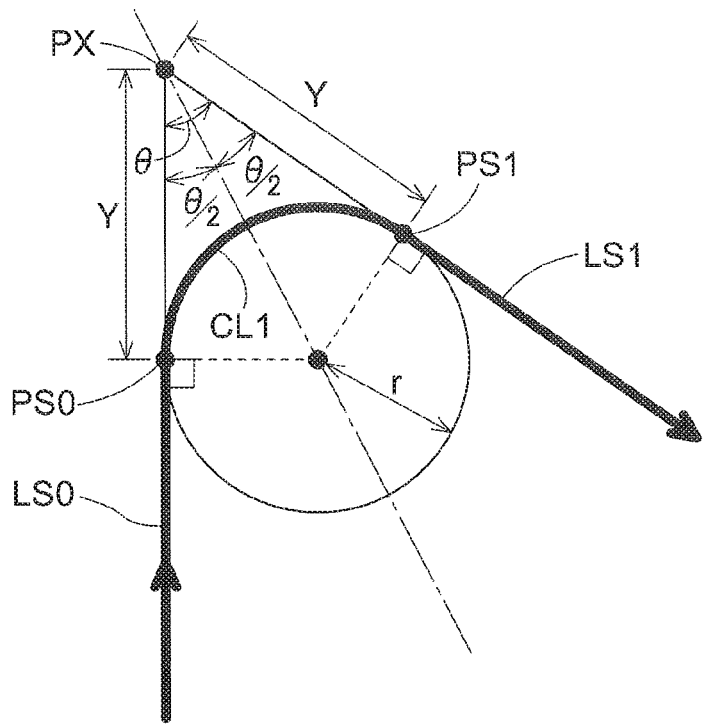
FIG. 17 is a diagram illustrating the basic principle of generating a U-turn travel route.

A basic principle by which the U-turn route calculating unit 603 generates a U-turn travel route will be described using FIG. 17. FIG. 17 illustrates a U-turn travel route in which the harvester 1 moves from a travel route element corresponding to the start of the turn, indicated by LS0, to a travel route element indicating the destination of the turn, indicated by LS1. In normal travel, if LS0 is a travel route element in the area CA to be worked, LS1 is typically a travel route element in the outer peripheral area SA (an intermediate straight route), whereas if LS1 is a travel route element in the area CA to be worked, LS0 is typically a travel route element in the outer peripheral area SA (an intermediate straight route). A linear equation (or two points on the straight lines) for the travel route elements LS0 and LS1 are recorded in memory, and the point of intersection between the two (indicated by PX in FIG. 17) and an angle of intersection (indicated by θ in FIG. 17) are calculated from that linear equation. Next, an inscribed circle contacting both the travel route element LS0 and the travel route element LS1, and having a radius equivalent to the minimum turn radius of the harvester 1 (indicated by r in FIG. 17), is calculated. An arc (part of the inscribed circle) connecting the points of contact between the travel route elements LS0 and LS1 with the inscribed circle (indicated by PS0 and PS1 in FIG. 17) corresponds to the turning route. Accordingly, a distance Y to a point of contact between the intersection point PX of the travel route elements LS0 and LS1, and the points of contact, is given by:

$$Y = r/(\tan(\theta/2))$$

Because the minimum turn radius is substantially set by the specifications of the harvester 1, r is a control value. Note that r need not be the same value as the minimum turn radius. A less extreme turn radius may be set in advance by the communication terminal 4 or the like, and the turn operation may be programmed so as to follow that turn radius. In terms of travel control, the harvester 1 starts the turning travel when the positional coordinates (PS0) where the distance to the point of intersection is Y are reached while traveling the travel route element LS0 where the turn starts; next, the turning travel ends when a difference between the direction of the harvester 1 during turning travel and the direction of the travel route element LS1 serving as the turn destination falls within a permissible value. At this time, the turn radius of the harvester 1 need not perfectly match the radius r. Controlling the steering on the basis of the distance and directional difference from the travel route element LS1 serving as the turn destination makes it possible for the harvester 1 to move to the travel route element LS1 serving as the turn destination.

Figure 18:
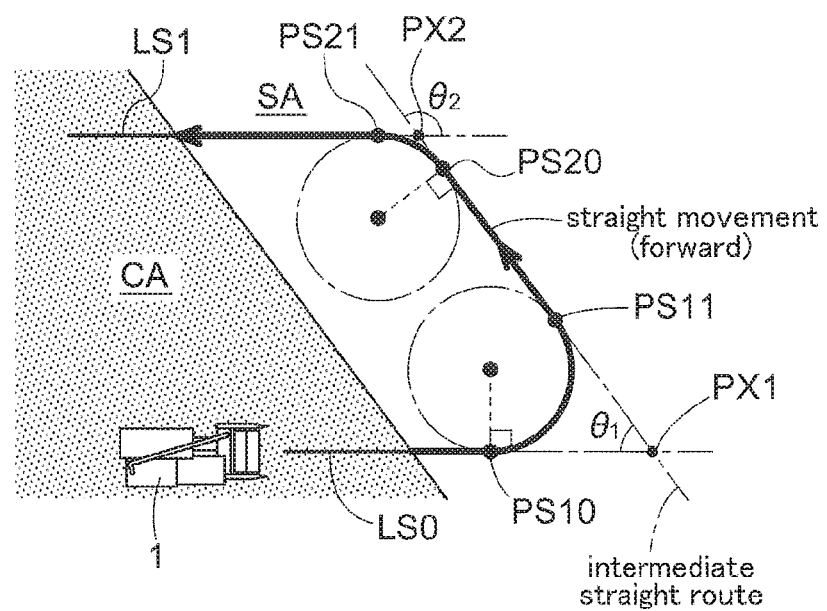
FIG. 18 is a diagram illustrating an example of a U-turn travel route generated on the basis of the generation principle illustrated in FIG. 17.
Figure 19:
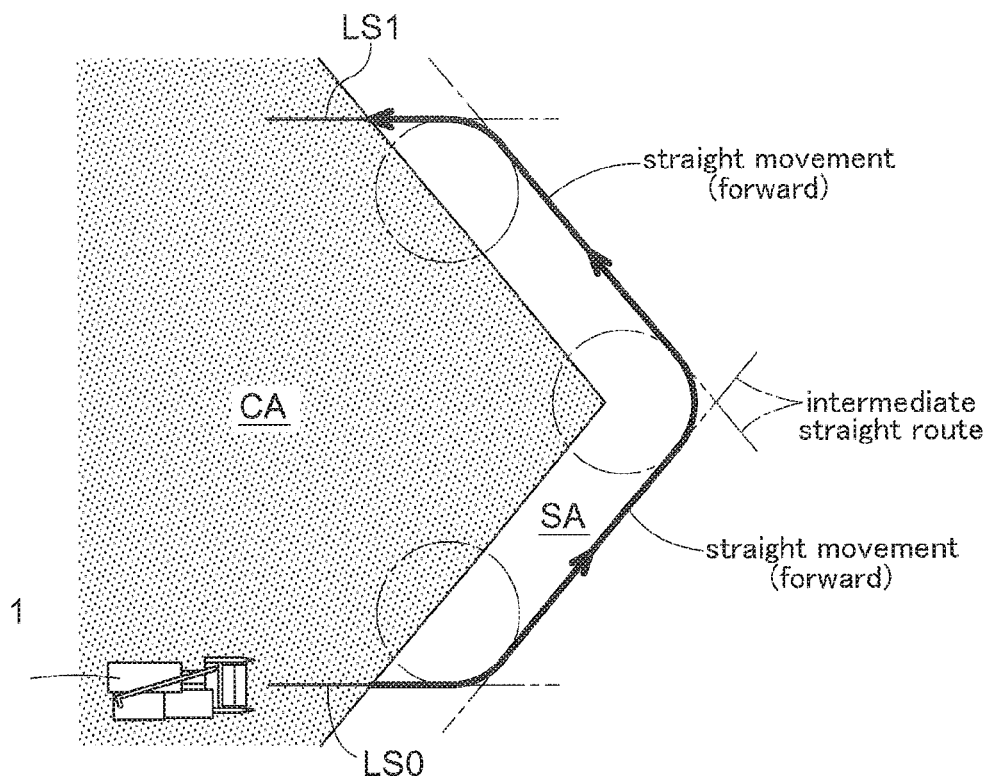
FIG. 19 is a diagram illustrating an example of a U-turn travel route generated on the basis of the generation principle illustrated in FIG. 17.
Figure 20:
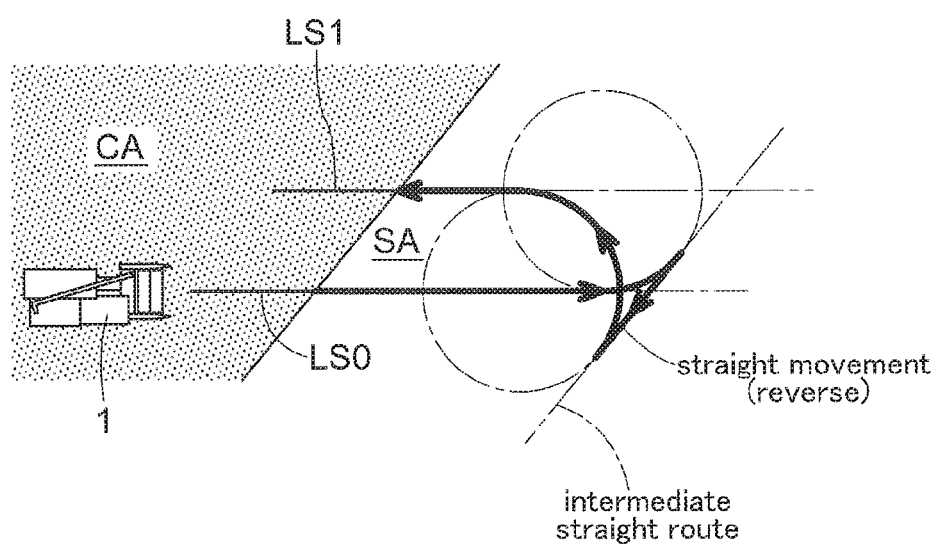
FIG. 20 is a diagram illustrating an example of a U-turn travel route generated on the basis of the generation principle illustrated in FIG. 17.

FIGS. 18, 19, and 20 illustrate three specific examples of U-turn travel. In FIG. 18, the travel route element LS0 where the turn is started and the travel route element LS1 serving as the turn destination extend at an angle from an outer side of the area CA to be worked, but may extend perpendicular as well. Here, the U-turn travel route in the outer peripheral area SA is constituted by lines extending from the travel route element LS0 and the travel route element LS1 into the outer peripheral area SA, an intermediate straight route corresponding to part (a line segment) of the travel route element in the outer peripheral area SA, and two arc-shaped turning routes. This U-turn travel route can also be generated according to the basic principle described using FIG. 17. An angle of intersection θ1 and a point of intersection PX1 between the intermediate straight route and the travel route element LS0 where the turn is started, and an angle of intersection θ2 and a point of intersection PX2 between the intermediate straight route and the travel route element LS1 serving as the destination of the turn, are calculated. Furthermore, the positional coordinates of contact points PS10 and PS11 where the inscribed circle having the radius r (=the turn radius of the harvester 1) makes contact with the travel route element LS0 where the turn is started and the intermediate straight route, and the positional coordinates of contact points PS20 and PS21 where the inscribed circle having the radius r makes contact with the intermediate straight route and the travel route element LS1 serving as the destination of the turn, are calculated as well. The harvester 1 begins the turns at the contact points PS10 and PS20. Likewise, a U-turn travel route for an area CA to be worked, which has been formed protruding in a triangular shape as indicated in FIG. 19, that skirts around that protruding triangular shape, can be generated in the same manner. The points of intersection between the travel route elements LS0 and LS1 and two intermediate straight routes corresponding to parts (line segments) of the travel route element in the outer peripheral area SA are found. The basic principle described using FIG. 17 is applied in the calculation of those points of intersection.

FIG. 20 illustrates turning travel achieved through switchback turn travel, where the harvester 1 moves from the travel route element LS0 where the turn is started to the travel route element LS1 serving as the destination of the turn. In this switchback turn travel, an inscribed circle having the radius r, which makes contact with an intermediate straight route that is a part (a line segment) of the travel route element in the outer peripheral area SA and that is parallel to an outer side of the area CA to be worked, and also makes contact with the travel route element LS0, is calculated. Additionally, an inscribed circle having the radius r, which makes contact with the stated intermediate straight route and the travel route element LS1, is also calculated. In accordance with the basic principle described using FIG. 17, the positional coordinates of the points of contact between the two inscribed circles and the intermediate straight route, the positional coordinates of the points of contact between the travel route element LS0 where the turn is started and the inscribed circle, and the positional coordinates of the point of contact between the travel route element LS1 serving as the destination of the turn and the inscribed circle are calculated. The U-turn travel route for switchback turn travel is generated as a result. Note that the harvester 1 travels in reverse in the intermediate straight route in this switchback turn travel.

Travel for Switching Directions in Spiral Travel

Figure 21:
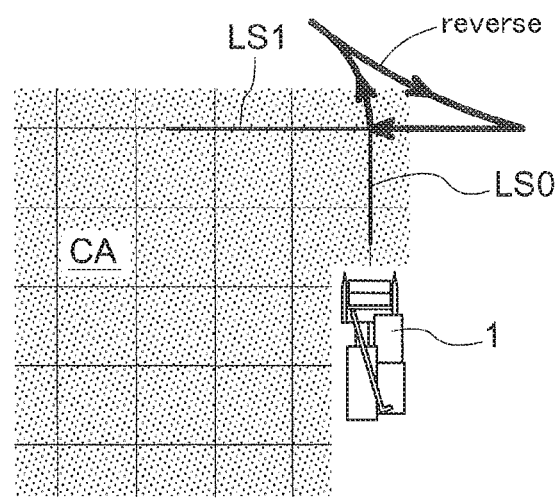
FIG. 21 is a diagram illustrating an α-turn travel route in a mesh-shaped travel route element set.

FIG. 21 illustrates an example of travel for switching directions, used for changing the route at a point of intersection corresponding to the route changeable point of the travel route element, in the above-described spiral travel. This travel for switching directions will be referred to as α-turn travel hereinafter. The travel route (α-turn travel route) in this α-turn travel is one kind of a so-called counter travel route, and is a route extending from the point of intersection between the travel route element where the travel starts (indicated by LS0 in FIG. 21) and the travel route element serving as the destination of the turn (indicated by LS1 in FIG. 21), passing forward through a turning route, and making contact with a travel route element serving as the destination of the turn through a turning route in reverse. The α-turn travel route is standardized, and thus the α-turn travel route generated in accordance with the angle of intersection between the travel route element where the travel starts and the travel route element serving as the destination of the turn is registered in advance. Accordingly, the route managing unit 60 reads out the proper α-turn travel route on the basis of the calculated angle of intersection, and provides the route setting unit 64 with the α-turn travel route. However, a configuration in which an automatic control program is registered in the autonomous travel controlling unit 511 for each angle of intersection, and the autonomous travel controlling unit 511 reads out the proper automatic control program on the basis of the angle of intersection calculated by the route managing unit 60, may be employed instead of this configuration. This α-turn travel route is a travel route for switching directions, selected by the route element selecting unit 63 when setting the travel pattern for creating the spiral travel.

Route Selection Rules

The route element selecting unit 63 sequentially selects the travel route elements on the basis of travel patterns input manually from a work plan manual received from the management center KS or from the communication terminal 4 (e.g., a linear back-and-forth travel pattern or a spiral travel pattern), the vehicle position, and the state information output from the work state evaluating unit 55. In other words, unlike a case where the overall travel route is formed in advance on the basis of a set travel pattern alone, a more appropriate travel route is formed, which handles circumstances that cannot be predicted before the work. In addition to the above-described basic rules, the route element selecting unit 63 has route selection rules A1 to A12, such as those described below, registered in advance, and the appropriate route selection rule is applied in accordance with the travel pattern and the state information.

(A1) When the monitoring party (occupant) has made an operation requesting a switch from autonomous travel to manual travel, the selection of travel route elements by the route element selecting unit 63 is stopped after preparations for manual travel are complete. Such operations include operating the automatic/manual toggle operation implement 83, operating a braking implement (and making a sudden stop in particular), steering by greater than or equal to a predetermined steering angle using a steering implement (a steering lever or the like), and so on. Furthermore, if the travel system detection sensor group 81 includes a sensor that detects the absence of the monitoring party required to be present during autonomous travel, e.g., a weight detection sensor provided in a seat or a seatbelt fastening detection sensor, the autonomous travel control can be stopped on the basis of a signal from that sensor. In other words, when it is detected that the monitoring party is absent, the start of the autonomous travel control, or the travel of the harvester 1 itself, is stopped. Additionally, a configuration may be employed in which a fine adjustment is made to the travel direction rather than stopping the autonomous travel control when the steering implement is operated at a steering angle that is extremely small and is smaller than the predetermined steering angle.

(A2) The autonomous travel controlling unit 511 monitors a relationship (distance) between an outer line position of the field and the vehicle position based on the positioning data. Then, the autonomous travel controlling unit 511 controls the autonomous travel so as to avoid contact between the ridge and the vehicle when turning in the outer peripheral area SA. Specifically, the autonomous travel is stopped and the harvester 1 is stopped, the type of turning travel is changed (changed from normal U-turn travel to switchback turn travel or α-turn travel), a travel route that does not pass through that area is set, or the like. A configuration in which a warning such as "caution, narrow turning area" is provided may also be employed.

(A3) When the harvested crop tank 14 is full or almost full of harvested crops, and it is necessary to unload the harvested crops, an unload request (a type of request for deviating from the work travel in the area CA to be worked), which is one type of state information, is issued from the work state evaluating unit 55 to the route element selecting unit 63. In this case, appropriate travel route elements (e.g., travel route elements providing the shortest possible route) for deviating from the work travel in the area CA to be worked and traveling toward the parking position through the outer peripheral area SA are selected from elements in the travel route element set for the outer peripheral area SA that have a departure route attribute value, and elements in the travel route element set for the area CA to be worked, on the basis of the parking position for unloading to the transport vehicle CV at the ridge and the vehicle position.

(A4) If the remaining fuel in the fuel tank is determined to be low on the basis of a remaining fuel value calculated from a signal from a remaining fuel sensor and the like, a refueling request (a type of departure request) is made. As with (A3), appropriate travel route elements leading to a refueling position (e.g., travel route elements providing the shortest possible route) are selected on the basis of a parking position corresponding to a pre-set refueling position and the vehicle position.

(A5) When deviating from work travel in the area CA to be worked and entering the outer peripheral area SA, it is necessary to once again return to the area CA to be worked. As a travel route element serving as a starting point for returning to the area CA to be worked, the travel route element closest to the point of departure, or the travel route element closest to the current position in the outer peripheral area SA, is selected from elements in the travel route element set for the outer peripheral area SA that have a return route attribute value, and elements in the travel route element set for the area CA to be worked.

(A6) When deviating from work travel in the area CA to be worked in order to unload harvested crops or refuel, and then determining a travel route for returning to the area CA to be worked, a travel route element in the area CA to be worked that has already been worked (already traveled) and has thus been given a "travel prohibited" attribute is restored as a travel route element that can be traveled. When selecting an already-worked travel route element makes it possible to save a predetermined amount of time or more, that travel route element is selected. Furthermore, reverse travel can be used for the travel in the area CA to be worked when departing from the area CA to be worked.

(A7) The timing for deviating from work travel in the area CA to be worked in order to unload harvested crops or refuel is determined on the basis of the margin thereof, and the travel time or travel distance to the parking position. In terms of unloading harvested crops, the margin is the predicted travel time or travel distance until the harvested crop tank 14 becomes full from the current amount being held. In terms of refueling, the margin is the predicted travel time or travel distance until the fuel in the fuel tank is completely exhausted from the current remaining amount. For example, when passing close to a parking position for unloading during autonomous travel, whether having the harvester 1 pass the parking position and then deviate after becoming full and return to the parking position or having the harvester 1 unload while passing nearby the parking position will ultimately be more efficient travel (whether the total work time is shorter, the total travel distance is shorter, and so on) is determined on the basis of the margin, the time required for the unloading work, and the like. Carrying out the unloading work when there is a very small amount of harvested crops increases the overall number of instances of unloading, and is thus inefficient, whereas if the tank is almost full, it is more efficient to unload at that time.

Figure 22:
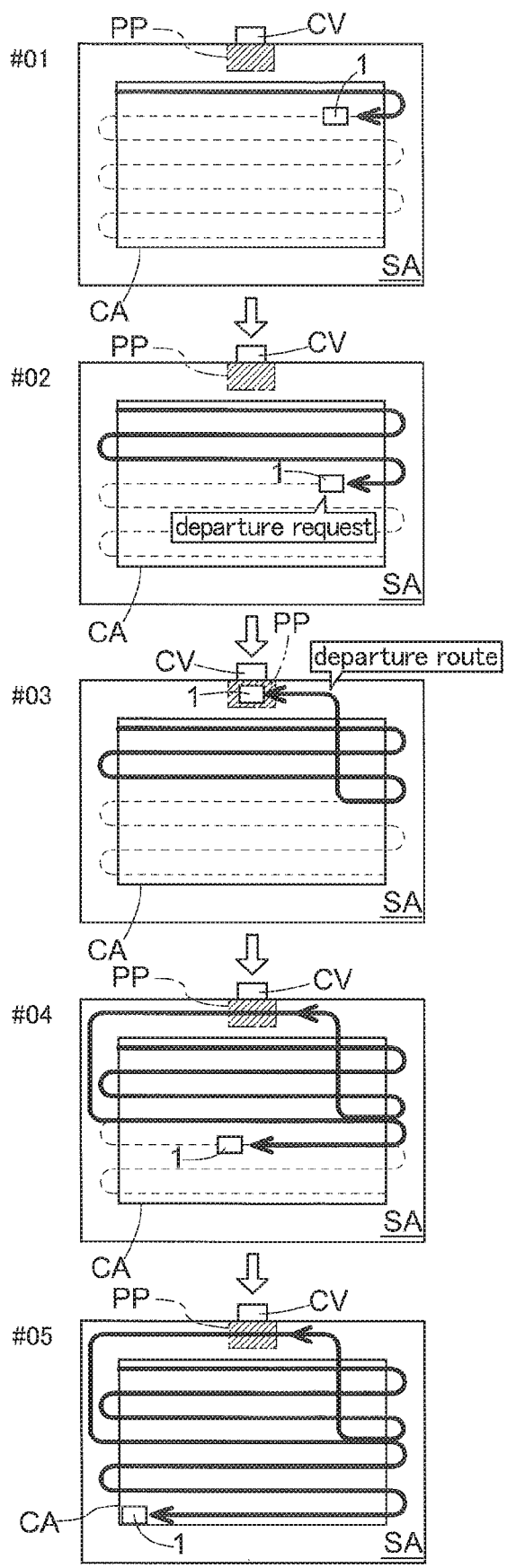
FIG. 22 is a diagram illustrating a case where, after departing an area to be worked, the work travel does not resume from the work travel that had been carried out before departing from the work travel.

(A8) FIG. 22 illustrates a case where the travel route element selected in work travel resumed after departing the area CA to be worked is not a continuation of the pre-departure work travel. In this case, a linear back-and-forth travel pattern such as that illustrated in FIGS. 5 and 16 is set in advance. In FIG. 22, the parking position is indicated by the sign PP, and a travel route in a case where work travel was successfully completed for the area CA to be worked through linear back-and-forth travel involving 180° U-turn travel is indicated by a dotted line as a comparative example. The actual travel trajectory is indicated by a bold solid line. As the work travel progresses, the straight line-shaped travel route elements and the U-turn travel route are selected in sequence (step #01).

When a departure request is issued midway through the work travel (step #02), a travel route progressing from the area CA to be worked to the outer peripheral area SA is calculated. At this point, two routes are conceivable: a route in which the harvester 1 continues to progress along the travel route element currently being traveled and exits to the outer peripheral area SA; and a route in which the harvester 1 turns 90° from the travel route element currently being traveled, passes through an already-harvested site (=an aggregate of travel route elements having "already traveled" attributes), and exits to the outer peripheral area SA where the parking position is located. Here, the latter route, which has a shorter travel distance, is selected (step #03). In this latter instance of departure travel, an element obtained by moving a travel route element set in the outer peripheral area SA parallel as far as the departure point is used as a departure travel route element in the area CA to be worked after the 90° turn. However, if the departure request is made with leeway in terms of time, the former route is selected. In the former instance of departure travel, the harvesting work is continued during the departure travel in the area CA to be worked, which is beneficial in terms of the work efficiency.

Upon deviating from the work travel in the area CA to be worked, executing departure travel through the area CA to be worked and the outer peripheral area SA, and reaching the parking position, the harvester 1 receives support from the work support vehicle. In this example, the harvested crops held in the harvested crop tank 14 are unloaded to the transport vehicle CV.

Once the harvested crops have been completely unloaded, it is necessary to return to the point where the departure request was issued, in order to return to the work travel. In the example of FIG. 22, an unworked part remains in the travel route element that was being traveled when the departure request was issued, and thus the harvester 1 returns to that travel route element. Accordingly, the harvester 1 selects a travel route element in the outer peripheral area SA from the parking position, travels counterclockwise, and upon reaching the endpoint of the target travel route element, turns by 90° at that point, enters the travel route element, and executes the work travel. If the point where the departure request was made has been passed, the harvester 1 travels without working, passes through a U-turn travel route, and then executes work travel for the next travel route element (step #04). The harvester 1 then continues with linear back-and-forth travel, and completes the work travel in the area CA to be worked (step #05).

(A9) If the position of a travel obstacle within the field is included in the inputted work site data, or if the harvester 1 includes an obstacle position detection device, a travel route element for obstacle avoidance travel is selected on the basis of the position of the obstacle and the vehicle position. The selection rules for avoiding an obstacle include a rule that selects travel route elements providing a circumventing route that comes as close as possible to the obstacle, a rule that selects travel route elements so that the harvester 1 first exits to the outer peripheral area SA and then follows a linear route where no obstacle is present when entering the area CA to be worked, and so on.

(A10) If, when a spiral travel pattern such as that illustrated in FIGS. 6 and 15 is set, the travel route element to be selected is short, the spiral travel pattern is automatically changed to the linear back-and-forth travel pattern. This is because when the surface area is limited, spiral travel including α-turn travel carried out forward and in reverse tends to be inefficient.

(A11) If, when traveling through traditional travel, the number of unworked sites, i.e., the number of unworked (untraveled) travel route elements in the travel route element set of the area CA to be worked, has become less than or equal to a predetermined number, the traditional travel is automatically switched to autonomous travel. Additionally, if the harvester 1 is working through spiral travel from the outside toward the inside of an area CA to be worked that is covered by a mesh line set, the travel is switched from spiral travel to linear back-and-forth travel when the surface area of the remaining unworked site has become small and the number of unworked travel route elements has become less than or equal to a predetermined value. In this case, as described above, a travel route element having the "intermediate straight route" attribute is moved parallel from the outer peripheral area SA to the vicinity of the unworked site in the area CA to be worked, in order to avoid wasteful travel.

(A12) In fields of rice, wheat, or the like, causing the harvester 1 to travel parallel to the rows (furrows) where seedlings are planted can improve the efficiency of the harvesting work. Thus in the selection of travel route elements by the route element selecting unit 63, a travel route element that is closer to being parallel to the rows is made more likely to be selected. However, if, when starting the work travel, the machine is not in an attitude or position parallel to the road direction, the configuration is such that travel for bringing the machine to an attitude parallel to the rows is executed while working even if that travel follows the direction intersecting with the road direction. This makes it possible to reduce wasteful travel (non-work travel) and end the work quickly.

Note that when autonomous travel using the first route element selecting unit 631 and the second route element selecting unit 632 is mainly carried out, the above-described route selection rules A1 to A12 can be used as processes for exceptions. In this case, in addition to the function for selecting travel route elements using the first route element selecting unit 631 and the second route element selecting unit 632 as described above, the route element selecting unit 63 has processes for exceptions, such as the above-described route selection rules A1 to A12, as functions for selecting travel route elements for emergency avoidance. In the processes for exceptions, the travel based on the travel route element selection order calculated by the first route element selecting unit 631 or the second route element selecting unit 632 is paused, a different travel route element is selected, and exceptional travel is then carried out. Such processes for exceptions are determined on the basis of the state information output from the work state evaluating unit 55.

Once such processes for exceptions end, the harvester 1 may return to the travel based on the travel route element selection order calculated by the first route element selecting unit 631 or the second route element selecting unit 632. Alternatively, if returning is difficult, the first route element selecting unit 631 and the second route element selecting unit 632 may calculate a travel route element selection order again at that point in time, and resume travel based on that selection order.

Cooperative Travel Control

Figure 23:
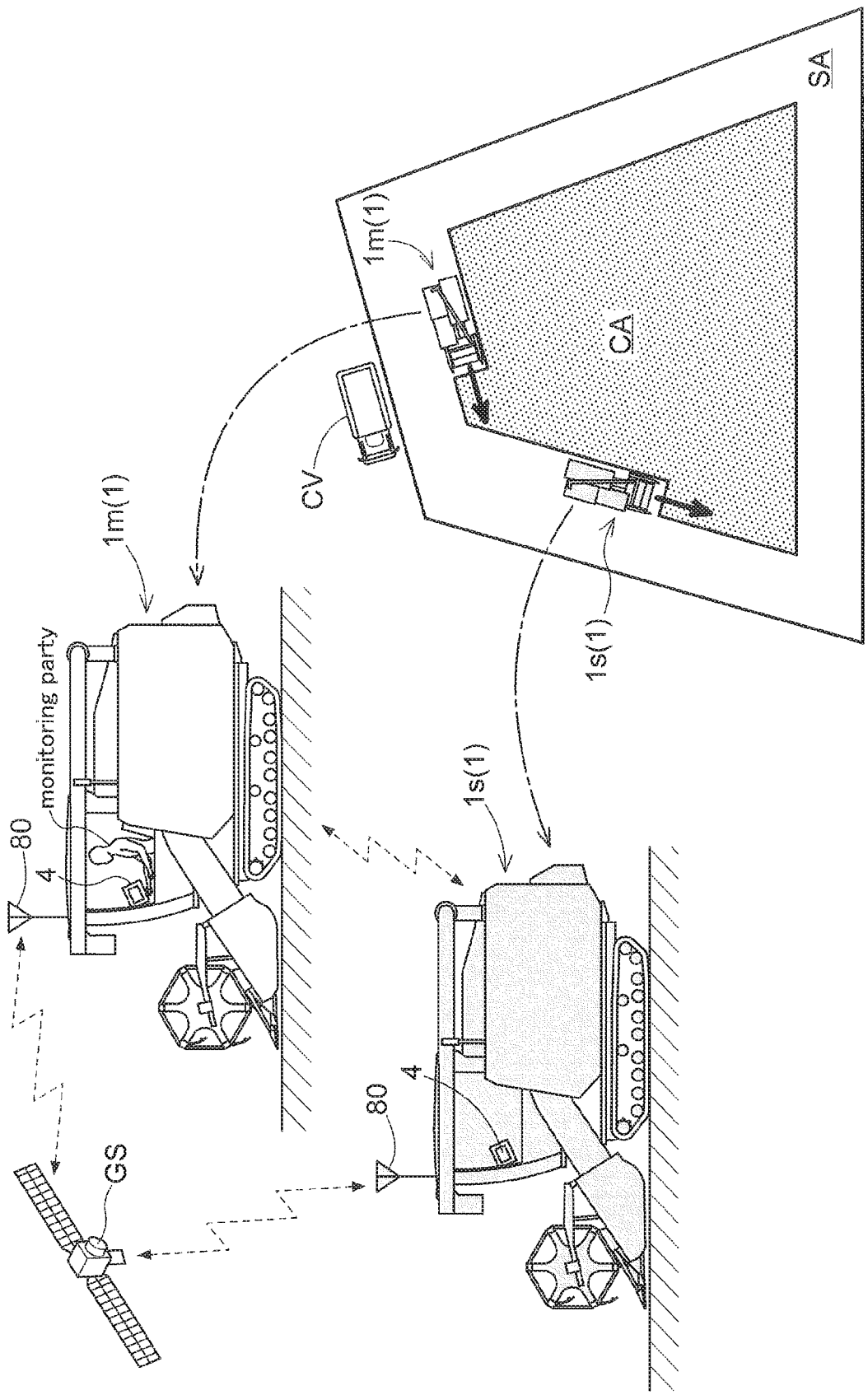
FIG. 23 is a diagram illustrating work travel by multiple harvesters subjected to cooperative control.

Work travel in the autonomous work vehicle travel system when a plurality of work vehicles are introduced will be described next. For the sake of simplicity, a case where two harvesters 1 execute work travel (autonomous travel) will be described here. FIG. 23 illustrates a first work vehicle functioning as a master harvester 1m, and a second work vehicle functioning as a slave harvester 1s, executing work travel in a single field in cooperation with each other. Although the two harvesters 1 are given the names "master harvester 1m" and "slave harvester 1s" to distinguish between the two, these may simply be referred to as "harvesters 1" when it is not necessary to distinguish between the two. A monitoring party occupies the master harvester 1m, and the monitoring party operates the communication terminal 4 which s/he has brought into the master harvester 1m. Although the terms "master" and "slave" are used for the sake of simplicity, the relationship is not strictly a master-slave relationship. Data communication can be carried out between the master harvester 1m and the slave harvester 1s through the respective communication processing units 70, and state information can be exchanged. The communication terminal 4 can not only supply commands from the monitoring party and data pertaining to the travel route to the master harvester 1m, but can also supply commands from the monitoring party and data pertaining to the travel route to the slave harvester 1s via the communication terminal 4 and the master harvester 1m. For example, the state information output from the work state evaluating unit 55 of the slave harvester 1s is also transferred to the master harvester 1m, and the state information output from the work state evaluating unit 55 of the master harvester 1m is also transferred to the slave harvester 1s. Accordingly, both route element selecting units 63 have functions for selecting the next travel route elements in consideration of both instances of state information and both vehicle positions. When the route managing unit 60 and the route element selecting unit 63 are provided in the communication terminal 4, both harvesters 1 supply the state information to the communication terminal 4 and receive the next travel route element selected there. Note that the master harvester 1m and the slave harvester 1s may be configured to execute autonomous travel with independent routes set on the basis of the above-described travel route setting routines (the travel route element selection rules).

When autonomous travel using the first route element selecting unit 631 and the second route element selecting unit 632 is primarily carried out, in the cooperative travel, assigning the travel route elements for which the selection order is to be calculated first between the first route element selecting units 631 provided in the master harvester 1m and the slave harvester 1s makes it possible to avoid a problem in which the master harvester 1m and the slave harvester 1s travel along the same travel route element. A configuration is also possible in which the first route element selecting unit 631 and the second route element selecting unit 632 are constructed in the communication terminal 4 rather than the harvesters 1, with the communication terminal 4 calculating the selection order for the travel route elements along which the master harvester 1m and the slave harvester 1s are to travel and sending the selection order to the master harvester 1m and the slave harvester 1s. In this case, it is necessary for the first route element selecting unit 631 and the second route element selecting unit 632 to employ an algorithm that, taking the travel time into consideration as well, calculates the selection order not only so that the master harvester 1m and the slave harvester 1s do not select the same travel route element, but also so that the master harvester 1m and the slave harvester 1s do not travel adjacent to each other.

Figure 24:
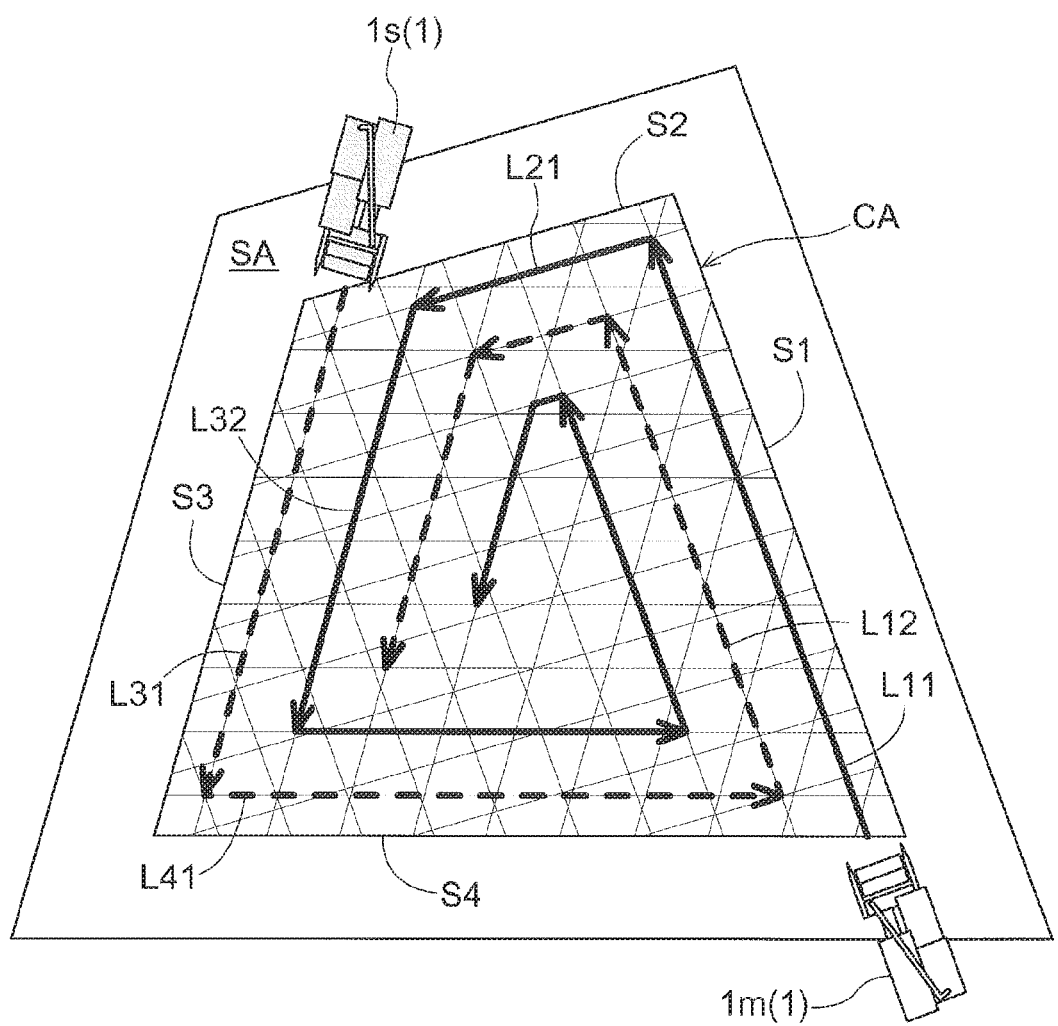
FIG. 24 is a diagram illustrating a basic travel pattern in cooperatively-controlled travel using a travel route element set calculated by the mesh route element calculating unit.

Like FIG. 9, FIG. 24 illustrates an area CA to be worked covered by a mesh line set constituted by mesh lines dividing the area into a mesh by the work width. Here, the master harvester 1m enters the travel route element L11 from the vicinity of a lower-right corner of the deformed quadrangle representing the area CA to be worked, turns left at the point of intersection between the travel route element L11 and the travel route element L21, and enters the travel route element L21. Furthermore, the master harvester 1m turns left at the point of intersection between the travel route element L21 and the travel route element L32, and then enters the travel route element L32. In this manner, the master harvester 1m executes spiral travel using left turns. On the other hand, the slave harvester 1s enters the travel route element L31 from the vicinity of an upper-left corner of the area CA to be worked, turns left at the point of intersection between the travel route element L31 and the travel route element L41, and enters the travel route element L41. Furthermore, the slave harvester 1s turns left at the point of intersection between the travel route element L41 and the travel route element L12, and then enters the travel route element L12. In this manner, the slave harvester 1s executes spiral travel using left turns. As is clear from FIG. 24, cooperative control is carried out so that the travel trajectories of the slave harvester 1s enter between the travel trajectories of the master harvester 1m. Accordingly, the travel of the master harvester 1m is spiral travel that leaves an interval equivalent to the combined width of its own work width and the work width of the slave harvester 1s. Likewise, the travel of the slave harvester 1s is spiral travel that leaves an interval equivalent to the combined width of its own work width and the work width of the master harvester 1m. The travel trajectories of the master harvester 1m and the travel trajectories of the slave harvester 1s form a double spiral.

Because the area CA to be worked is defined by the outer peripheral area SA formed by circling travel on the outside, it is necessary for the first circling travel for forming the outer peripheral area SA to be carried out by either the master harvester 1m or the slave harvester 1s. This circling travel can also be executed through cooperative control of the master harvester 1m and the slave harvester 1s.

Figure 25:
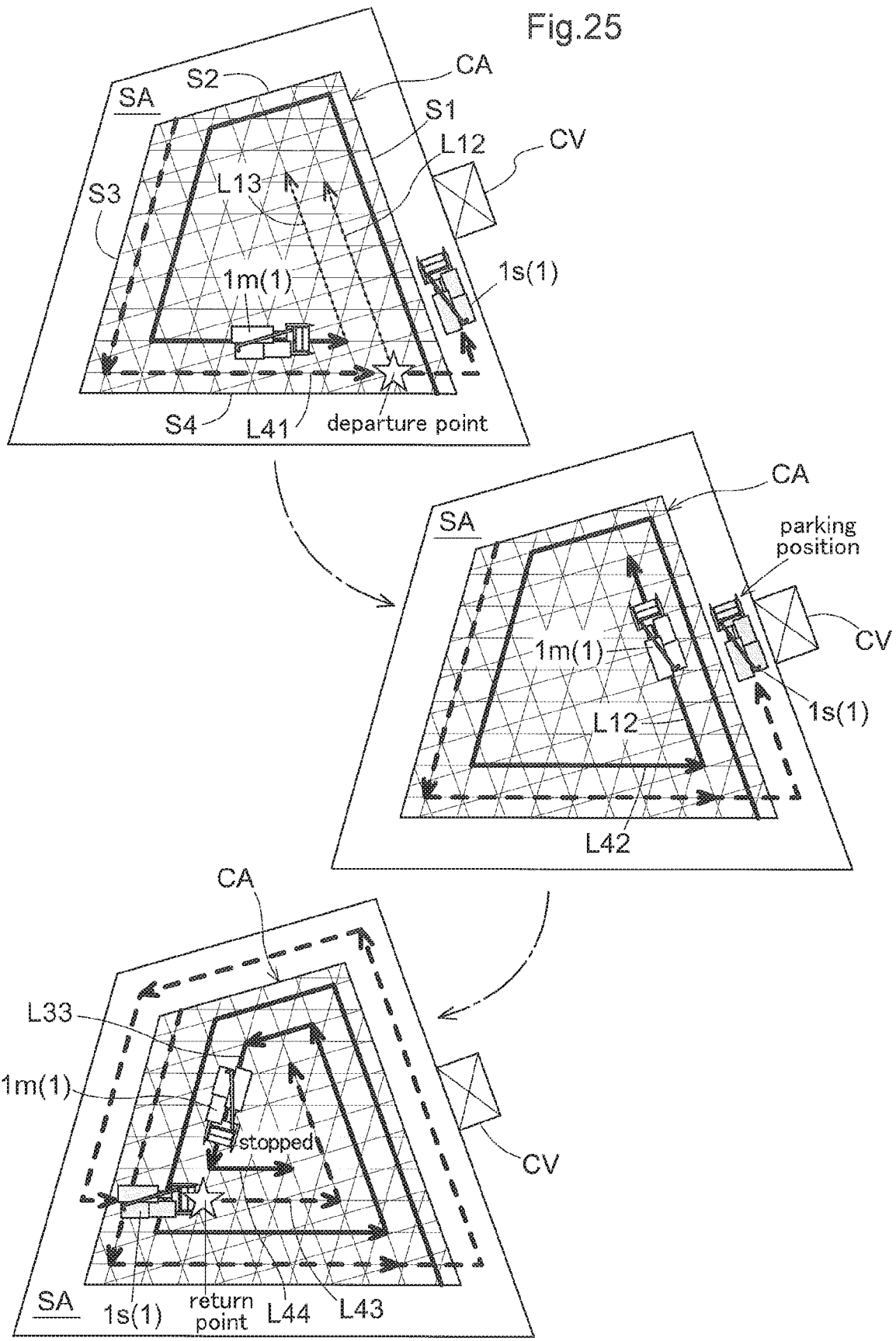
FIG. 25 is a diagram illustrating departure travel and return travel in cooperatively-controlled travel.

The travel trajectories illustrated in FIG. 24 are theoretical trajectories. In reality, the travel trajectories of the master harvester 1m and the travel route of the slave harvester 1s are corrected in accordance with the state information output from the work state evaluating units 55, and those travel trajectories do not constitute a perfect double spiral. One example of such corrected travel will be described next using FIG. 25. In FIG. 25, the transport vehicle CV, which transports harvested crops harvested by the harvesters 1, is parked at a position corresponding to the outside center of the first side S1, on the outside (the ridge) of the field. A parking position where the harvesters 1 are to park to unload the harvested crops to the transport vehicle CV is set to a position in the outer peripheral area SA that is adjacent to the transport vehicle CV. FIG. 25 illustrates a state where the slave harvester 1s departs from the travel route element in the area CA to be worked midway through the work travel, executes circling travel around the outer peripheral area SA, unloads the harvested crops into the transport vehicle CV, once again executes circling travel around the outer peripheral area SA, and returns to the travel route element in the area CA to be worked.

First, once a departure request (for unloading harvested crops) has been issued, the route element selecting unit 63 of the slave harvester 1s selects a travel route element having a "departure route" attribute value in the outer peripheral area SA and a travel route element for departing to the travel route element having the "departure route" attribute, on the basis of the margin for the held amount of crops, the travel distance to the parking position, and so on. In this embodiment, a travel route element set in the area of the outer peripheral area SA where the parking position is set, and the travel route element L41 currently being traveled, are selected, and the point of intersection between the travel route element L41 and the travel route element L12 serve as the departure point. Having progressed to the outer peripheral area SA, the slave harvester 1s travels along the travel route element in the outer peripheral area SA (the departure route) to the parking position, and unloads the harvested crops to the transport vehicle CV at the parking position.

The master harvester 1m continues work travel in the area CA to be worked even while the slave harvester 1s is unloading the harvested crops after deviating from the work travel in the area CA to be worked. However, it was originally assumed that the master harvester 1m would select the travel route element L13 at the point of intersection between the travel route element L42 and the travel route element L13 while traveling along the travel route element L42. However, the travel of the slave harvester 1s along the travel route element L12 has been canceled due to the departure of the slave harvester 1s, and thus the travel route element L12 is an unharvested area (untraveled). Accordingly, the route element selecting unit 63 of the master harvester 1m selects the travel route element L12 instead of the travel route element L13. In other words, the master harvester 1m travels to the point of intersection between the travel route element L42 and the travel route element L12, turns left, and travels along the travel route element L12.

When the slave harvester 1s finishes unloading the harvested crops, the route element selecting unit 63 of the slave harvester 1s selects the travel route elements to return along, on the basis of the current position and autonomous travel speed of the slave harvester 1s, the attributes of the travel route element in the area CA to be worked (untraveled/already traveled), the current position and autonomous travel speed of the master harvester 1m, and so on. In this embodiment, the travel route element L43, which is the unworked travel route element located furthest on the outside, is selected. The slave harvester 1s travels through the outer peripheral area SA from the parking position, in the counterclockwise direction, along the travel route element having a "return route" attribute, and enters the travel route element L43 from the left end of the travel route element L43. Once the route element selecting unit 63 of the slave harvester 1s selects the travel route element L43, that information is sent to the master harvester 1m as state information. Assuming a travel route up to the travel route element L33 had been selected, the route element selecting unit 63 of the master harvester 1m selects the travel route element L44 adjacent to the travel route element L43 on the inner side as the next travel route element. This means that the master harvester 1m and the slave harvester 1s may approach each other near the point of intersection between the travel route element L33 and the travel route element L44. Accordingly, the travel control units 51 of both harvesters 1m and is, or one of those travel control units 51, calculates a difference between the times when the master harvester 1m and the slave harvester 1s will pass near that point of intersection, and if the difference in that passage time is less than or equal to a predetermined value, controls the harvester 1 having the slower passage time (the master harvester 1m, here) to make a temporary stop in order to avoid a collision. After the slave harvester 1s has passed that point of intersection, the master harvester 1m once again starts the autonomous travel. In this manner, the master harvester 1m and the slave harvester 1s exchange information such as the vehicle positions, the selected travel route elements, and so on, and thus collision avoidance behavior, delay avoidance behavior, and so on can be executed.

Figure 26:
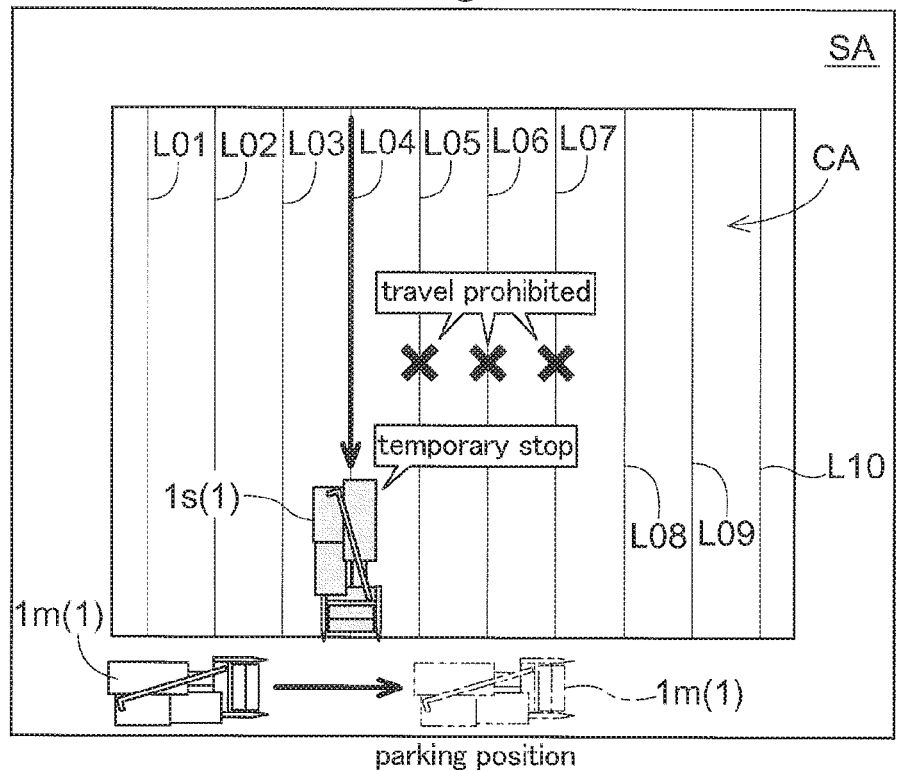
FIG. 26 is a diagram illustrating an example of cooperatively-controlled travel using a travel route element set calculated by the rectangular part element calculating unit.
Figure 27:
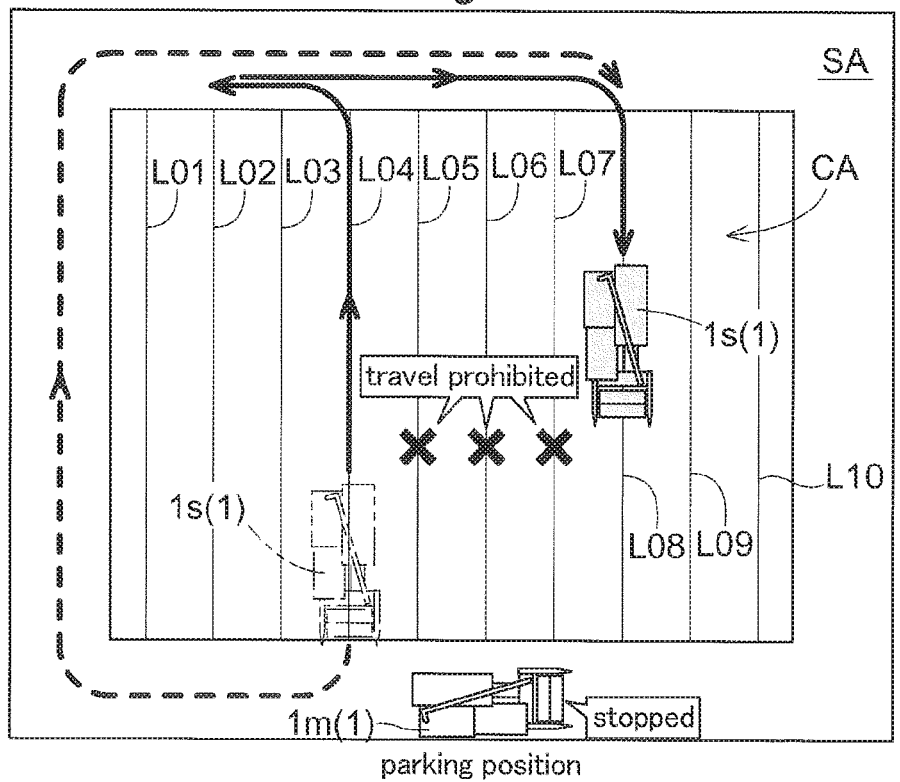
FIG. 27 is a diagram illustrating an example of cooperatively-controlled travel using a travel route element set calculated by the rectangular part element calculating unit.

Such collision avoidance behavior, delay avoidance behavior, and so on are also executed during linear back-and-forth travel, as indicated in FIGS. 26 and 27. In FIGS. 26 and 27, a parallel straight line set constituted by mutually-parallel straight lines is indicated by L01, L02, ..., L10, where L01 to L04 are already-worked travel route elements, and L05 to L10 are unworked travel route elements. In FIG. 26, the master harvester 1m travels through the outer peripheral area SA to approach the parking position, and the slave harvester 1s makes a temporary stop at a lower end of the area CA to be worked or lower end of the travel route element L04. If the slave harvester 1s enters the outer peripheral area SA from the travel route element L04 through U-turn travel in order to move to the travel route element L07, the slave harvester 1s will collide with the master harvester 1m, and thus the slave harvester 1s makes a temporary stop as the collision avoidance behavior. If the master harvester 1m is parked at the parking position, it is not possible to enter the area CA to be worked or depart from the area CA to be worked using the travel route elements L05, L06, and L07, and thus the travel route elements L05, L06, and L07 are temporarily set to "travel prohibited" (prohibited from selection). Once the master harvester 1m finishes unloading and moves from the parking position, the route element selecting unit 63 of the slave harvester 1s selects the travel route element to be moved to next from among the travel route elements L05 to L10, in light of the travel route of the master harvester 1m, after which the slave harvester 1s resumes autonomous travel.

It is also possible for the slave harvester 1s to continue working while the master harvester 1m is unloading at the parking position. FIG. 27 illustrates an example thereof. In this case, the route element selecting unit 63 of the slave harvester 1s would normally select the travel route element L07, which is three lanes ahead and has a travel route element priority level of 1, as the travel route element to be moved to. However, the travel route element L07 is set to "travel prohibited", in the same manner as the example illustrated in FIG. 26. Accordingly, the travel route element L08, which has the next-highest priority level, is selected. Multiple routes are calculated as routes for moving from the travel route element L04 to the travel route element L08, such as a route that reverses along the current travel route element L04 that is now already traveled (indicated by a solid line in FIG. 27), a route that travels clockwise from the lower end of the travel route element L04 and advances into the outer peripheral area SA (indicated by a dotted line in FIG. 27), and so on, and the most efficient route, e.g., the shortest route (the route indicated by the solid line, in this embodiment), is selected.

Note that when autonomous travel using the first route element selecting unit 631 and the second route element selecting unit 632 is mainly carried out, it is possible to select a travel route element for emergency avoidance as described above and execute processes for exceptions in which exceptional travel is carried out, in linear back-and-forth travel by a plurality of harvesters 1 as well. Processes such as those described above with reference to FIGS. 26 and 27, for example, can be used as the processes for exceptions in cooperative travel.

As described above, even when multiple harvesters 1 cooperate for work travel in a single field, the respective route element selecting units 63 select the travel route elements in sequence on the basis of travel patterns manually input from a work plan manual received from the management center KS or received from the communication terminal 4 (e.g., a linear back-and-forth travel pattern or a spiral travel pattern), the vehicle positions, state information output by the respective work state evaluating units 55, and pre-registered selection rules. Selection rules (B1) to (B11), which are different from the above-described rules (A1) to (A12) and that apply specifically when multiple harvesters 1 execute work travel in cooperation with each other, will be described below.

(B1) The multiple harvesters 1 executing work travel in cooperation with each other travel autonomously along the same travel pattern. For example, if a linear back-and-forth travel pattern is set for one of the harvesters 1, a linear back-and-forth travel pattern is also set for the other harvester 1.

(B2) If, when a spiral travel pattern is set, one of the harvesters 1 deviates from the work travel in the area CA to be worked and enters the outer peripheral area SA, the other harvester 1 selects a travel route element further on the outside. As a result, instead of allowing the route that the departed harvester 1 had planned to travel to remain, the departed harvester 1 enters the planned travel route element first.

(B3) If a spiral travel pattern is set, when a harvester 1 that has departed once again returns to the work travel in the area CA to be worked, a travel route element that is far from the harvester 1 engaged in the work travel and that has an "unworked" attribute is selected.

(B4) If, when a spiral travel pattern is set, the travel route element to be selected become shorter, the work travel is executed by only one of the harvesters 1, and the remaining harvester 1 deviates from the work travel.

(B5) When a spiral travel pattern is set, the multiple harvesters 1 are prohibited from simultaneously selecting a travel route element from a travel route element set parallel to a side of the polygon expressing the outer shape of the area CA to be worked, in order to avoid the risk of the collision.

(B6) When a linear back-and-forth travel pattern is set, and one of the harvesters 1 is engaged in U-turn travel, the autonomous travel is controlled so that the other harvester 1 does not enter into the area of the outer peripheral area SA where the U-turn travel is being executed.

(B7) When a linear back-and-forth travel pattern is set, a travel route element located at least two spaces from the travel route element that the other harvester 1 plans to travel next, or the travel route element that the other harvester 1 is currently traveling, is selected as the next travel route element.

(B8) The determination of the timing at which to deviate from the work travel in the area CA to be worked, and the selection of the travel route elements, for the purpose of unloading harvested crops or refueling, is carried out based not only on the margin and the travel time to the parking position, but also under the condition that multiple harvesters 1 do not depart at the same time.

(B9) If the master harvester 1m is set to traditional travel, the slave harvester 1s executes autonomous travel so as to follow the master harvester 1m.

(B10) If the capacity of the harvested crop tank 14 in the master harvester 1m is different from the capacity of the harvested crop tank 14 in the slave harvester 1s, and the harvesters 1 make unload requests at the same time or almost the same time, the harvester 1 having the lower capacity unloads first. This shortens the unload standby time (downtime) of the harvester 1 that cannot unload, and makes it possible to finish the harvesting work in the field even slightly more quickly.

Figure 28:
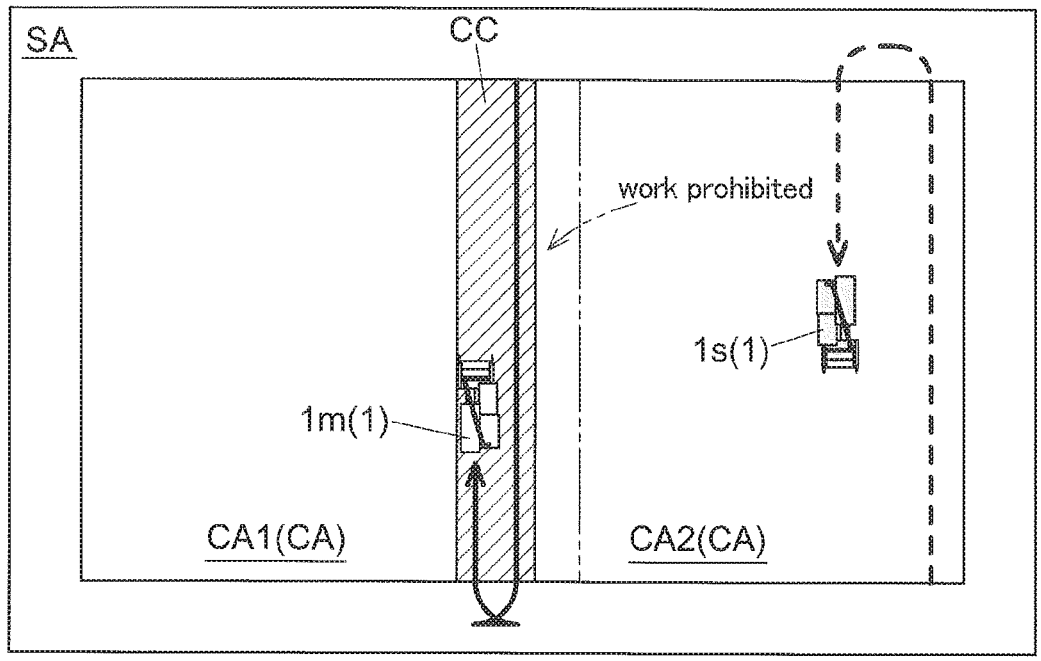
FIG. 28 is a diagram illustrating a middle dividing process.
Figure 29:
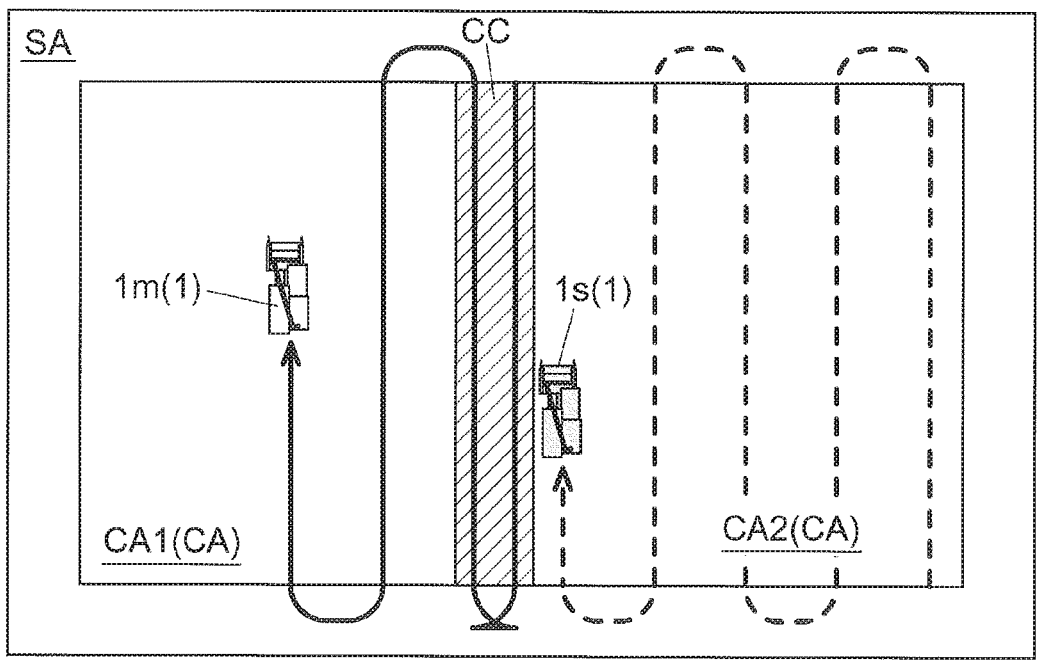
FIG. 29 is a diagram illustrating an example of cooperatively-controlled travel in a field that has been divided in the middle.

(B11) When a single field is very large, that field is segmented into multiple segments through a middle dividing process, and a harvester 1 is deployed in each of the segments. FIG. 28 is a diagram illustrating a state midway through a middle dividing process, in which a band-shaped middle-divided area CC is formed in the center of the area CA to be worked and the area CA to be worked is segmented into two segments CA1 and CA2. FIG. 29 is a diagram illustrating a state after the middle dividing process has ended. In this embodiment, the master harvester 1m forms the middle-divided area CC. While the master harvester 1m is executing the middle dividing, the slave harvester 1s executes work travel in segment CA2 according to a linear back-and-forth travel pattern, for example. Before this work travel is executed, a travel route element set is generated for the segment CA2. At this time, selecting the travel route element corresponding to one work width located closest to the middle-divided area CC in the segment CA2 is prohibited until the middle dividing process ends. This makes it possible to ensure that the master harvester 1m and the slave harvester 1s do not make contact.

Once the middle dividing process ends, the travel of the master harvester 1m is controlled so as to execute independent work travel using a travel route element set calculated for the segment CA1, whereas the travel of the slave harvester 1s is controlled so as to execute independent work travel using a travel route element set calculated for the segment CA2. If one of the harvesters 1 has completed the work first, that harvester 1 enters the segment in which work remains, and cooperative control with the other harvester 1 is started. The harvester 1 that has completed the work in the segment it handles travels autonomously to the segment handled by the other harvester 1 in order to assist in the other harvester 1 in its work.

Note that when autonomous travel using the first route element selecting unit 631 and the second route element selecting unit 632 is mainly carried out, if the master harvester 1m and the slave harvester 1s carry out linear back-and-forth travel as such independent work travel in their respective segments, work travel using the first route element selecting unit 631 and the second route element selecting unit 632 described above is possible in each of the segments.

Figure 30:
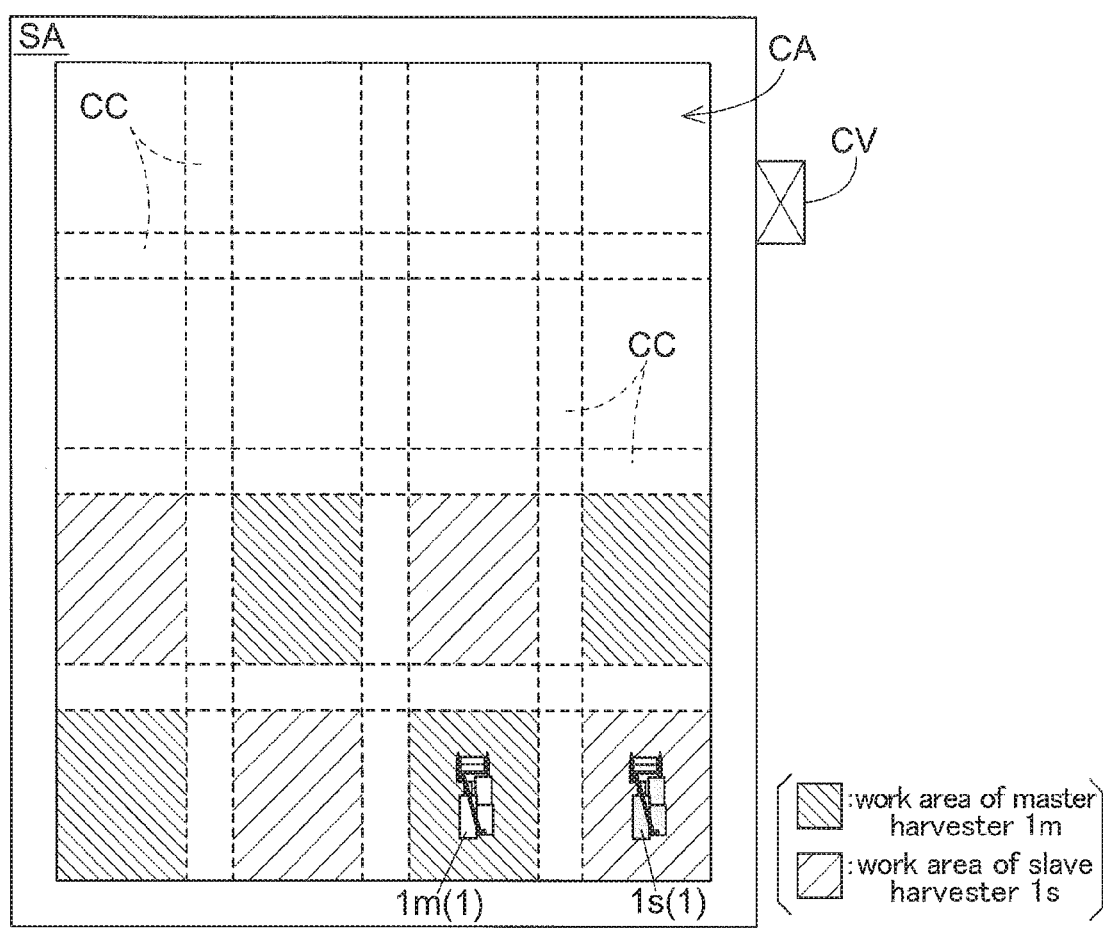
FIG. 30 is a diagram illustrating an example of cooperatively-controlled travel in a field that has been segmented into a grid shape.

If the field has an even larger scale, the field is middle-divided into a grid shape, as illustrated in FIG. 30. This middle dividing can be carried out by the master harvester 1*m* and the slave harvester 1*s*. The segments formed by middle-dividing the field into a grid shape are assigned to be worked by the master harvester 1*m* or the slave harvester 1*s*, and the work travel is executed by a single harvester 1 in each of those segments. However, the travel route elements are selected under the condition that the master harvester 1*m* and the slave harvester 1*s* are not distanced from each other by greater than or equal to a predetermined value. This is because it is difficult for the monitoring party occupying the master harvester 1*m* to monitor the work travel of the slave harvester 1*s*, for the state information to be exchanged between the machines, and so on if the slave harvester 1*s* and the master harvester 1*m* are too far apart. With a situation such as that illustrated in FIG. 30, the harvester 1 that has finished work in the segment it handles may autonomously travel to the segment handled by the other harvester 1 to assist the other harvester 1 in its work, or may autonomously travel to the next segment it handles itself. In this case as well, if the master harvester 1*m* and the slave harvester 1*s* carry out linear back-and-forth travel as such independent work travel in their respective segments, work travel using the first route element selecting unit 631 and the second route element selecting unit 632 described above is possible in each of the segments.

The parking position of the transport vehicle CV, the parking position of the refueling vehicle, and so on are outside the outer peripheral area SA, and thus depending on the segment in which work travel is underway, the travel route for unloading harvested crops or refueling may become longer and result in wasteful travel time. Thus when traveling to the parking position and returning from the parking position, travel route elements for segments in which work travel is to be executed while passing through, and circling travel route elements, are selected.

Figure 31:
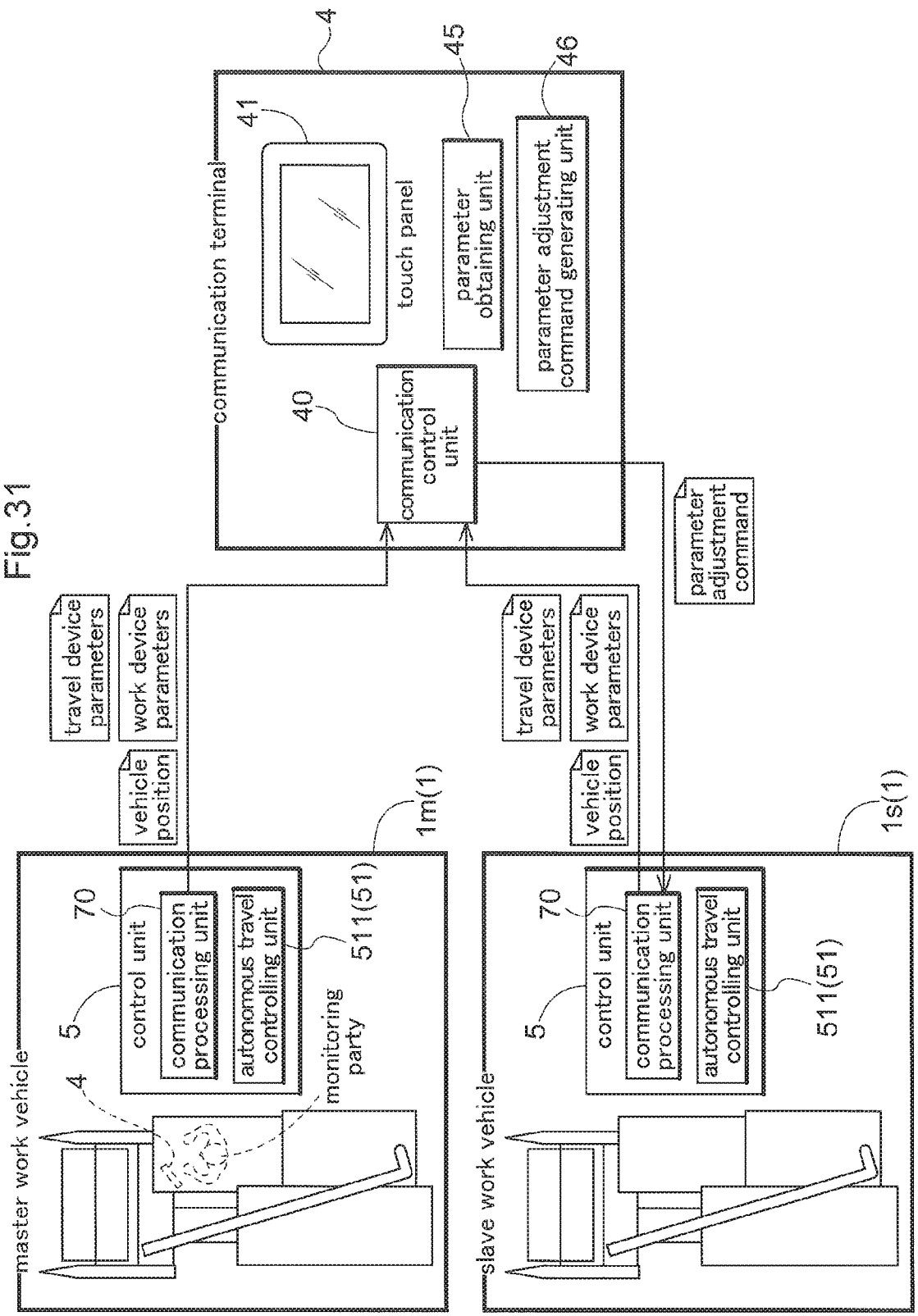
FIG. 31 is a diagram illustrating a configuration in which slave harvester parameters can be adjusted from a master harvester.

Fine Adjustments to Parameters of Work Machine Device Groups, Etc. During Cooperative Autonomous Travel When the master harvester 1*m* and the slave harvester 1*s* execute work travel cooperatively, the monitoring party normally occupies the master harvester 1*m*. As such, for the master harvester 1*m*, the monitoring party can make fine adjustments to the values of autonomous travel control parameters for the vehicle travel device group 71, the work device group 72, and so on as necessary by using the communication terminal 4. The values of the parameters for the vehicle travel device group 71, the work device group 72, and so on of the master harvester 1*m* can also be applied in the slave harvester 1*s*, and thus a configuration in which the parameters of the slave harvester 1*s* can be adjusted from the master harvester 1*m* can be employed, as illustrated in FIG. 31. However, there is no problem if the slave harvester 1*s* includes a communication terminal 4 as well. This is because the slave harvester 1*s* may also execute autonomous travel independently, and may be used as the master harvester 1*m* as well.

The communication terminal 4 illustrated in FIG. 31 is provided with a parameter obtaining unit 45 and a parameter adjustment command generating unit 46. The parameter obtaining unit 45 obtains device parameters set by the master harvester 1*m* and the slave harvester 1*s*. As a result, the values set for the device parameters of the master harvester 1*m* and the slave harvester 1*s* can be displayed in the display panel unit of the touch panel 41 in the communication terminal 4. The monitoring party occupying the master harvester 1*m* inputs a device parameter adjustment amount for adjusting the device parameters of the master harvester 1*m* and the slave harvester 1*s* through the touch panel 41. On the basis of the input device parameter adjustment amount, the parameter adjustment command generating unit 46 generates a parameter adjustment command for adjusting the corresponding device parameters, and sends that command to the master harvester 1*m* and the slave harvester 1*s*. As a communication interface for such communication, the control units 5 of the master harvester 1*m* and the slave harvester 1*s* include the communication processing unit 70, and the communication terminal 4 includes the communication control unit 40. To adjust the device parameters of the master harvester 1*m*, the monitoring party may use various types of operation implements provided in the master harvester 1*m* to make the adjustments directly. The device parameters are divided into travel device parameters and work device parameters. The travel device parameters include the vehicle speed and the engine RPM. The work device parameters include the height of the harvesting section 15, the height of the reel 17, and so on.

As described above, the autonomous travel controlling unit 511 has a function for calculating an actual vehicle speed on the basis of the positioning data obtained by the satellite positioning module 80. During cooperative autonomous travel, this function is used to compare the actual vehicle speed based on the positioning data of the harvester 1 that is leading in one direction with the actual vehicle speed based on the positioning data of the harvester 1 that is following, and if there is a difference in vehicle speeds, the vehicle speeds are adjusted so that the vehicle speed of the following harvester 1 matches the vehicle speed of the leading harvester 1. This prevents abnormal proximities, contact, and so on caused by differences in the vehicle speeds of the leading harvester 1 and the following harvester 1.

The communication processing unit 70 of the harvester 1, the communication control unit 40 of the communication terminal 4, and so on can be provided with data and voice communication functions for making calls, sending emails, and so on to registered mobile communication terminals such as mobile phones. When such a data and voice communication function is provided, if the held amount of harvested crops exceeds a predetermined amount, a call (artificial voice) or an email indicating that the harvested crops are to be unloaded is sent to the driver of the transport vehicle CV where the harvested crops are to be unloaded. Likewise, if the remaining fuel has dropped below a predetermined amount, a call (artificial voice) or an email indicating a request to refuel is sent to the driver of the refueling vehicle.

Other Embodiments (1) In the above-described embodiments, the normal U-turn travel requires a distance that encloses two or more travel route elements between the route changeable point before switching the direction of travel and the route changeable point after switching the direction of travel. Switchback turn travel is used for shorter distances. Furthermore, a travel route element two spaces further is set as the next travel route element, with the highest priority level set. However, the distance between the two travel route elements required for normal U-turn travel depends on the turning capabilities of the harvester 1, and is of course a different distance for other harvesters 1 (work vehicles). Accordingly, an appropriate distance for the two travel route elements, which serves as a limit used for the normal U-turn travel, is set for each harvester 1 (work vehicle) that is used.

Figure 32:
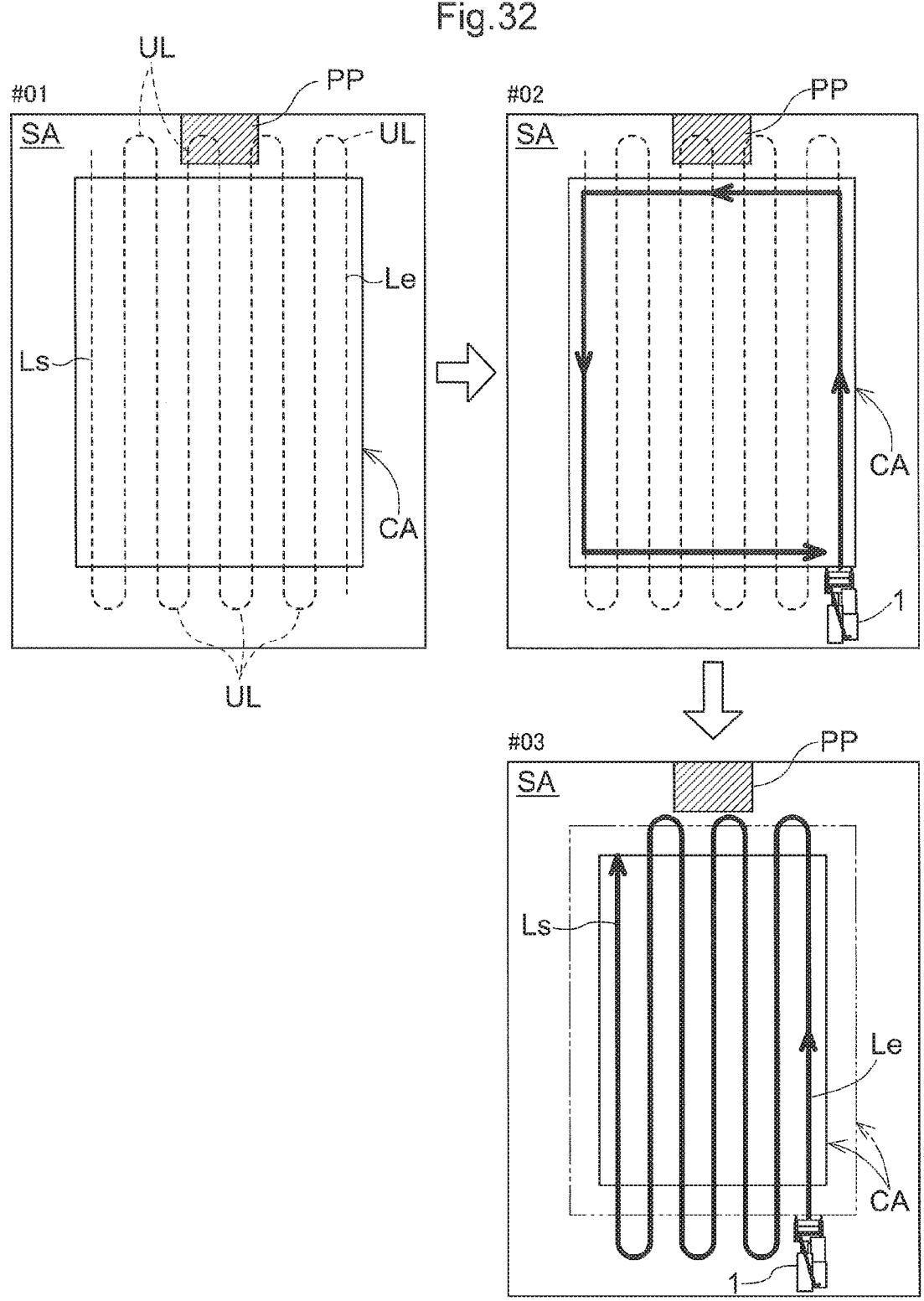
FIG. 32 is a diagram illustrating autonomous travel for creating a U-turn travel space near a parking position.

(2) The foregoing embodiments describe autonomous travel assuming that a sufficiently broad space for U-turn travel during linear back-and-forth travel and α-turn travel during spiral travel has been secured through the circling travel executed in advance. However, U-turn travel typically requires more space than α-turn travel. Accordingly, it may be the case that the space formed through the circling travel executed in advance is insufficient for U-turn travel. For example, when a single harvester 1 is working, there is a risk that a divider or the like will make contact with a ridge and damage the ridge during U-turn travel, as indicated in FIG. 32. Accordingly, to avoid such a situation where the ridge is damaged when a linear back-and-forth travel pattern is set as the travel pattern, when the work travel is started, the outer peripheral area SA is first expanded inward by automatically making at least one pass of work travel in the outermost peripheral part of the area CA to be worked. Even if the width of the outer peripheral area SA formed through the circling travel executed in advance is insufficient for U-turn travel, expanding the outer peripheral area SA inward in this manner makes it possible to execute U-turn travel with no problems. Additionally, when stopping the harvester 1 at a specified parking position to unload harvested crops to a work support vehicle stopped in the periphery of the field or the like, it is necessary, to ensure the efficiency of the work, to stop the harvester 1 at the parking position with a certain degree of accuracy and in an attitude (orientation) suited to the support work. This is true for both autonomous travel and manual travel. Of the outer peripheral lines of the area CA to be worked, the outer peripheral line on the side where the U-turn travel is executed does not vary depending on the linear back-and-forth travel. Thus if the outer peripheral area SA is narrow, there is a chance that the harvester 1 will collide with the area CA to be worked, which is an unworked site, and damage the crops, make contact with the ridge and damage the ridge, and so on. Accordingly, before starting the work travel of the area CA to be worked through linear back-and-forth travel, it is preferable to execute an additional instance of circling travel (additional circling travel). This additional circling travel may be carried out in response to an instruction from the monitoring party, or may be carried out automatically. Note that as described above, the circling travel executed in advance to create the outer peripheral area SA is normally carried out through multiple passes in a spiral shape. The outermost circling travel route has a complex travel route and differs from field to field, and thus manual steering is employed. The subsequent circling travel is carried out through autonomous steering or manual steering. Additionally, if the parking position PP and a U-turn route set UL overlap, a situation is conceivable where a harvester 1 obstructs the U-turn travel of another harvester 1 while the first harvester 1 is parked at the parking position PP, as illustrated in FIG. 32. Accordingly, if the parking position PP and the U-turn route set UL overlap at the point in time when the advance circling travel is complete, it is desirable that the above-described additional circling travel be executed.

The travel route for the additional circling travel can be calculated on the basis of the travel trajectory of the harvester 1 in the advance circling travel, the outer shape data of the area CA to be worked, and so on. As such, the additional circling travel can be carried out through autonomous steering. An example of the flow of additional circling travel executed through autonomous travel will be described below using FIG. 32.

Step #01

The field is segmented into the outer peripheral area SA, where the harvesting work is complete, and the area CA to be worked, where the harvesting work is to be carried out next, through the advance circling travel. After the advance circling travel, the parking position PP and the U-turn route set UL overlap in the outer peripheral area SA, as indicated by step #01 in FIG. 32. The width of the part of the outer peripheral area SA where the U-turn route set UL is set will not be expanded by linear back-and-forth travel alone. As such, the additional circling travel indicated by step #02 in FIG. 32 is executed automatically or in response to an instruction from the monitoring party so as to expand the width of that part.

Step #02

In this additional circling travel, multiple circling travel route elements (indicated by bold lines in FIG. 32), constituting a rectangular circling travel route, are calculated. These circling travel route elements include a left-end travel route element Ls and a right-end travel route element Le of the travel route elements calculated for the linear back-and-forth travel. Note that the travel route element Ls and the travel route element Le are both straight lines. Additionally, in the rectangular circling travel route, the travel route element Ls and the travel route element Le are opposite sides. Here, the circling travel route elements are the travel route element Ls, the travel route element Le, a travel route element connecting the upper ends of the travel route element Ls and the travel route element Le, and a travel route element connecting the lower ends of the travel route element Ls and the travel route element Le. Once the autonomous travel is started, the circling travel route elements conforming to this additional circling travel route are selected by the route element selecting unit 63, and the autonomous travel (work travel executed during the circling travel) is executed.

Step #03

As indicated by step #03 in FIG. 32, the outer peripheral area SA is expanded as a result of this additional circling travel. Accordingly, a space having a width corresponding to at least the work width of the harvester 1 is newly formed between the parking position PP and the unworked site. Next, as a result of the area CA to be worked being reduced by an amount equivalent to the same number of work widths as there were instances of the additional circling travel, the left-end travel route element Ls and the right-end travel route element Le move inward by an amount equivalent to the reduction in the area CA to be worked. A work travel route according to a linear back-and-forth travel pattern is then determined for the new area CA to be worked, which is a rectangle taking the moved travel route element Ls and travel route element Le as opposite sides, and the autonomous work travel is started in the new area CA to be worked.

Note that in step #01 of FIG. 32, there are cases where the parking position PP does not overlap with the U-turn route set UL, and the parking position PP does not face the U-turn route set UL. For example, there are cases where the parking position PP is in a position facing the left-end travel route element Ls. In this case, the area in the periphery of the parking position is expanded by executing the linear back-and-forth travel in which the travel route element Ls is first selected, and thus the above-described additional circling travel is no longer executed. Alternatively, only approximately one pass of the additional circling travel may be executed.

The configuration may also be such that the above-described additional circling travel is carried out automatically even when multiple harvesters 1 execute work travel cooperatively. In cooperative work, when a linear back-and-forth travel pattern is set as the travel pattern and the parking position PP is set to a position facing the U-turn route set UL, multiple passes (approximately three to four passes) of the additional circling travel are executed automatically, immediately after the work travel is started. As a result, the area CA to be worked is reduced, and a broad space is secured on the inner side of the parking position PP. Thus even if one harvester 1 is stopped in the parking position PP, another harvester 1 can make a U-turn on the inner circumferential side of the parking position PP, can pass on the inner circumferential side of the parking position PP, and so on with leeway.

(3) In the above-described embodiment, the configuration is such that if, when a linear back-and-forth travel pattern is set, the parking position for work involving a support vehicle such as the transport vehicle CV is set in an area of the outer peripheral area SA where U-turn travel is executed, a harvester 1, which is different from the harvester 1 stopped for unloading work or the like, stops until the end of the unloading work or the like and stands by, selects a travel route element that circumvents the parking position PP, or the like. However, the configuration may be such that in this case, if the autonomous travel (work travel) is started in order to secure a sufficient space for executing U-turn travel further inward from the parking position PP, one or more of the harvesters 1 automatically make several passes of the circling travel in an outer peripheral part of the area CA to be worked.

(4) The foregoing embodiment describes setting and selecting travel route elements while treating the work widths of the master harvester 1m, which is the first work vehicle, and the slave harvester 1s, which is the second work vehicle, as being the same. Two examples of methods for setting and selecting the travel route elements when the work width of the master harvester 1m is different from the work width of the slave harvester 1s will be described here. The work width of the master harvester 1m will be described as a first work width, and the work width of the slave harvester 1s will be described as a second work width. For the sake of simplicity, the first work width will specifically be referred to as "6", and the second work width as "4".

Figure 33:
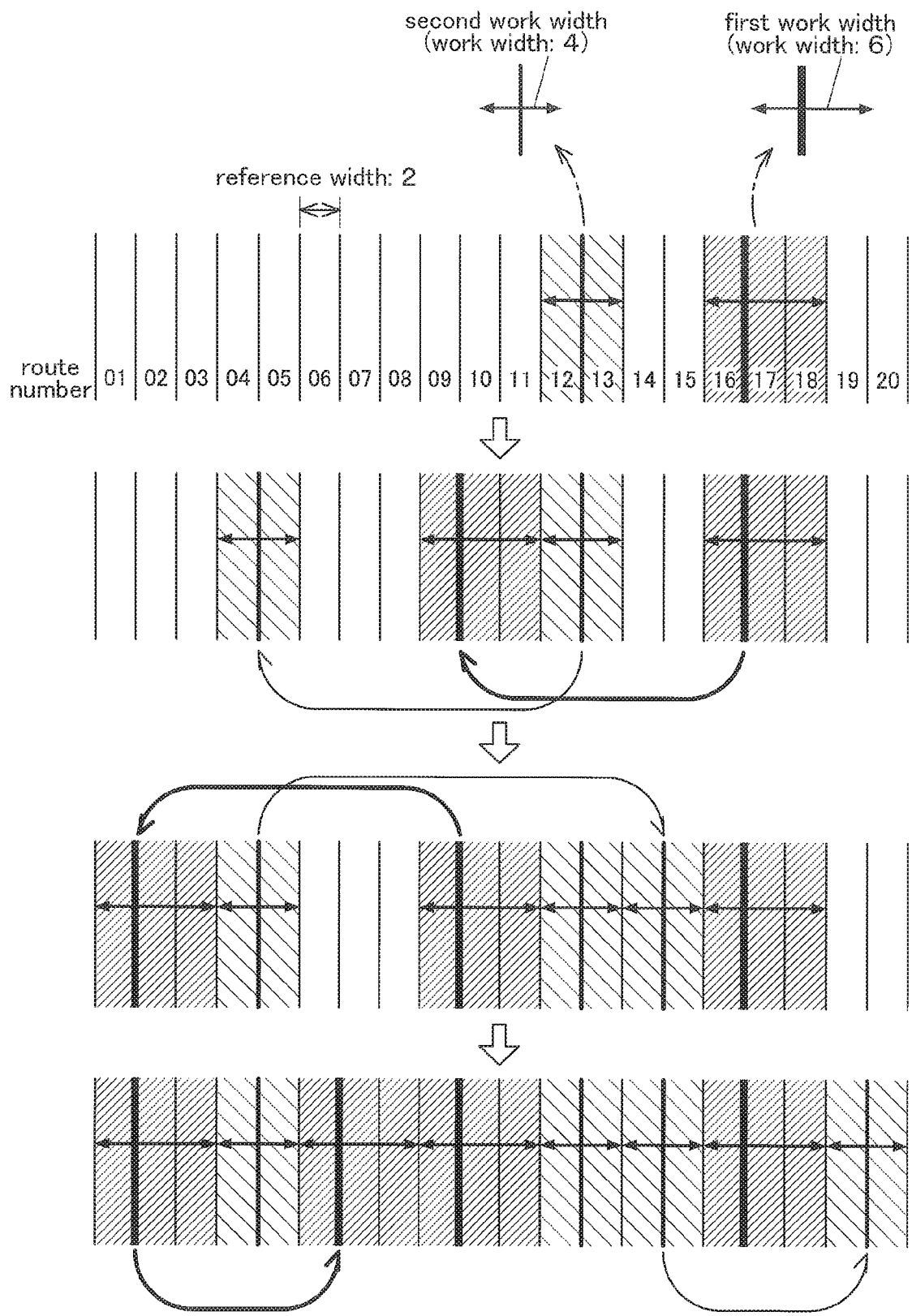
FIG. 33 is a diagram illustrating a specific example of route selection by two harvesters having different work widths.

(4-1) FIG. 33 illustrates an example of a case where a linear back-and-forth travel pattern is set. In this case, the route managing unit 60 calculates the travel route element set, which is an aggregate of multiple travel route elements covering the area CA to be worked. At this time, the width of each travel route element is set to a reference width, which is the greatest common divisor or an approximate greatest common divisor of the first work width and the second work width. Because the first work width is "6" and the second work width is "4", the reference width is "2". In FIG. 33, numbers from 01 to 20 are added to the travel route elements as route numbers in order to identify the travel route elements.

Assume that the master harvester 1m departs from the travel route element having a route number of 17, and the slave harvester 1s departs from the travel route element having a route number of 12. As illustrated in FIG. 8, the route element selecting unit 63 is divided into the first route element selecting unit 631, which has a function for selecting the travel route elements for the master harvester 1m, and the second route element selecting unit 632, which has a function for selecting the travel route elements for the slave harvester 1s. If the route element selecting unit 63 is provided in the control unit 5 of the master harvester 1m, the next travel route element selected by the second route element selecting unit 632 is supplied to the route setting unit 64 of the slave harvester 1s via the communication processing unit 70 of the master harvester 1m and the communication processing unit 70 of the slave harvester 1s. Note that it is not absolutely necessary for the center of the work width or the center of the harvester 1 to match the travel route element, and if there is deviation, the autonomous travel is controlled in accordance with that deviation.

As illustrated in FIG. 33, the first route element selecting unit 631 selects the next travel route element from an untraveled travel route element set so as to leave an area equivalent to an integral multiple of the first work width or the second work width (this may be untraveled or already traveled) or an area equivalent to the total of an integral multiple of the first work width and an integral multiple of the second work width (this may be untraveled or already traveled). The selected next travel route element is supplied to the route setting unit 64 of the master harvester 1m. Likewise, the second route element selecting unit 632 selects the next travel route element from an untraveled travel route element set so as to leave an area equivalent to an integral multiple of the first work width or the second work width (this may be untraveled or already traveled) or an area equivalent to the total of an integral multiple of the first work width and an integral multiple of the second work width (this may be untraveled or already traveled).

In other words, an untraveled area having a width that is an integral multiple of the first work width or the second work width remains in the area CA to be worked after the master harvester 1m or the slave harvester 1s has executed autonomous travel along the next travel route element supplied by the first route element selecting unit 631 or the second route element selecting unit 632. Although it is possible that an unworked area having a width narrower than the second work width will ultimately remain, the unworked area that ultimately remains is subjected to work travel by the master harvester 1m or the slave harvester 1s.

Figure 34:
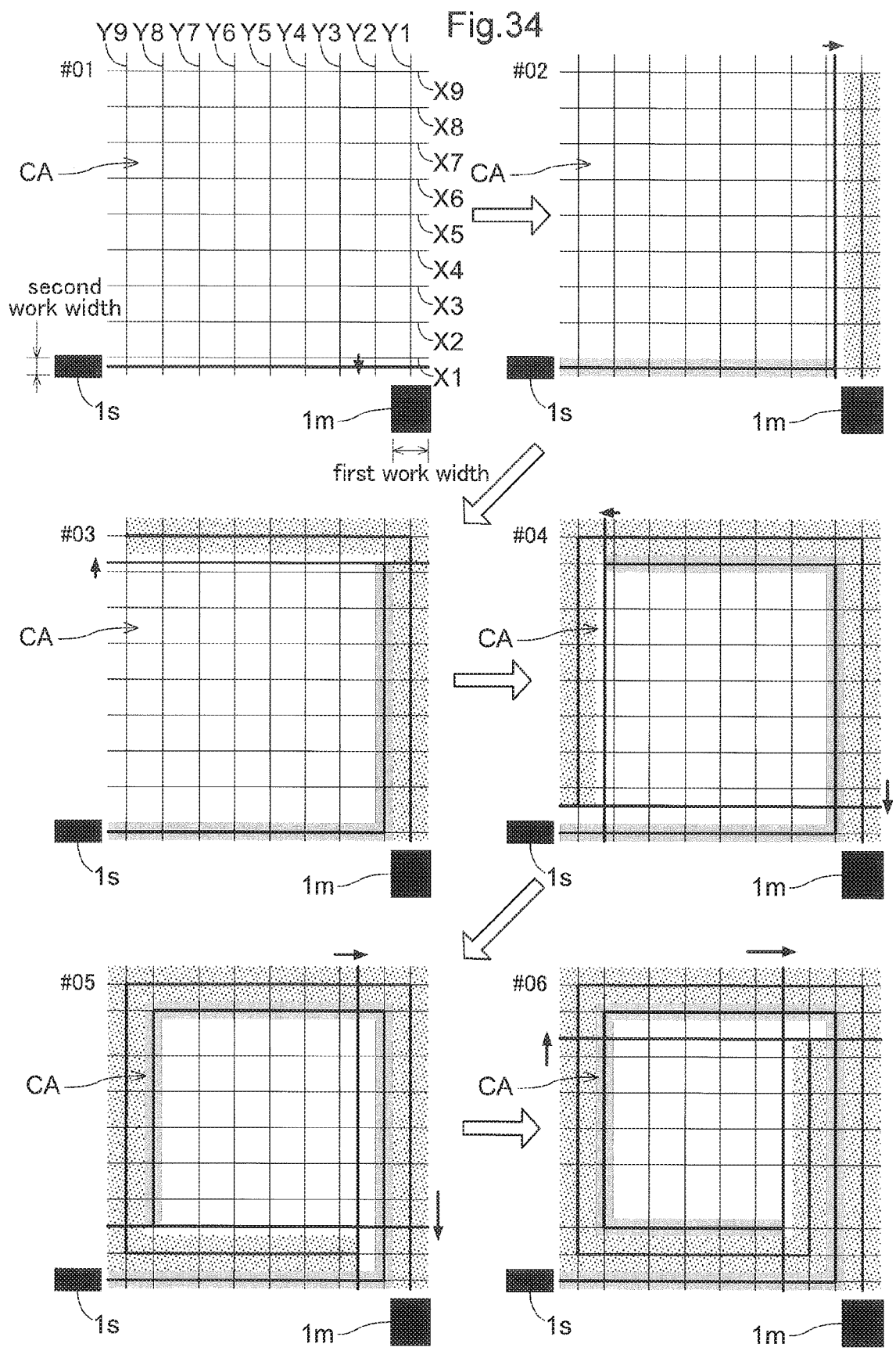
FIG. 34 is a diagram illustrating a specific example of route selection by two harvesters having different work widths.

(4-2) FIG. 34 illustrates an example of a case where a spiral travel pattern is set. In this case, a travel route element set constituted by a vertical straight line set and a horizontal straight line set, in which the vertical and horizontal intervals are equivalent to the first work width, is set for the area CA to be worked. Signs X1 to X9 are assigned as route numbers to the travel route elements belonging to the horizontal straight line set. Signs Y1 to Y9 are assigned as route numbers to the travel route elements belonging to the vertical straight line set.

In FIG. 34, a spiral travel pattern is set so that the master harvester 1m and the slave harvester 1s trace a double spiral line in the counterclockwise direction, from the outside toward the inside. Assume that the master harvester 1m departs from the travel route element having a route number of Y1, and the slave harvester 1s departs from the travel route element having a route number of X1. In this case too, the route element selecting unit 63 is divided into the first route element selecting unit 631 and the second route element selecting unit 632.

As illustrated in FIG. 34, the master harvester 1m first travels along the travel route element having the route number Y1, which is selected first by the first route element selecting unit 631. However, the travel route element set illustrated in FIG. 34 is originally calculated using the first work width as an interval. Accordingly, the travel route element having the route number X1, which is selected first by the second route element selecting unit 632 for the slave harvester 1s having the second work width that is narrower than the first work width, has its positional coordinates corrected to compensate for the difference between the first work width and the second work width. In other words, the travel route element having a route number of X1 is corrected toward the outside by an amount equivalent to 0.5 times the difference between the first work width and the second work width (this difference will be called a "width difference" hereinafter) (FIG. 34, #01). The route numbers Y2, X8, and Y8, which correspond to the next travel route element selected in accordance with the travel of the slave harvester 1s, are corrected in the same manner (FIG. 34, #02, #03, and #04). Although the master harvester 1m travels the travel route elements from route number Y1 to route numbers X9 and Y9 as per the original settings (FIG. 34, #03 and #04), the slave harvester 1s is traveling on the outside of the travel route element having the route number X2, which is selected next, and thus the position of that travel route element is corrected by an amount equivalent to the width difference (FIG. 34, #04). When selecting the travel route element having the route number X3 for the slave harvester 1s, the slave harvester 1s is already traveling on the travel route element having the route number X1, which is located on the outside of the route number X3, and thus the position is corrected by an amount equivalent to 1.5 times the width difference (FIG. 34, #05). In this manner, the positions of the selected travel route elements are sequentially corrected so as to cancel out the difference between the first work width and the second work width in accordance with the number of travel route elements traveled by the slave harvester 1s that are present on the outside of the selected travel route element (FIG. 34, #06). Although the route managing unit 60 corrects the positions of the travel route elements here, the correction may be carried out by the first route element selecting unit 631 and the second route element selecting unit 632.

The examples of travel indicated in FIGS. 33 and 34 are described assuming that the first route element selecting unit 631 and the second route element selecting unit 632 are provided in the control unit 5 of the master harvester 1m. However, the second route element selecting unit 632 may be provided in the slave harvester 1s. In this case, it is preferable that the slave harvester 1s receive data indicating the travel route element set, and that the first route element selecting unit 631 and the second route element selecting unit 632 select their own next travel route elements and make the necessary corrections to the positional coordinates while exchanging their respective selected next travel route elements. A configuration is also possible in which the route managing unit 60, the first route element selecting unit 631, and the second route element selecting unit 632 are all provided in the communication terminal 4, and the selected travel route elements are sent from the communication terminal 4 to the route setting unit 64.

(5) The control function blocks described in the foregoing embodiment on the basis of FIG. 8 are merely examples, and the function units can be divided further, or multiple function units can be combined, as well. Additionally, although the function units are allocated among the control unit 5, the communication terminal 4, and the management computer 100, which serve as higher-order control devices, this allocation of the function units is also merely an example, and the function units can be allocated among the higher order control devices as desired. The function units can also be allocated to other higher-order control devices as long as the higher-order control devices can exchange data with each other. For example, in the control function block diagram illustrated in FIG. 8, the work site data input unit 42, the outer shape data generating unit 43, and the area setting unit 44 are provided in the communication terminal 4 as the first travel route managing module CM1. Furthermore, the route managing unit 60, the route element selecting unit 63, and the route setting unit 64 are provided in the control unit 5 of the harvester 1 as the second travel route managing module CM2. However, the route managing unit 60 may instead be included in the first travel route managing module CM1. Likewise, the outer shape data generating unit 43, the area setting unit 44, and so on may be included in the second travel route managing module CM2. The entirety of the first travel route managing module CM1 may be provided in the control unit 5, and the entirety of the second travel route managing module CM2 may be provided in the communication terminal 4. Providing the greatest possible number of control function units pertaining to travel route management in the portable communication terminal 4 increases the freedom of maintenance and the like, which is convenient. This allocation of function units is limited by the data processing capabilities of the communication terminal 4 and the control unit 5, the speed of communication between the communication terminal 4 and the control unit 5, and so on.

(6) Although the travel routes calculated and set according to the present invention are used as target travel routes for autonomous travel, the travel routes can also be used as target travel routes for manual travel. In other words, the present invention can be applied to both autonomous travel and manual travel, and can of course also be applied in a situation where autonomous travel and manual travel are mixed.

(7) The foregoing embodiment describes an example in which the field information sent from the management center KS includes a topographical map of the periphery of the field from the outset, and the accuracy of the outer shape and outer dimensions of the field is improved through circling travel executed along the borders of the field. However, the configuration may be such that the field information does not include a topographical map of the periphery of the field, or at least does not include a topographical map of the field, and the outer shape and outer dimensions of the field are calculated for the first time through the circling travel. Additionally, the content of the field information, work plan manual, and so on sent from the management center KS, the items input through the communication terminal 4, and so on are not limited to those described above, and can be changed within a scope that does not depart from the essential spirit of the present invention.

(8) The foregoing embodiment describes an example in which, as illustrated in FIG. 8, the rectangular route element calculating unit 602 is provided in addition to the mesh route element calculating unit 601, and the travel route element set, which is a parallel straight line set covering the area CA to be worked, is calculated by the rectangular route element calculating unit 602. However, the rectangular route element calculating unit 602 may be omitted, and linear back-and-forth travel may be realized using the travel route elements corresponding to a mesh-shaped straight line set calculated by the mesh route element calculating unit 601.

(9) The foregoing embodiment describes an example in which, when executing cooperative travel control, the parameters of the vehicle travel device group 71, the work device group 72, and so on of the slave harvester 1s are changed on the basis of a result of the monitoring carried out by the monitoring party. However, the configuration may be such that an image (a moving image, still images captured at set intervals, or the like) captured by a camera installed in the master harvester 1m or the slave harvester 1s is displayed in a monitor or the like installed in the master harvester 1m, with the monitoring party viewing the image, determining the work conditions of the slave harvester 1s, and changing the parameters of the vehicle travel device group 71, the work device group 72, and so on. Alternatively, the configuration may be such that when the parameters of the master harvester 1m are changed, the parameters of the slave harvester 1s are changed in accordance therewith.

(10) The foregoing embodiment describes an example in which the multiple harvesters 1 executing work travel in cooperation with each other travel autonomously along the same travel pattern. However, the configuration may be such that the harvesters travel autonomously with different travel patterns. In this case, the configuration may be such that, for example, the travel patterns of the plurality of harvesters 1 are made different by changing the settings of the travel pattern partway through the work.

(11) Although the foregoing embodiment describes an example in which two harvesters 1 execute cooperative autonomous travel, cooperative autonomous travel by three or more harvesters 1 can also be realized.

(12) In the foregoing embodiment, the harvester 1 executes circular harvesting first when executing harvesting work in the field. Note that "circular harvesting" refers to work for harvesting while traveling around the inner side of the border line of the field. After the circular harvesting, the area setting unit 44 sets the area on the outside of the field traveled around by the harvester 1 as the outer peripheral area SA, and sets the area CA to be worked on the inside of the outer peripheral area SA. However, the present invention is not limited thereto. In other words, the circular harvesting by the harvester 1 is not work that is necessary for the present invention. Additionally, the area setting unit 44 may be configured to set the area CA to be worked without setting the outer peripheral area SA. For example, the area setting unit 44 may be configured to set the area CA to be worked in accordance with an input operation made by the monitoring party through the communication terminal 4.

(13) As an example of the travel route element set, FIG. 5 illustrates a travel route element set in which multiple parallel dividing lines that divide the area CA to be worked into rectangular shapes serve as travel route elements. However, the present invention is not limited thereto. For example, the travel route element set illustrated in FIG. 35 takes curved parallel lines as the travel route elements. In this manner, the "parallel lines" according to the present invention may be curved. Additionally, the "parallel line set" according to the present invention may include curved parallel lines.

(14) As an example of the travel route element set, FIG. 6 illustrates a travel route element set constituted by multiple mesh lines extending in the vertical and horizontal directions that divide the area CA to be worked into a mesh. However, the present invention is not limited thereto. For example, in the travel route element set illustrated in FIG. 36, the mesh lines in the horizontal direction with respect to the diagram are straight lines, whereas the mesh lines in the vertical direction with respect to the diagram are curved. Additionally, in the travel route element set illustrated in FIG. 37, the mesh lines in the horizontal direction and the mesh lines in the vertical direction with respect to the diagram are both curved. In this manner, the mesh lines may be curved. Additionally, the mesh line set may include curved mesh lines.

Figure 35:
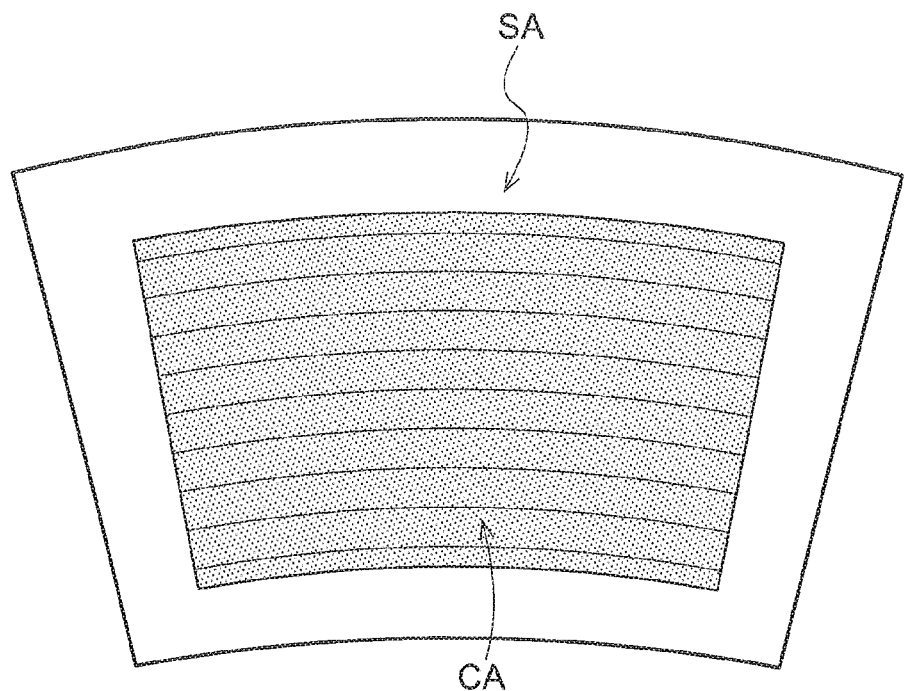
FIG. 35 is a diagram illustrating an example of a travel route element set constituted by curved parallel lines.
Figure 36:
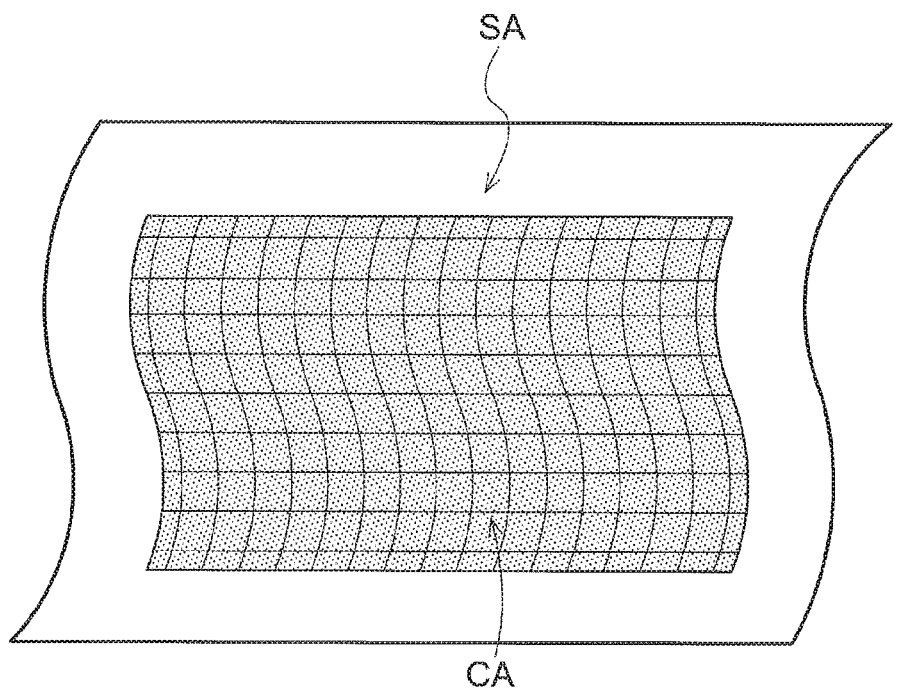
FIG. 36 is a diagram illustrating an example of a travel route element set including curved mesh lines.
Figure 37:
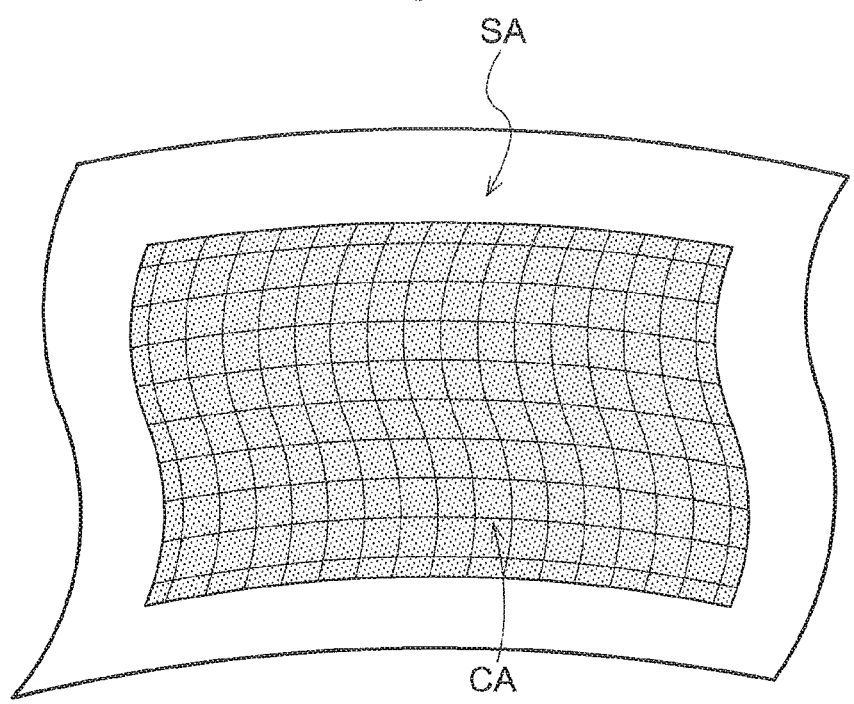
FIG. 37 is a diagram illustrating an example of a travel route element set constituted by curved mesh lines.

(15) In the foregoing embodiment, linear back-and-forth travel is carried out by repeating travel along straight line-shaped travel route elements and U-turn travel. However, the present invention is not limited thereto, and the configuration may be such that back-and-forth travel is carried out by repeating travel along curved travel route elements, as indicated in FIGS. 35 to 37, and U-turn travel.

INDUSTRIAL APPLICABILITY

The travel route management system and travel route determination device according to the present invention can be applied not only in the harvester 1, which is a normal-type combine serving as a work vehicle, but also in any work vehicle capable of automatically traveling while working in a work site. This includes other types of harvesters 1 such as autodetachable-type combines and corn harvesters, tractors fitted with work devices such as tilling devices, paddy work machines, and so on.

DESCRIPTION OF REFERENCE SIGNS

1: harvester (work vehicle)
1m: master harvester
1s: slave harvester
4: communication terminal
41: touch panel
42: work site data input unit
43: outer shape data generating unit
44: area setting unit
5: control unit
50: communication processing unit
51: travel control unit
511: autonomous travel controlling unit
512: manual travel controlling unit
52: work control unit
53: vehicle position calculating unit
54: notification unit
55: work state evaluating unit
60: route managing unit
601: mesh route element calculating unit
603: U-turn route calculating unit
62: rectangular route element calculating unit
63: route element selecting unit
631: first route element selecting unit
632: second route element selecting unit
64: route setting unit
70: communication processing unit
80: satellite positioning module
SA: outer peripheral area
CA: area to be worked

The invention claimed is:

1. A travel route management system configured to determine a travel route for a work vehicle configured to travel autonomously while working in a work site, the system comprising:
   an area setting unit configured to set the work site to an outer peripheral area, and an area to be worked on an inner side of the outer peripheral area; and
   a route element selecting unit configured to sequentially select, while the work vehicle is working in the work site and without predetermining all travel route elements for the work vehicle to travel the area to be worked, a next travel route element to be traveled on next, from among multiple mutually-parallel travel route elements, the multiple mutually-parallel travel route elements constituting a travel route that covers the area to be worked,
wherein the route element selecting unit selects a U-turn travel route for moving from a travel route element serving as a movement origin to a next travel route element serving as a movement destination, the selection being made on the basis of an interval between the movement origin and the movement destination.

2. The travel route management system according to claim 1,
wherein the U-turn travel route is a travel route set in the outer peripheral area.

3. The travel route management system according to claim 2,
wherein a first U-turn travel route that realizes normal U-turn travel carried out only in a forward direction, and a second U-turn travel route that realizes switchback turn travel carried out in both forward and reverse directions, can be calculated as the U-turn travel route; and
the route element selecting unit selects the first U-turn travel route when the interval is large and the second U-turn travel route when the interval is small.

4. The travel route management system according to claim 3,
wherein the first U-turn travel route includes a rightward U-turn travel route and a leftward U-turn travel route; and
the route element selecting unit selects the leftward U-turn travel route over the rightward U-turn travel route.

5. A travel route management system configured to determine a travel route for a work vehicle configured to travel autonomously while working in a work site, the system comprising:
an area setting unit configured to set the work site to an outer peripheral area, and an area to be worked on an inner side of the outer peripheral area;
a route managing unit configured to calculate a travel route element set, the travel route element set being an aggregate of multiple travel route elements constituting a travel route covering the area to be worked, and further configured to manage the travel route element set so as to be capable of readout, and to manage a plurality of types of directional change routes so as to be capable of readout, the directional change routes being used to move from one of the travel route elements to another travel route element; and
a route element selecting unit configured to, on the basis of a travel pattern set from among a plurality of types of travel patterns defined by combinations of the travel route elements and the directional change routes, select the next travel route element to be traveled next from the travel route element set in sequence, and selects the directional change travel route for moving to the next travel route element,
wherein the setting of the travel pattern is carried out by a human, through a user instruction.

6. The travel route management system according to claim 5,
wherein one type of the travel pattern is spiral travel, the spiral travel being spiral work travel from the outside toward the inside of the area to be worked, and another type of the travel pattern is back-and-forth travel in which a U-turn travel route in the outer peripheral area is used as the directional change route for moving from an endpoint of the travel route element to an endpoint of another travel route element.

7. The travel route management system according to claim 6,
wherein the U-turn travel route includes a first U-turn travel route that realizes normal U-turn travel carried out only in a forward direction and a second U-turn travel route that realizes switchback turn travel carried out in both forward and reverse directions; and
the route element selecting unit selects the first U-turn travel route when an interval between a travel route element serving as a movement origin and a travel route element serving as a movement destination, which are to be moved to and which are parallel to each other, is large, and selects the second U-turn travel route when the interval is small.

8. The travel route management system according to claim 5,
wherein the travel pattern can be changed partway through the work travel in the area to be worked.

9. The travel route management system according to claim 5,
wherein the travel pattern is set by a human, through a user input.

10. A travel route determination device that determines a travel route for a work vehicle that travels while working in a work site, the device comprising:
an area setting unit that sets an area to be worked by the work vehicle in the work site;
a route managing unit that calculates a travel route element set, the travel route element set being an aggregate of multiple travel route elements constituting a travel route covering the area to be worked, and stores the travel route element set so as to be capable of readout;
a first route element selecting unit that calculates a selection order for the travel route elements of an overall travel route on the basis of a basic priority rule, before the work travel by the work vehicle;
a second route element selecting unit that, while the work vehicle carries out work travel based on the selection order calculated by the first route element selecting unit, extracts an untraveled travel route element from the travel route element set as a recalculated travel route element, and recalculates a selection order for the recalculated travel route element on the basis of a cost evaluation rule; and
a route setting unit that corrects the selection order calculated by the first route element selecting unit with the selection order calculated by the second route element selecting unit.

11. The travel route determination device according to claim 10,
wherein the second route element selecting unit extracts a predetermined number of travel route elements from the end of the selection order calculated by the first route element selecting unit as the recalculated travel route elements.

12. The travel route determination device according to claim 11,
wherein the second route element selecting unit repeats the process of extracting the recalculated travel route element and recalculating the selection order while incrementing the predetermined number by additionally extracting a travel route element later in the selection order, and stops the repeating process when the last additionally-extracted travel route element is the travel route element currently being traveled.

13. The travel route determination device according to claim 10,
wherein the travel route element set is a parallel line set constituted by parallel lines that are parallel to each other and divide the area to be worked into rectangular shapes, and movement from one end of one travel route element to one end of another travel route element is executed through U-turn travel by the work vehicle.

14. The travel route determination device according to claim 13,
wherein in the basic priority rule, a priority level is set in advance from a travel route element previous in the order to a travel route element next in the order; and
the priority level is set so that a properly-distanced travel route element separated by a predetermined distance from a travel route element previous in the order has the highest priority level as the travel route element next in the order, with the priority level decreasing as separation distance from the travel route element previous in the order to the travel route element next in the order increases.

15. The travel route determination device according to claim 13,
wherein a cost evaluated by the cost evaluation rule is a cost arising when the work vehicle travels on the travel route elements according to the selection order calculated by the second route element selecting unit; and
a selection order where the cost is the lowest is calculated by the second route element selecting unit.

16. The travel route determination device according to claim 13,
wherein the cost depends on a travel distance of the U-turn travel.

17. A travel route management system configured to determine a travel route for a work vehicle configured to travel autonomously while working in a work site, the system comprising:
one or more processors programmed and/or configured to:
set the work site to an outer peripheral area, and an area to be worked on an inner side of the outer peripheral area; and
sequentially select, while the work vehicle is working in the work site and without predetermining all travel route elements for the work vehicle to travel the area to be worked, a next travel route element to be traveled on next, from among multiple mutually-parallel travel route elements, the multiple mutually-parallel travel route elements constituting a travel route that covers the area to be worked, wherein the one or more processors are programmed and/or configured to select a U-turn travel route for moving from a travel route element serving as a movement origin to a next travel route element serving as a movement destination, the selection being made on the basis of an interval between the movement origin and the movement destination.

18. The travel route management system according to claim 17, wherein the U-turn travel route is a travel route set in the outer peripheral area.

19. The travel route management system according to claim 18, wherein a first U-turn travel route that realizes normal U-turn travel carried out only in a forward direction, and a second U-turn travel route that realizes switchback turn travel carried out in both forward and reverse directions, can be calculated as the U-turn travel route; and the one or more processors are programmed and/or configured to select the first U-turn travel route when the interval is large and the second U-turn travel route when the interval is small.

20. The travel route management system according to claim 19,
wherein the first U-turn travel route includes a rightward U-turn travel route and a leftward U-turn travel route; and
the one or more processors are programmed and/or configured to select the leftward U-turn travel route over the rightward U-turn travel route.

21. A travel route management system configured to determine a travel route for a work vehicle configured to travel autonomously while working in a work site, the system comprising:
one or more processors programmed and/or configured to:
set the work site to an outer peripheral area, and an area to be worked on an inner side of the outer peripheral area;
calculate a travel route element set, the travel route element set being an aggregate of multiple travel route elements constituting a travel route covering the area to be worked, and manage the travel route element set so as to be capable of readout, and manage a plurality of types of directional change routes so as to be capable of readout, the directional change routes being used to move from one of the travel route elements to another travel route element; and
on the basis of a travel pattern set from among a plurality of types of travel patterns defined by combinations of the travel route elements and the directional change routes, select the next travel route element to be traveled next from the travel route element set in sequence, and select the directional change travel route for moving to the next travel route element, wherein the setting of the travel pattern is carried out by a human, through a user instruction.

22. The travel route management system according to claim 21, wherein one type of the travel pattern is spiral travel, the spiral travel being spiral work travel from the outside toward the inside of the area to be worked, and another type of the travel pattern is back-and-forth travel in which a U-turn travel route in the outer peripheral area is used as the directional change route for moving from an endpoint of the travel route element to an endpoint of another travel route element.

23. The travel route management system according to claim 22,
wherein the U-turn travel route includes a first U-turn travel route that realizes normal U-turn travel carried out only in a forward direction and a second U-turn travel route that realizes switchback turn travel carried out in both forward and reverse directions; and
the one or more processors are programmed and/or configured to select the first U-turn travel route when an interval between a travel route element serving as a movement origin and a travel route element serving as a movement destination, which are to be moved to and which are parallel to each other, is large, and select the second U-turn travel route when the interval is small.

24. The travel route management system according to claim 21, wherein the travel pattern can be changed partway through the work travel in the area to be worked.

25. The travel route management system according to claim 21, wherein the travel pattern is set by a human, through a user input.

26. A travel route determination device that determines a travel route for a work vehicle that travels while working in a work site, the device comprising:

one or more processors programmed and/or configured to:
set an area to be worked by the work vehicle in the work site;
calculate a travel route element set, the travel route element set being an aggregate of multiple travel route elements constituting a travel route covering the area to be worked, and store the travel route element set so as to be capable of readout;
calculate a selection order for the travel route elements of an overall travel route on the basis of a basic priority rule, before the work travel by the work vehicle;
while the work vehicle carries out work travel based on the selection order calculated by the one or more processors, extract an untraveled travel route element from the travel route element set as a recalculated travel route element, and recalculate a selection order for the recalculated travel route element on the basis of a cost evaluation rule; and
correct the selection order calculated on the basis of the basic priority rule with the selection order calculated on the basis of the cost evaluation rule.

27. The travel route determination device according to claim 26, wherein the one or more processors are programmed and/or configured to extract a predetermined number of travel route elements from the end of the selection order calculated on the basis of the basic priority rule as the recalculated travel route elements.

28. The travel route determination device according to claim 27, wherein the one or more processors are programmed and/or configured to repeat the process of extracting the recalculated travel route element and recalculating the selection order while incrementing the predetermined number by additionally extracting a travel route element later in the selection order, and stop the repeating process when the last additionally-extracted travel route element is the travel route element currently being traveled.

29. The travel route determination device according to claim 26, wherein the travel route element set is a parallel line set constituted by parallel lines that are parallel to each other and divide the area to be worked into rectangular shapes, and movement from one end of one travel route element to one end of another travel route element is executed through U-turn travel by the work vehicle.

30. The travel route determination device according to claim 29,
wherein in the basic priority rule, a priority level is set in advance from a travel route element previous in the order to a travel route element next in the order; and
the priority level is set so that a properly-distanced travel route element separated by a predetermined distance from a travel route element previous in the order has the highest priority level as the travel route element next in the order, with the priority level decreasing as separation distance from the travel route element previous in the order to the travel route element next in the order increases.

31. The travel route determination device according to claim 29,
wherein a cost evaluated by the cost evaluation rule is a cost arising when the work vehicle travels on the travel route elements according to the selection order calculated on the basis of the cost evaluation rule; and
a selection order where the cost is the lowest is calculated by the one or more processors on the basis of the cost evaluation rule.

32. The travel route determination device according to claim 29, wherein the cost depends on a travel distance of the U-turn travel.

* * * * *